United States Patent
Pancholi et al.

(10) Patent No.: US 12,393,992 B2
(45) Date of Patent: Aug. 19, 2025

(54) SYSTEMS AND METHODS FOR ASSESSING AND CONTROLLING SUSTAINABILITY OF AN ENERGY PLANT

(71) Applicant: Tyco Fire & Security GmbH, Neuhausen am Rheinfall (CH)

(72) Inventors: Payal Pancholi, Navi Mumbai (IN); Abhishek Gupta, Pune (IN); James P. Kummer, Wales, WI (US); Michael J. Wenzel, Grafton, WI (US); Michael J. Risbeck, Madison, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 507 days.

(21) Appl. No.: 17/826,635

(22) Filed: May 27, 2022

(65) Prior Publication Data

US 2022/0284519 A1  Sep. 8, 2022

Related U.S. Application Data

(63) Continuation-in-part of application No. 17/692,642, filed on Mar. 11, 2022, now abandoned, and a
(Continued)

(51) Int. Cl.
*G06Q 40/12* (2023.01)
*G06F 30/13* (2020.01)
(Continued)

(52) U.S. Cl.
CPC ............ *G06Q 40/125* (2013.12); *G06F 30/13* (2020.01); *G06Q 10/06315* (2013.01); *G06Q 10/0637* (2013.01)

(58) Field of Classification Search
CPC ........... G06Q 40/125; G06Q 10/06315; G06Q 10/0637; G06F 30/13
See application file for complete search history.

(56) References Cited

U.S. PATENT DOCUMENTS

| 5,497,452 A | 3/1996 | Shimizu et al. |
| 6,988,671 B2 | 1/2006 | DeLuca |

(Continued)

FOREIGN PATENT DOCUMENTS

| CA | 2455689 A1 | 7/2005 |
| CA | 2957726 A1 | 3/2016 |

(Continued)

OTHER PUBLICATIONS

Noakes et al., "Appraising healthcare ventilation design from combined infection control and energy perspective," HVAC & R Research, Aug. 2012, (20 pages).
(Continued)

*Primary Examiner* — Zhipeng Wang
(74) *Attorney, Agent, or Firm* — Foley & Lardner LLP

(57) ABSTRACT

Systems and methods for controlling building equipment include simulating operation of the building equipment at a plurality of initial points to generate corresponding values of a first control objective and a second control objective that competes with the first control objective, automatically generating a new point at which to run a new simulation based on the plurality of initial points and the corresponding values of the control objectives, running the new simulation at the new point to generate corresponding values of the control objectives, classifying a subset of the plurality of initial points and the new point as Pareto-optimal points based on the corresponding values of the control objectives, and operating the building equipment at a Pareto-optimal point selected from the subset of the plurality of initial points and the new point classified as Pareto-optimal points.

27 Claims, 17 Drawing Sheets

Related U.S. Application Data continuation-in-part of application No. 17/483,078, filed on Sep. 23, 2021, now Pat. No. 11,960,261, which is a continuation-in-part of application No. 17/403,669, filed on Aug. 16, 2021, now Pat. No. 12,007,732, which is a continuation-in-part of application No. 17/393,138, filed on Aug. 3, 2021, now Pat. No. 12,222,124, and a continuation-in-part of application No. 16/927,759, filed on Jul. 13, 2020, now Pat. No. 11,269,306, said application No. 17/393,138 is a continuation of application No. 16/927,766, filed on Jul. 13, 2020, now Pat. No. 11,131,473, said application No. 17/692,642 is a continuation of application No. 16/655,745, filed on Oct. 17, 2019, now Pat. No. 11,276,125.

(60) Provisional application No. 63/220,878, filed on Jul. 12, 2021, provisional application No. 63/194,771, filed on May 28, 2021, provisional application No. 63/044,906, filed on Jun. 26, 2020, provisional application No. 62/873,631, filed on Jul. 12, 2019.

(51) Int. Cl.
   *G06Q 10/0631* (2023.01)
   *G06Q 10/0637* (2023.01)

(56) References Cited

U.S. PATENT DOCUMENTS

| | | |
|---|---|---|
| 7,025,281 B2 | 4/2006 | DeLuca |
| 7,150,408 B2 | 12/2006 | DeLuca |
| 7,222,494 B2 | 5/2007 | Peterson et al. |
| 7,311,752 B2 | 12/2007 | Tepper et al. |
| 7,580,775 B2 | 8/2009 | Kulyk et al. |
| 7,788,189 B2 | 8/2010 | Budike, Jr. |
| 7,894,946 B2 | 2/2011 | Kulyk et al. |
| 8,473,080 B2 | 6/2013 | Seem et al. |
| 8,527,108 B2 | 9/2013 | Kulyk et al. |
| 8,527,109 B2 | 9/2013 | Kulyk et al. |
| 8,862,448 B2 | 10/2014 | Holmes et al. |
| 8,918,223 B2 | 12/2014 | Kulyk et al. |
| 8,984,464 B1 | 3/2015 | Tabula |
| 9,002,532 B2 | 4/2015 | Asmus |
| 9,110,647 B2 | 8/2015 | Kulyk et al. |
| 9,235,657 B1 | 1/2016 | Wenzel et al. |
| 9,383,736 B2 | 7/2016 | Honda et al. |
| 9,429,923 B2 | 8/2016 | Ward et al. |
| 9,436,179 B1 | 9/2016 | Turney et al. |
| 9,447,985 B2 | 9/2016 | Johnson |
| 9,547,353 B1 | 1/2017 | Marr et al. |
| 9,612,601 B2 | 4/2017 | Beyhaghi et al. |
| 9,618,224 B2 | 4/2017 | Emmons et al. |
| 9,696,054 B2 | 7/2017 | Asmus |
| 9,703,339 B2 | 7/2017 | Kulyk et al. |
| 9,778,639 B2 | 10/2017 | Boettcher et al. |
| 9,810,441 B2 | 11/2017 | Dean-Hendricks et al. |
| 9,852,481 B1 | 12/2017 | Turney et al. |
| 9,982,903 B1 | 5/2018 | Ridder et al. |
| 10,007,259 B2 | 6/2018 | Turney et al. |
| 10,071,177 B1 | 9/2018 | Kellogg |
| 10,088,814 B2 | 10/2018 | Wenzel et al. |
| 10,101,730 B2 | 10/2018 | Wenzel et al. |
| 10,101,731 B2 | 10/2018 | Asmus et al. |
| 10,139,877 B2 | 11/2018 | Kulyk et al. |
| 10,190,789 B2 | 1/2019 | Mueller et al. |
| 10,302,318 B1 | 5/2019 | Chambers |
| 10,359,748 B2 | 7/2019 | Elbsat et al. |
| 10,418,833 B2 | 9/2019 | Wenzel et al. |
| 10,444,210 B2 | 10/2019 | Rawat et al. |
| 10,528,020 B2 | 1/2020 | Drees |
| 10,572,230 B2 | 2/2020 | Lucas et al. |
| 10,628,135 B2 | 4/2020 | Sharma et al. |
| 10,678,227 B2 | 6/2020 | Przybylski et al. |
| 10,706,375 B2 | 7/2020 | Wenzel et al. |
| 10,718,542 B2 | 7/2020 | Alanqar et al. |
| 10,871,756 B2 | 12/2020 | Johnson et al. |
| 10,884,398 B2 | 1/2021 | Elbsat et al. |
| 10,908,578 B2 | 2/2021 | Johnson et al. |
| 10,921,768 B2 | 2/2021 | Johnson et al. |
| 10,928,784 B2 | 2/2021 | Craig et al. |
| 10,977,010 B2 | 4/2021 | Sharma et al. |
| 11,068,821 B2 | 7/2021 | Wenzel et al. |
| 11,101,651 B2 | 8/2021 | Pavlak et al. |
| 11,131,473 B2 | 9/2021 | Risbeck et al. |
| 11,137,163 B2 | 10/2021 | Nasis |
| 11,156,978 B2 | 10/2021 | Johnson et al. |
| 11,164,126 B2 | 11/2021 | Elbsat et al. |
| 11,181,289 B2 | 11/2021 | Federspiel et al. |
| 11,182,714 B2 | 11/2021 | Wenzel et al. |
| 11,193,691 B1 | 12/2021 | Guyer et al. |
| 11,269,306 B2 | 3/2022 | Risbeck et al. |
| 11,274,842 B2 | 3/2022 | Gamroth et al. |
| 11,436,386 B2 | 9/2022 | Motahar |
| 11,668,481 B2 | 6/2023 | Granger et al. |
| 2002/0165671 A1 | 11/2002 | Middya |
| 2003/0040812 A1 | 2/2003 | Gonzales et al. |
| 2003/0055798 A1 | 3/2003 | Hittle et al. |
| 2004/0011066 A1 | 1/2004 | Sugihara et al. |
| 2006/0271210 A1* | 11/2006 | Subbu ............... G06F 18/2113 700/44 |
| 2007/0101688 A1 | 5/2007 | Wootton et al. |
| 2007/0150333 A1 | 6/2007 | Hurst et al. |
| 2007/0202798 A1 | 8/2007 | Billiotte et al. |
| 2007/0203860 A1 | 8/2007 | Golden et al. |
| 2007/0219645 A1 | 9/2007 | Thomas et al. |
| 2009/0078120 A1 | 3/2009 | Kummer et al. |
| 2009/0096416 A1 | 4/2009 | Tonegawa et al. |
| 2009/0117798 A1 | 5/2009 | Takashima et al. |
| 2009/0126382 A1 | 5/2009 | Rubino et al. |
| 2009/0173336 A1 | 7/2009 | Leifer et al. |
| 2009/0265106 A1 | 10/2009 | Bearman et al. |
| 2009/0319090 A1 | 12/2009 | Dillon et al. |
| 2010/0017045 A1 | 1/2010 | Nesler et al. |
| 2010/0047115 A1 | 2/2010 | Krichtafovitch et al. |
| 2010/0063832 A1 | 3/2010 | Brown |
| 2010/0070093 A1 | 3/2010 | Harrod et al. |
| 2010/0175556 A1 | 7/2010 | Kummer et al. |
| 2010/0262313 A1 | 10/2010 | Chambers et al. |
| 2010/0274612 A1 | 10/2010 | Walker et al. |
| 2011/0011105 A1 | 1/2011 | Valiya Naduvath et al. |
| 2011/0018502 A1 | 1/2011 | Bianciotto et al. |
| 2011/0106501 A1 | 5/2011 | Christian et al. |
| 2011/0172981 A1 | 7/2011 | Al-Hashimi et al. |
| 2011/0190946 A1 | 8/2011 | Wong et al. |
| 2011/0204720 A1 | 8/2011 | Ruiz et al. |
| 2011/0231320 A1* | 9/2011 | Irving ............... G06Q 30/08 713/300 |
| 2011/0276182 A1 | 11/2011 | Seem et al. |
| 2012/0042356 A1 | 2/2012 | Kubota et al. |
| 2012/0053740 A1 | 3/2012 | Venkatakrishnan et al. |
| 2012/0130547 A1 | 5/2012 | Fadell et al. |
| 2012/0130556 A1 | 5/2012 | Marhoefer |
| 2012/0173293 A1 | 7/2012 | Motley et al. |
| 2012/0199003 A1 | 8/2012 | Melikov et al. |
| 2012/0203386 A1 | 8/2012 | Fakos et al. |
| 2012/0240113 A1 | 9/2012 | Hur |
| 2012/0259469 A1 | 10/2012 | Ward et al. |
| 2013/0013123 A1 | 1/2013 | Ozaki |
| 2013/0085614 A1 | 4/2013 | Wenzel et al. |
| 2013/0110295 A1 | 5/2013 | Zheng et al. |
| 2013/0116803 A1 | 5/2013 | Gmach et al. |
| 2013/0162037 A1 | 6/2013 | Kim et al. |
| 2013/0166268 A1 | 6/2013 | Leonard et al. |
| 2013/0204443 A1 | 8/2013 | Steven et al. |
| 2013/0238144 A1 | 9/2013 | Shahapurkar et al. |
| 2013/0245847 A1 | 9/2013 | Steven et al. |
| 2013/0247059 A1 | 9/2013 | Amsterdam et al. |
| 2013/0290511 A1 | 10/2013 | Tu et al. |
| 2013/0297084 A1 | 11/2013 | Kubota et al. |
| 2014/0039689 A1* | 2/2014 | Honda ............... F24F 11/65 700/276 |
| 2014/0039709 A1 | 2/2014 | Steven et al. |

(56) References Cited

U.S. PATENT DOCUMENTS

| | | |
|---|---|---|
| 2014/0114867 A1 | 4/2014 | Volkmann et al. |
| 2014/0156093 A1 | 6/2014 | Brian et al. |
| 2014/0236869 A1 | 8/2014 | Fujimaki et al. |
| 2014/0260692 A1 | 9/2014 | Sharp |
| 2014/0277603 A1 | 9/2014 | Ditlow et al. |
| 2014/0277767 A1 | 9/2014 | Othman |
| 2014/0283682 A1 | 9/2014 | Hamann et al. |
| 2014/0324404 A1 | 10/2014 | De La Torre-Bueno |
| 2015/0053366 A1 | 2/2015 | Melsheimer |
| 2015/0097688 A1 | 4/2015 | Bruck et al. |
| 2015/0109442 A1 | 4/2015 | Derenne et al. |
| 2015/0149257 A1 | 5/2015 | Bielat et al. |
| 2015/0227848 A1* | 8/2015 | Amid .................. G06N 7/01 706/13 |
| 2015/0278968 A1* | 10/2015 | Steven ............... G06Q 50/06 705/7.35 |
| 2015/0316901 A1 | 11/2015 | Wenzel et al. |
| 2015/0316902 A1 | 11/2015 | Wenzel et al. |
| 2015/0316903 A1 | 11/2015 | Asmus et al. |
| 2015/0316907 A1 | 11/2015 | Elbsat et al. |
| 2015/0331972 A1 | 11/2015 | McClure et al. |
| 2015/0354874 A1 | 12/2015 | Cur et al. |
| 2016/0066068 A1 | 3/2016 | Schultz et al. |
| 2016/0079826 A1 | 3/2016 | Paiz et al. |
| 2016/0091904 A1* | 3/2016 | Horesh ................ F24F 11/58 700/276 |
| 2016/0092986 A1 | 3/2016 | Lian et al. |
| 2016/0109149 A1 | 4/2016 | Heller |
| 2016/0116181 A1* | 4/2016 | Aultman .............. F24F 11/70 700/276 |
| 2016/0147205 A1 | 5/2016 | Kaufman |
| 2016/0195866 A1 | 7/2016 | Turney et al. |
| 2016/0201933 A1 | 7/2016 | Hester et al. |
| 2016/0218543 A1 | 7/2016 | Ishida et al. |
| 2016/0306934 A1 | 10/2016 | Sperry et al. |
| 2016/0313019 A1 | 10/2016 | Mengle et al. |
| 2016/0313751 A1 | 10/2016 | Risbeck et al. |
| 2016/0377306 A1 | 12/2016 | Drees et al. |
| 2017/0003676 A1 | 1/2017 | Yoshida et al. |
| 2017/0011150 A1 | 1/2017 | Sons et al. |
| 2017/0016644 A1* | 1/2017 | Nagarathinam ....... G05B 13/04 |
| 2017/0031962 A1 | 2/2017 | Turney et al. |
| 2017/0039339 A1 | 2/2017 | Bitran et al. |
| 2017/0082305 A1 | 3/2017 | Law |
| 2017/0097163 A1 | 4/2017 | Law et al. |
| 2017/0097616 A1 | 4/2017 | Cozad et al. |
| 2017/0102162 A1 | 4/2017 | Drees et al. |
| 2017/0102675 A1 | 4/2017 | Drees |
| 2017/0103483 A1 | 4/2017 | Drees et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | ElBsat et al. |
| 2017/0104345 A1 | 4/2017 | Wenzel et al. |
| 2017/0104449 A1 | 4/2017 | Drees |
| 2017/0147722 A1 | 5/2017 | Greenwood |
| 2017/0176030 A1 | 6/2017 | Emmons et al. |
| 2017/0179716 A1 | 6/2017 | Vitullo et al. |
| 2017/0193792 A1 | 7/2017 | Bermudez Rodriguez et al. |
| 2017/0211837 A1 | 7/2017 | Gupta et al. |
| 2017/0212488 A1 | 7/2017 | Kummer et al. |
| 2017/0234559 A1 | 8/2017 | Federspiel et al. |
| 2017/0241658 A1 | 8/2017 | Salsbury et al. |
| 2017/0246331 A1 | 8/2017 | Lloyd |
| 2017/0300657 A1 | 10/2017 | Barrett et al. |
| 2017/0350611 A1 | 12/2017 | Su et al. |
| 2017/0351832 A1 | 12/2017 | Cahan et al. |
| 2018/0004171 A1 | 1/2018 | Patel et al. |
| 2018/0004172 A1 | 1/2018 | Patel et al. |
| 2018/0004173 A1 | 1/2018 | Patel et al. |
| 2018/0011459 A1 | 1/2018 | Boettcher et al. |
| 2018/0031533 A1 | 2/2018 | Rawat et al. |
| 2018/0052431 A1 | 2/2018 | Shaikh et al. |
| 2018/0075549 A1 | 3/2018 | Turney et al. |
| 2018/0087791 A1 | 3/2018 | Monkkonen et al. |
| 2018/0100663 A1 | 4/2018 | Crimins et al. |
| 2018/0110416 A1 | 4/2018 | Masuda et al. |
| 2018/0117209 A1 | 5/2018 | Clack et al. |
| 2018/0150601 A1 | 5/2018 | Astigarraga |
| 2018/0157535 A1* | 6/2018 | Dushok ............... G06F 11/3433 |
| 2018/0163987 A1 | 6/2018 | Rackes et al. |
| 2018/0196456 A1 | 7/2018 | Elbsat |
| 2018/0197253 A1 | 7/2018 | Elbsat et al. |
| 2018/0209674 A1 | 7/2018 | Ridder et al. |
| 2018/0209675 A1 | 7/2018 | Ridder |
| 2018/0224814 A1 | 8/2018 | Elbsat et al. |
| 2018/0254632 A1 | 9/2018 | Elbsat et al. |
| 2018/0259918 A1 | 9/2018 | Asmus et al. |
| 2018/0285800 A1 | 10/2018 | Wenzel et al. |
| 2018/0299151 A1 | 10/2018 | Ajax et al. |
| 2018/0306459 A1 | 10/2018 | Turney |
| 2018/0313563 A1 | 11/2018 | Turney et al. |
| 2018/0314220 A1 | 11/2018 | Kumar et al. |
| 2018/0318746 A1 | 11/2018 | Thomas |
| 2018/0329374 A1 | 11/2018 | Kelly et al. |
| 2018/0340704 A1 | 11/2018 | Turney et al. |
| 2018/0341255 A1 | 11/2018 | Turney et al. |
| 2018/0356770 A1 | 12/2018 | Elbsat et al. |
| 2018/0356782 A1 | 12/2018 | Elbsat et al. |
| 2018/0357577 A1 | 12/2018 | Elbsat et al. |
| 2018/0372355 A1 | 12/2018 | Mosamkar et al. |
| 2018/0372362 A1 | 12/2018 | Turney et al. |
| 2018/0375444 A1 | 12/2018 | Gamroth |
| 2019/0011145 A1 | 1/2019 | Willmott et al. |
| 2019/0020203 A1 | 1/2019 | Lang et al. |
| 2019/0023099 A1 | 1/2019 | Li et al. |
| 2019/0025774 A1 | 1/2019 | Wenzel et al. |
| 2019/0032942 A1 | 1/2019 | Willmott et al. |
| 2019/0032943 A1 | 1/2019 | Willmott et al. |
| 2019/0032944 A1 | 1/2019 | Wenzel et al. |
| 2019/0032945 A1 | 1/2019 | Willmott et al. |
| 2019/0032947 A1 | 1/2019 | Willmott et al. |
| 2019/0032949 A1 | 1/2019 | Willmott et al. |
| 2019/0052120 A1 | 2/2019 | Huang et al. |
| 2019/0056126 A1 | 2/2019 | Law et al. |
| 2019/0066236 A1 | 2/2019 | Wenzel |
| 2019/0079473 A1 | 3/2019 | Kumar et al. |
| 2019/0096233 A1 | 3/2019 | Bruck et al. |
| 2019/0107825 A1 | 4/2019 | Wenzel et al. |
| 2019/0108746 A1 | 4/2019 | Chang et al. |
| 2019/0148023 A1 | 5/2019 | Sadilek et al. |
| 2019/0163213 A1 | 5/2019 | Ostrye et al. |
| 2019/0163216 A1 | 5/2019 | Ostrye |
| 2019/0182069 A1 | 6/2019 | Gervais |
| 2019/0209806 A1 | 7/2019 | Allen et al. |
| 2019/0213695 A1 | 7/2019 | Elbsat et al. |
| 2019/0219293 A1 | 7/2019 | Wenzel et al. |
| 2019/0235453 A1 | 8/2019 | Turney et al. |
| 2019/0245368 A1 | 8/2019 | Baumgartner et al. |
| 2019/0249897 A1 | 8/2019 | Alcala Perez et al. |
| 2019/0257544 A1 | 8/2019 | Alanqar et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0331358 A1 | 10/2019 | Ritmanich et al. |
| 2019/0338974 A1 | 11/2019 | Turney et al. |
| 2019/0339661 A1 | 11/2019 | Pancholi et al. |
| 2019/0340709 A1 | 11/2019 | Elbsat |
| 2019/0347622 A1 | 11/2019 | Elbsat et al. |
| 2020/0026249 A1 | 1/2020 | Przybylski et al. |
| 2020/0041158 A1 | 2/2020 | Turney et al. |
| 2020/0090089 A1 | 3/2020 | Aston et al. |
| 2020/0090289 A1 | 3/2020 | Elbsat et al. |
| 2020/0096958 A1* | 3/2020 | Kelly .................. G06Q 10/08 |
| 2020/0096985 A1 | 3/2020 | Wenzel et al. |
| 2020/0103127 A1 | 4/2020 | Chen et al. |
| 2020/0110531 A1 | 4/2020 | Sarang et al. |
| 2020/0124307 A1* | 4/2020 | Ota ..................... F24F 11/89 |
| 2020/0125045 A1 | 4/2020 | Risbeck et al. |
| 2020/0132328 A1 | 4/2020 | Boettcher et al. |
| 2020/0141604 A1 | 5/2020 | Chen et al. |
| 2020/0149768 A1 | 5/2020 | Turney et al. |
| 2020/0193345 A1 | 6/2020 | Elbsat et al. |

(56) References Cited

U.S. PATENT DOCUMENTS

| | | | |
|---|---|---|---|
| 2020/0193346 A1 | 6/2020 | Elbsat et al. | |
| 2020/0200416 A1 | 6/2020 | Granger et al. | |
| 2020/0218208 A1 | 7/2020 | Alanqar et al. | |
| 2020/0218991 A1 | 7/2020 | Alanqar et al. | |
| 2020/0227159 A1* | 7/2020 | Boisvert | G05B 15/02 |
| 2020/0292186 A1 | 9/2020 | Ishibashi et al. | |
| 2020/0301408 A1 | 9/2020 | Elbsat et al. | |
| 2020/0319610 A1 | 10/2020 | Ray et al. | |
| 2020/0327371 A1 | 10/2020 | Sharma et al. | |
| 2020/0334967 A1 | 10/2020 | Sharma et al. | |
| 2020/0348038 A1 | 11/2020 | Risbeck et al. | |
| 2020/0355391 A1 | 11/2020 | Wenzel et al. | |
| 2020/0356087 A1 | 11/2020 | Elbsat et al. | |
| 2020/0365229 A1 | 11/2020 | Fields et al. | |
| 2020/0371482 A1 | 11/2020 | Alanqar et al. | |
| 2020/0372588 A1 | 11/2020 | Shi | |
| 2020/0406778 A1 | 12/2020 | Langton et al. | |
| 2021/0010701 A1 | 1/2021 | Nesler et al. | |
| 2021/0011443 A1 | 1/2021 | McNamara et al. | |
| 2021/0011444 A1 | 1/2021 | Risbeck et al. | |
| 2021/0018211 A1 | 1/2021 | Ellis et al. | |
| 2021/0025613 A1 | 1/2021 | Knatchbull-Hugessen et al. | |
| 2021/0072742 A1 | 3/2021 | Wu et al. | |
| 2021/0108821 A1 | 4/2021 | Turney et al. | |
| 2021/0125114 A1 | 4/2021 | Lin et al. | |
| 2021/0148592 A1 | 5/2021 | Turney et al. | |
| 2021/0173366 A1 | 6/2021 | Turney et al. | |
| 2021/0200169 A1 | 7/2021 | Ploegert et al. | |
| 2021/0209532 A1 | 7/2021 | Wenzel et al. | |
| 2021/0270490 A1 | 9/2021 | Turney et al. | |
| 2021/0284040 A1 | 9/2021 | Grunkemeyer et al. | |
| 2021/0302052 A1 | 9/2021 | Trinh | |
| 2021/0318010 A1 | 10/2021 | Federspiel et al. | |
| 2021/0356916 A1 | 11/2021 | Wenzel et al. | |
| 2021/0364181 A1 | 11/2021 | Risbeck et al. | |
| 2021/0373973 A1 | 12/2021 | Ekins et al. | |
| 2021/0393834 A1 | 12/2021 | Wellig | |
| 2022/0011731 A1 | 1/2022 | Risbeck et al. | |
| 2022/0035326 A1 | 2/2022 | Peters et al. | |
| 2022/0042704 A1 | 2/2022 | Drees et al. | |
| 2022/0054687 A1 | 2/2022 | Forzani et al. | |
| 2022/0065479 A1 | 3/2022 | Douglas et al. | |
| 2022/0092500 A1 | 3/2022 | Drees et al. | |
| 2022/0118875 A1 | 4/2022 | Astorg et al. | |
| 2022/0137580 A1 | 5/2022 | Burroughs et al. | |
| 2022/0148102 A1 | 5/2022 | Elbsat et al. | |
| 2022/0172830 A1* | 6/2022 | Brooks | G16H 40/67 |
| 2022/0203287 A1 | 6/2022 | Wenger et al. | |
| 2022/0203288 A1 | 6/2022 | Wenger et al. | |
| 2022/0205962 A1 | 6/2022 | Vanderkoy | |
| 2022/0207215 A1 | 6/2022 | Liu et al. | |
| 2022/0228756 A1 | 7/2022 | Gupta et al. | |
| 2022/0254483 A1 | 8/2022 | Boisvert et al. | |
| 2022/0277851 A1 | 9/2022 | Wellig | |
| 2022/0282886 A1 | 9/2022 | Hriljac et al. | |
| 2022/0305438 A1 | 9/2022 | Wenger et al. | |
| 2022/0305881 A1 | 9/2022 | Neu et al. | |
| 2022/0381471 A1 | 12/2022 | Wenzel et al. | |
| 2022/0390137 A1 | 12/2022 | Wenzel et al. | |
| 2022/0404049 A1 | 12/2022 | Chang et al. | |
| 2022/0404051 A1 | 12/2022 | Chang et al. | |
| 2023/0020417 A1 | 1/2023 | Elbsat et al. | |
| 2023/0120290 A1 | 4/2023 | Byrne et al. | |
| 2023/0250988 A1 | 8/2023 | Risbeck et al. | |
| 2023/0253787 A1 | 8/2023 | Wenzel et al. | |
| 2023/0324864 A1 | 10/2023 | Bursch et al. | |
| 2023/0350365 A1 | 11/2023 | Wenzel et al. | |
| 2024/0321438 A1 | 9/2024 | Byrne et al. | |

FOREIGN PATENT DOCUMENTS

| | | |
|---|---|---|
| CA | 3043996 A1 | 2/2018 |
| CN | 2644960 Y | 9/2004 |
| CN | 1916514 A | 2/2007 |
| CN | 101194129 A | 6/2008 |
| CN | 201173923 Y | 12/2008 |
| CN | 101387428 A | 3/2009 |
| CN | 101692025 A | 4/2010 |
| CN | 201517972 U | 6/2010 |
| CN | 201558243 U | 8/2010 |
| CN | 101861552 A | 10/2010 |
| CN | 202568950 U | 12/2012 |
| CN | 203727247 U | 7/2014 |
| CN | 105805888 A | 7/2016 |
| CN | 106415139 A | 2/2017 |
| CN | 106975279 A | 7/2017 |
| CN | 107250928 A | 10/2017 |
| CN | 107252594 A | 10/2017 |
| CN | 107477782 A | 12/2017 |
| CN | 107613895 A | 1/2018 |
| CN | 207035361 U | 2/2018 |
| CN | 107787469 A | 3/2018 |
| CN | 107917484 A | 4/2018 |
| CN | 108507057 A | 9/2018 |
| CN | 108779925 A | 11/2018 |
| CN | 108980988 A | 12/2018 |
| CN | 109196286 A | 1/2019 |
| CN | 109405151 A | 3/2019 |
| CN | 110991764 A | 4/2020 |
| CN | 111370135 A | 7/2020 |
| EP | 1 156 286 A2 | 11/2001 |
| EP | 3 186 687 A4 | 7/2017 |
| EP | 3 497 377 A1 | 6/2019 |
| FR | 3031800 A1 | 7/2016 |
| JP | 2010-128976 A | 6/2010 |
| JP | 2012-533720 A | 12/2012 |
| JP | 2015-152175 A | 8/2015 |
| JP | 2016-138705 A | 8/2016 |
| JP | 06-455326 B2 | 1/2019 |
| KR | 20160137767 A | 12/2016 |
| KR | 20170096092 A | 8/2017 |
| KR | 20170115913 A | 10/2017 |
| KR | 101865143 B1 | 6/2018 |
| WO | WO-2005/071815 A1 | 8/2005 |
| WO | WO-2009/157847 A1 | 12/2009 |
| WO | WO-2012/161804 A1 | 11/2012 |
| WO | WO-2013/130956 A1 | 9/2013 |
| WO | WO-2013/186282 A2 | 12/2013 |
| WO | WO-2016/047103 A1 | 3/2016 |
| WO | WO-2017/109206 A1 | 6/2017 |
| WO | WO-2017/203031 A1 | 11/2017 |
| WO | WO-2018/160412 A1 | 9/2018 |
| WO | WO-2018/226564 A1 | 12/2018 |
| WO | WO-2019/050154 A1 | 3/2019 |
| WO | WO-2019/051893 A1 | 3/2019 |
| WO | WO-2020/170338 A1 | 8/2020 |
| WO | WO-2022/251700 A1 | 12/2022 |

OTHER PUBLICATIONS

Chang et al., "A cost-effectiveness assessment of the operational parameters of central HVAC systems during pandemics," Building Simulation, Nov. 2022, vol. 16 (pp. 667-682).

Noakes et al., "Modeling infection risk and energy use of upper-room Ultraviolet Germicidal Irradiation systems in multi-room environments," Jan. 2015, Science and Technology for the Built Environment, vol. 21, No. 1 (pp. 99-111).

Villafruela et al., "Comparison of air change efficiency, contaminant removal effectiveness and infection risk as IAQ indices in isolation rooms," Energy and Buildings, Mar. 2012, vol. 57 (pp. 210-219).

Xu et al., "Simulation-based trade-off modeling for indoor infection risk of airborne diseases, energy consumption, and thermal comfort," Journal of Building Engineering, Jan. 2023, vol. 76, No. 107137 (pp. 1-16).

Yan et al., "Evaluating SARS-CoV-2 airborne quanta transmission and exposure risk in a mechanically ventilated multi zone office building," Building and Environment, Feb. 2022, vol. 219, No. 109184 (pp. 1-15).

U.S. Appl. No. 17/668,791, filed Feb. 10, 2022, Johnson Controls Tyco IP Holdings LLP.

U.S. Appl. No. 63/194,771, filed May 28, 2021, Johnson Controls Technology Company.

(56) References Cited

OTHER PUBLICATIONS

U.S. Appl. No. 63/220,878, filed Jul. 12, 2021, Johnson Controls Tyco IP Holdings LLP.
Chinese Office Action on CN Appl. No. 202080057416.0 dated Dec. 30, 2022 (12 pages).
Chinese Office Action on CN Appl. No. 202080061895.3 dated Jan. 20, 2023 (6 pages).
European Office Action on EP Appl. No. 20750965.4 dated Mar. 31, 2023 (5 pages).
Invitation to Pay Additional Fees and, Where Applicable, Protest Fee on PCT Appl. No. PCT/US2022/031438 dated Sep. 2, 2022 (14 pages).
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
International Search Report and Written Opinion on PCT Appl. No. PCT/US2022/031438 dated Nov. 8, 2022 (18 pages).
International Search Report and Written Opinion on PCT Appl. No. PCT/US2022/040332 dated Nov. 22, 2022 (18 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
International Search Report and Written Opinion on International Appl. Ser. No. PCT/US2018/039119 dated Oct. 5, 2018 (9 pages).
International Search Report and Written Opinion on PCT Appl. Ser. No. PCT/US2020/041770, dated Nov. 3, 2020, 13 pages.
International Search Report and Written Opinion on PCT Appl. Ser. No. PCT/US2020/041792, dated Sep. 30, 15 pages.
International Search Report and Written Opinion on PCT Appl. Ser. No. PCT/US2020/041845, dated Jan. 13, 2021, 20 pages.

(56) References Cited

OTHER PUBLICATIONS

Azimi et al., "HVAC filtration for controlling infectious airborne disease transmission in indoor environments: Predicting risk reductions and operational costs," Building and Environment, May 2013, vol. 70 (pp. 150-160).
Beggs et al., "Potential for airborne transmission of infection in the waiting areas of healthcare premises: stochastic analysis using a Monte Carlo model," BMC Infectious Diseases, Aug. 2010, vol. 10 (11 pages).
Ben-David et al., "Interplay of ventilation and filtration: Differential analysis of cost function combining energy use and indoor exposure to PM2.5 and ozone," Building and Environment, Aug. 2017, vol. 128 (pp. 320-335).
Gao et al., "Potential impact of a ventilation intervention for influenza in the context of a dense indoor contact network in Hong Kong," Science of the Total Environment, Apr. 2016, vols. 569-570 (pp. 373-381).
EPO Provisional Opinion Accompanying the Partial Search Result for PCT Appl. Ser. No. PCT/US2023/012719 dated Mar. 28, 2023 (15 pages).
PCT Invitation to Pay Additional Fees and Where Applicable, Protest Fee for Appl. Ser. No. PCT/US2023/020060 dated Jul. 18, 2023 (14 pages).
Yang et al., "Multi-Objective Particle Swarm Optimization for decision-making in building automation," Power and Energy Society General Meeting, Jul. 24, 2011, IEEE (pp. 1-5).
Noakes et al., "Applying the Wells-Riley equation to the risk of airborne infection in hospital environments: The importance of stochastic and proximity effects," Indoor Air 2008, The 11th Intl Conference on Indoor Air Quality and CI, Aug. 17-22, 2008, Copenhagen, Denmark (9 pages).
Chinese Office Action on CN Appl. No. 202080061895.3 dated Sep. 25, 2023 (12 pages with English machine translation).
International Search Report and Written Opinion on PCT Appl. No. PCT/US2023/020060 dated Sep. 15, 2023 (20 pages).
Chinese Office Action on CN Appl. No. 202080057416.0 dated Aug. 30, 2023 (37 pages with English language translation).
Cai et al., "Nationwide assessment of energy costs and policies to limit airborne infection risks in U.S. schools," Journal of Building Engineering, Jul. 2021, vol. 45 (pp. 1-12).
European Office Action on EP Appl. No. 20751421.7 dated Jul. 16, 2024 (5 pages).
Faulkner et al., "Tradeoffs among indoor air quality, financial costs, and CO2 emissions for HVAC operation strategies to mitigate indoor virus in U.S. office buildings," Building and Environment, Mar. 2022, vol. 221 (pp. 1-15).
Lee et al., "Life-Cycle Cost Simulation of In-Duct Ultraviolet Germicidal Irradiation Systems," Eleventh International IBPSA Conference, Glasgow, Scotland, Jul. 27-30, 2009 (pp. 1159-1166).
U.S. Appl. No. 17/582,988, filed Jan. 24, 2022, Johnson Controls Tyco IP Holdings LLP.
U.S. Appl. No. 17/686,320, filed Mar. 3, 2022, Johnson Controls Tyco IP Holdings LLP.
U.S. Appl. No. 17/733,786, filed Apr. 29, 2022, Johnson Controls Tyco IP Holdings LLP.
Aghniaey et al., "The Assumption of Equidistance in the Seven-Point Thermal Sensation Scale and a Comparison between Categorical and Continuous Metrics," University of Georgia College of Engineering, Jan. 18, 2019, 4 pages.
Aliabadi et al., "Preventing Airborne Disease Transmission: Review of Methods for Ventilation Design in Health Care Facilities," SAGE—Hindawi Access to Research Advances in Preventive Medicine, Feb. 2011, vol. 2011, 21 pages.
Azimi et al, "HVAC filtration for controlling infectious airborne disease transmission in indoor environments: Predicting risk reductions and operational costs," Building and Environment, May 13, 2013, 70, pp. 150-160.

Batterman et al., "Review and Extension of CO2-Based Methods to Determine Ventilation Rates with Application to School Classrooms," International Journal of Environmental Research and Public Health, Feb. 4, 22 pages.
Buaonanno et al., "Estimation of Airborne Viral Emission: Quanta Emission Rate of SARS-CoV-2 for Infection Risk Assessment," Environment International, 2020, 141, 105794, 9 pages.
CDC—Centers for Disease Control and Prevention, "How Flu Spreads," URL: https://www.cdc.gov/flu/about/disease/spread.htm, Aug. 27, 2018, 1 page.
CDC—Centers for Disease Control and Prevention, "Interim Clinical Guidance for Management of Patients with Confirmed Coronavirus Disease (COVID_19), " URL: https://www.cdc.gov/coronavirus/2019-ncov/hcp/clinical-guidance-management-patients.html, Feb. 2021, 14 pages.
Chen et al., "Occupant Feedback Based Model Predictive Control for Thermal Comfort and Energy Optimization: A Chamber Experimental Evaluation," Applied Energy, 2016, 164, pp. 341-351.
Ching, "An empirical drag coefficient model for simulating the dispersion and deposition of bioaerosol particles in ventilated environments," The Hong Kong Polytechnic University Department of Building Services Engineering, Jun. 2016, 345 pages.
CIRES—Cooperative Institute for Research in Environmental Sciences, "COVID-19 Airborne Transmission Tool Available: New model estimates COVID-19 transmission in classrooms, buses, protests, more," URL: https://cires.colorado.edu/news/covid-19-airborne-transmission-tool-available, Jun. 25, 2020, 7 pages.
Copeland, "The Impact of Patient Room Design on Airborne Hospital-Acquired Infections (HAI)," Thesis, Kent State University, Degree of Masters of Science in Architecture and Environmental Design, May 2016, 61 pages.
EPA—U.S. Environmental Protection Agency, "Exposure Factors Handbook," URL: https://www.epa.gov/expobox/about-exposure-factors-handbook, 2011, 6 pages.
EPA—U.S. Environmental Protection Agency, "Greenhouse Gases Equivalences Sep. 30, 2021 Calculator-Calculations and References", URL: https://www.epa.gov/energy/greenhouse-gases-equivalencies-calculator-calculations-and-references, retrieved from the internet 973003094, 32 pages.
Fears et al., "Comparative Dynamic Aerosol Efficiencies of Three Emergent Coronaviruses and the Unusual Persistence of Sars-Cov-2 in Aerosol Suspensions," URL: https://www.ncbi.nlm.nih.gov/pmc/articles/PMC7217084/, Apr. 18, 2020, 8 pages.
Hubert et al., Modeling for Residential Electricity Optimization in Dynamic Pricing Environments, IEEE Transactions On Smart Grid, IEEE, USA, Dec. 1, 2012, vol. 3, No. 4 (pp. 2224-2231).
International Preliminary Report on Patentability on PCT Appl. Ser. No. PCT/US2020/041770 dated Jan. 27, 2022 (8 pages).
International Preliminary Report on Patentability on PCT Appl. Ser. No. PCT/US2020/041792 dated Jan. 27, 2022 (9 pages).
International Preliminary Report on Patentability on PCT Appl. Ser. No. PCT/US2020/041845 dated Jan. 27, 2022 (12 pages).
International Preliminary Report Patentability on PCT Appl. Ser. No. PCT/US2018/039119 dated Jan. 2, 2020 (7 pages).
Joe et al., "Methodology for Modeling the Microbial Contamination of Air Filters," PLoS One 9(2) e88514, URL: https://doi.org/10.1371/journal.pone.0088514, Feb. 11, 2014, 9 pages.
Johnson et al., "Modality of human expired aerosol size distributions," Journal of Aerosol Science, 2011, 42(12), pp. 839-851.
Kanaan et al., "New airborne pathogen transport model for upper-room UVGI spaces conditioned by chilled ceiling and mixed displacement ventilation: Enhancing air quality and energy performance," Energy Conversion and Management, Apr. 12, 2014, 85, pp. 50-61.
Kang et al., "Novel Modeling and Control Strategies for a HVAC System Including Carbon Dioxide Control," Energies, Jun. 2, 2014, 7, pp. 3599-3617.
Kowalski, W., "Ultraviolet germicidal irradiation handbook: UVGI for air and surface disinfection," Springer Science & Business Media, 2010, 504 pages.

(56) References Cited

OTHER PUBLICATIONS

Kumar, "A Simulation Framework to Characterize the Effect of Ventilation Control on Airborne Infectious Disease Transmission in Schools," Thesis, Graduate School of The University of Texas at Austin, May 2019, 53 pages.
Lampinen, "Thermodynamics of Humid Air," Sep. 2015, 39 Pages.
Liao et al., "A Probabilistic Transmission Dynamic Model to Assess Indoor Airborne Infection Risks," Risk Analysis, 2005, vol. 25, No. 5, pp. 1097-1107.
Ljung, System Identification: Theory for the User, 1999, 2nd ed., Prentice Hall PTR, Upper Saddle River, 63 pages.
Luo, "Maximizing Thermal Comfort and International Design: Predicting Thermal Comfort in Mixed-mode Office Building in the UK," Loughborough University, Jan. 18, 2019, 4 pages.
Marr et al., "SARS-CoV-2 in Indoor Air: Principles and Scenarios," US EPA Indoor Air Quality Science Webinar, YouTube URL: https://www.youtube.com/watch?v=fSQ0ah_OArU, Jul. 21, 2020, 113 pages.
National Geographic, "Measure the risk of airborne COVID-19 in your office, classroom, or bus ride," URL: https://www.nationalgeographic.com/science/article/how-to-measure-risk-airborne-coronavirus-your-office-classroom-bus-ride-cvd, Aug. 11, 2020, 12 pages.
Noakes et al., "Modelling the transmission of airborne infections in enclosed spaces," Epidemiol. Infect, 2006, vol. 134, pp. 1082-1091.
Stephens, "HVAC filtration and the Wells-Riley approach to assessing risks of infectious airborne diseases," The National Air Filtration Association (NAFA) Foundation, Mar. 1, 2012, 47 pages.
Sudhakaran et al., "Temperature, Relative Humidity, and Carbon-Dioxide Modulation in a Near-Zero Energy Efficient Retrofit House," Purdue University, 2016, 11 pages.
Sze et al., "Review and Comparison Between the Wells-Riley and Dose-Response Approaches to Risk Assessment of Infectious Respiratory Diseases," Indoor Air, 2010, 20, pp. 2-16.
Van Doremalen et al., "Aerosol and Surface Stability of SARS-CoV-2 as Compared with SARS-CoV-1," URL: https://www.nejm.org/doi/full/10.1056/nejmc2004973, Mar. 17, 2020, 5 pages.
Weekly et al., "Modeling and Estimation of the Humans' Effect on the CO2 Dynamics Inside a Conference Room," IEEE Transactions on Control Systems Technology, Sep. 2015, 23.5, 12 pages.
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
International Search Report and Written Opinion on PCT Appl. Ser. No. PCT/US2023/012719 dated May 22, 2023 (20 pages).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems—A Review," 2013 IEEE International Conference on Automation Science and Engineering (CASE), Madison, WI, United States, Aug. 17- 20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486) Jul. 2005.
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildinqs," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).

(56) References Cited

OTHER PUBLICATIONS

Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

FIG. 10

SYSTEMS AND METHODS FOR ASSESSING AND CONTROLLING SUSTAINABILITY OF AN ENERGY PLANT

CROSS-REFERENCE TO RELATED PATENT APPLICATIONS

This application is a continuation-in-part of U.S. patent application Ser. No. 17/692,642 filed Mar. 11, 2022, which is a continuation of U.S. patent application Ser. No. 16/655,745, filed Oct. 17, 2019 (now U.S. Pat. No. 11,276,125), which claims the benefit of and priority to Indian Provisional Patent Application No. 201821039497, filed Oct. 18, 2018. This application is also a continuation-in-part of U.S. patent application Ser. No. 17/483,078 filed Sep. 23, 2021, which claims the benefit of and priority to U.S. Provisional Application No. 63/194,771, filed May 28, 2021, and U.S. Provisional Application No. 63/220,878, filed Jul. 12, 2021. U.S. patent application Ser. No. 17/483,078 is also a continuation-in-part of U.S. application Ser. No. 17/403,669, filed Aug. 16, 2021, which is a continuation-in-part of U.S. application Ser. No. 16/927,759 filed Jul. 13, 2020 (now U.S. Pat. No. 11,269,306), which claims the benefit of and priority to U.S. Provisional Patent Application No. 62/873,631 filed Jul. 12, 2019, and U.S. Provisional Patent Application No. 63/044,906 filed Jun. 26, 2020. U.S. patent application Ser. No. 17/403,669 is also a continuation-in-part of U.S. patent application Ser. No. 17/393,138 filed Aug. 3, 2021, which is a continuation of U.S. patent application Ser. No. 16/927,766 filed Jul. 13, 2020 (now U.S. Pat. No. 11,131,473), which claims the benefit of and priority to U.S. Provisional Patent Application No. 62/873,631 filed Jul. 12, 2019, and U.S. Provisional Patent Application No. 63/044,906 filed Jun. 26, 2020. The entire disclosures of each of these patent applications and patents are incorporated by reference herein.

BACKGROUND

The present disclosure relates generally to a central plant or central energy facility configured to serve the energy loads of a building or campus. The present disclosure relates more particularly to determining an optimal configuration of a central plant from various plant designs using simulation data.

A central plant typically include multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

A central plant can be designed and simulated digitally to optimize performance under various loads and conditions. Several plant designs can be compared against each with respect to total energy usage and/or energy efficiency. However, the most energy-efficient plant design may not necessarily be the most economically feasible. Rather, an investment appraisal analyzing the long-term profitability of a plant design is needed to determine if the plant design is worth implementing.

SUMMARY

One implementation of the present disclosure is a system for controlling building equipment. The system includes one or more processors and one or more non-transitory computer-readable media storing instructions that, when executed by the one or more processors, cause the one or more processors to perform operations including simulating operation of the building equipment at a plurality of initial points to generate corresponding values of a first control objective and a second control objective that competes with the first control objective, automatically generating a new point at which to run a new simulation based on the plurality of initial points and the corresponding values of the first control objective and the second control objective, running the new simulation at the new point to generate corresponding values of the first control objective and the second control objective, classifying a subset of the plurality of initial points and the new point as Pareto-optimal points based on the corresponding values of the first control objective and the second control objective, and operating the building equipment at a Pareto-optimal point selected from the subset of the plurality of initial points and the new point classified as Pareto-optimal points.

In some embodiments, each of the plurality of initial points and the new point defines a different simulation configuration comprising different values for one or more elements of a simulated system comprising the building equipment.

In some embodiments, simulating the operation of the building equipment at the plurality of initial points comprises running an initial simulation for each of the plurality of initial points, each initial simulation generating a corresponding value of the first control objective and a corresponding value of the second control objective.

In some embodiments, automatically generating the new point at which to run the new simulation comprises executing a process configured to suggest one or more Pareto-optimal points based on the plurality of initial points and the corresponding values of the first control objective and the second control objective.

In some embodiments, automatically generating the new point at which to run the new simulation comprises constructing an approximation function based on the plurality of initial points and the corresponding values of the first control objective and the second control objective for the plurality of initial points and finding a point that approximately optimizes the approximation function.

In some embodiments, the operations further include generating an updated dataset comprising the plurality of initial points, the new point, and the corresponding values of the first control objective and the second control objective for the plurality of initial points and the new point and automatically generating a second new point at which to run a second new simulation based on the updated dataset.

In some embodiments, the operations further include providing a user interface that indicates the subset of the plurality of initial points and the new point classified as Pareto-optimal points and receiving a user selection of the Pareto-optimal point at which to operate the building equipment via the user interface.

In some embodiments, the operations further include providing a user interface comprising values of a set of performance metrics comprising at least the first control objective and the second control objective, each set of performance metrics predicted to result from operating the building equipment at one of the plurality of initial points.

In some embodiments, the operations further include adjusting weights assigned to a plurality of performance metrics characterizing the operation of the building equipment at the plurality of initial points and assigning a score to each of the plurality of initial points, each score based on (i) values of the plurality of performance metrics predicted to result from operating the building equipment at the plurality of initial points and (ii) the weights assigned to the plurality of performance metrics.

In some embodiments, the operations further include assigning a score to each of the plurality of initial points based on values of a plurality of performance metrics predicted to result from operating the building equipment at the plurality of initial points and providing a user interface that arranges the plurality of initial points according to the score assigned to each of the plurality of initial points.

Another implementation of the present disclosure is a method for controlling building equipment. The method includes simulating operation of the building equipment at a plurality of initial points to generate corresponding values of a first control objective and a second control objective that competes with the first control objective, automatically generating a new point at which to run a new simulation based on the plurality of initial points and the corresponding values of the first control objective and the second control objective, running the new simulation at the new point to generate corresponding values of the first control objective and the second control objective, classifying a subset of the plurality of initial points and the new point as Pareto-optimal points based on the corresponding values of the first control objective and the second control objective, and operating the building equipment at a Pareto-optimal point selected from the subset of the plurality of initial points and the new point classified as Pareto-optimal points.

In some embodiments, each of the plurality of initial points and the new point defines a different simulation configuration comprising different values for one or more elements of a simulated system comprising the building equipment.

In some embodiments, simulating the operation of the building equipment at the plurality of initial points comprises running an initial simulation for each of the plurality of initial points, each initial simulation generating a corresponding value of the first control objective and a corresponding value of the second control objective.

In some embodiments, automatically generating the new point at which to run the new simulation comprises executing a process configured to suggest one or more Pareto-optimal points based on the plurality of initial points and the corresponding values of the first control objective and the second control objective.

In some embodiments, automatically generating the new point at which to run the new simulation includes constructing an approximation function based on the plurality of initial points and the corresponding values of the first control objective and the second control objective for the plurality of initial points and finding a point that approximately optimizes the approximation function.

In some embodiments, the method further includes generating an updated dataset comprising the plurality of initial points, the new point, and the corresponding values of the first control objective and the second control objective for the plurality of initial points and the new point and automatically generating a second new point at which to run a second new simulation based on the updated dataset.

In some embodiments, the method further includes providing a user interface that indicates the subset of the plurality of initial points and the new point classified as Pareto-optimal points and receiving a user selection of the Pareto-optimal point at which to operate the building equipment via the user interface.

In some embodiments, the method further includes providing a user interface comprising values of a set of performance metrics comprising at least the first control objective and the second control objective, each set of performance metrics predicted to result from operating the building equipment at one of the plurality of initial points.

In some embodiments, the method further includes adjusting weights assigned to a plurality of performance metrics characterizing the operation of the building equipment at the plurality of initial points and assigning a score to each of the plurality of initial points, each score based on (i) values of the plurality of performance metrics predicted to result from operating the building equipment at the plurality of initial points and (ii) the weights assigned to the plurality of performance metrics.

Another implementation of the present disclosure is a system for controlling building equipment including one or more processors and one or more non-transitory computer-readable media storing instructions that, when executed by the one or more processors, cause the one or more processors to perform operations. The operations include providing a user interface comprising a plurality of control objectives and configured to receive user-selected weights for the plurality of control objectives, generating, based on the user-selected weights, a list of simulation results comprising values of the plurality of control objectives predicted to result from operating the building equipment according to control strategies corresponding to the simulation results, receiving a user selection of a simulation result from the list of simulation results via the user interface, and performing an automated action for the building equipment using the simulation result selected by the user.

In some embodiments, the plurality of control objectives include a carbon emissions control objective and a second control objective that competes with the carbon emissions control objective.

In some embodiments, generating the list of simulation results includes assigning the user-selected weights to the plurality of control objectives in an objective function and simulating operation of the building equipment using the objective function to generate the simulation results and the control strategies corresponding to the simulation results.

In some embodiments, generating the list of simulation results includes generating scores for the simulation results based on the user-selected weights and the values of the plurality of control objectives in the simulation results and ordering the simulation results based on the scores, wherein the list of simulation results is an ordered list in which the simulation results are ordered based on the scores.

In some embodiments, generating the list of simulation results includes evaluating whether the simulation results satisfy a constraint based on the values of the plurality of control objectives in the simulation results and arranging the simulation results into the list of simulation based on which of the simulation results satisfy the constraint.

In some embodiments, generating the list of simulation results includes evaluating whether the simulation results satisfy a constraint based on the values of the plurality of control objectives in the simulation results and removing a non-compliant simulation result from the list of simulation results responsive to determining that the non-compliant simulation result does not satisfy the constraint.

In some embodiments, the operations further include automatically generating a new point at which to run a new simulation based on a plurality of initial points used to generate the simulation results and the values of the plurality of control objectives in the simulation results and running the new simulation at the new point to generate a new simulation result comprising new values of the plurality of control objectives.

In some embodiments, the operations further include classifying a subset of the simulation results as Pareto-optimal based on the values of the plurality of control objectives in the simulation results and operating the building equipment according to a control strategy corresponding to a Pareto-optimal simulation result.

BRIEF DESCRIPTION OF THE DRAWINGS

FIG. 10 is another illustration of a user interface associated with the planning tool of FIG. 6, according to some embodiments.

DETAILED DESCRIPTION

Overview

Figure 1:
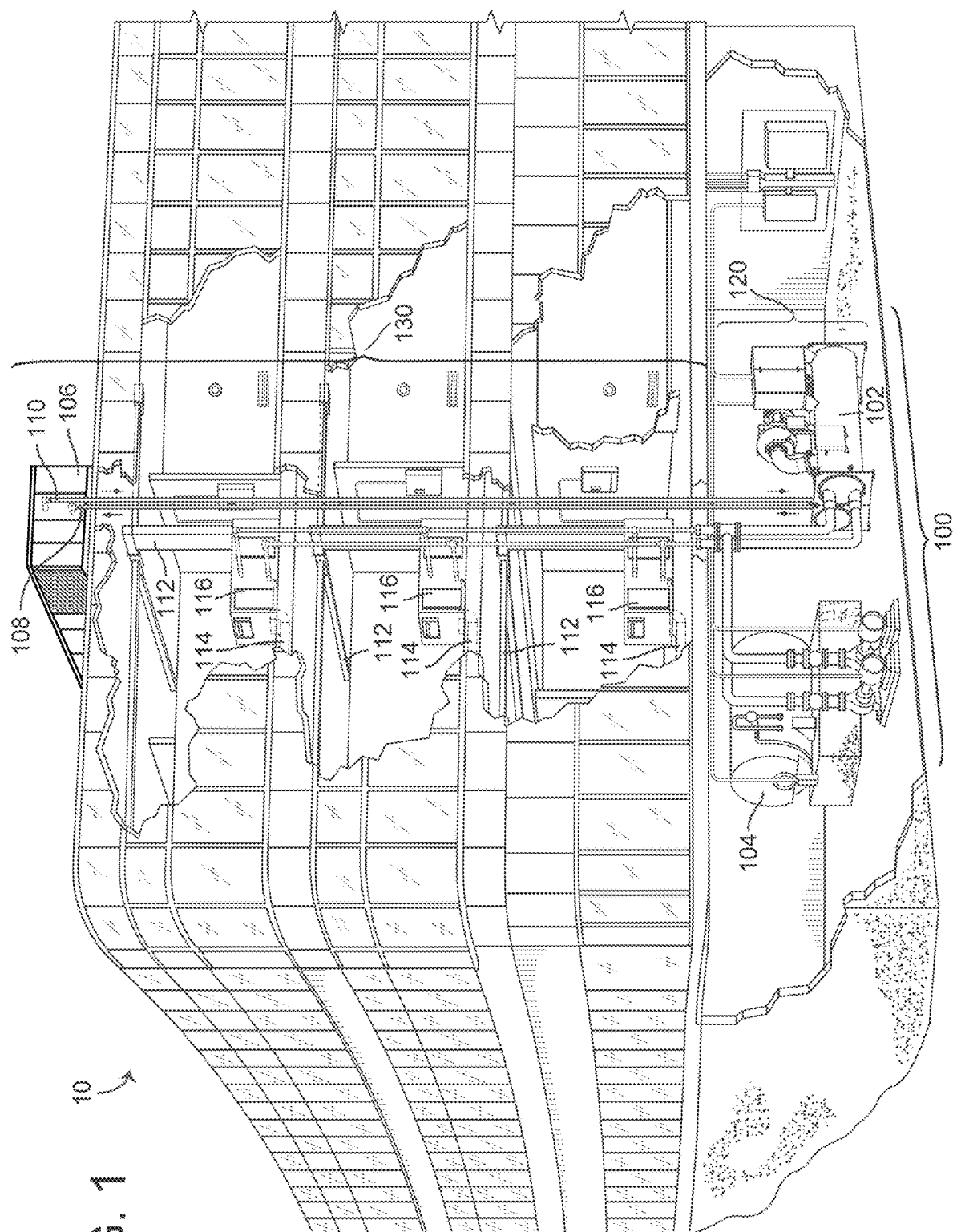
FIG. 1 is a drawing of a building equipped with a HVAC system, according to some embodiments.

Referring generally to the Figures, an economic feasibility platform for analyzing various designs of a central plant is shown, according to various embodiments. The economic feasibility platform can be implemented within a Planning Tool of a Central Plant Optimization (CPO) Program. In some embodiments, the economic feasibility platform can be accessed through a screen "Financial Performance Calculator" in a Planning Tool. The Planning Tool includes a user interface designed to generate and present predictive financial performance data pertaining to the various plant designs and scenarios.

In some embodiments, the Planning Tool is a Cloud based Service-as-a-Service (SaaS) application used to facilitate the design of a central energy plant, the central energy plant including various systems/subsystems such as, for example, a heating system, a cooling, and a power system. The Planning Tool can be part of the CPO (Central Plant Optimization) Program, which targets middle to complex building markets to help customers save energy (estimated over 20%+savings) with industry leading cost-based optimization technologies. For example, The Planning Tool can simulate the design of new central plants; explore the impact of plant retrofits, configuration changes, and future plant expansion; estimate potential energy savings by applying CPO algorithms to an existing plant; simulate plant operation under different scenarios (e.g., weather conditions, load profiles, and utility rate structures). An example of a Planning Tool in a CPO Program is described in U.S. patent application Ser. No. 16/370,632 filed Mar. 29, 2019, the entire disclosure of which is incorporated by reference herein.

The simulation results provided by the Planning Tool can include first year total energy cost, which may render a high level view of how optimized cost could be achieved. However, most of the energy saving projects can only yield benefits in a long term. The first year cost of an energy plant alone may not be enough to evaluate the viability of the plant design used in the Planning Tool. Other considerations, such as which energy supplier to use, seasonal load variances, and time to recoup expenses, suggest a need to understand the year-over-year cost of a plant design. Evaluating the economic feasibility of an energy project is an essential step and shall be completed prior to setting up an actual central plant design, entering into contracts or purchasing materials and equipment.

As described herein, techniques for investment appraisal (used interchangeably with capital budgeting, economic analysis, economic feasibility analysis) allow a user to analyze the economic feasibility of a plant design by weighting future savings against initial costs over a long evaluation period. Such techniques often use time-phased expense and revenue predictions to evaluate a plant design's profitability. The present disclosure provides a solution that uses standard financial calculation methods and further apply the calculation methods to simulation results provide by the Planning Tool. As such, an improved platform for preliminary economic feasibility assessment can be provided.

The present disclosure provides various embodiments in which the economic feasibility of simulated plant designs can be quickly and seamlessly evaluated in a convenient user interface. By integrating the economic feasibility platform into the CPO program, generated simulation data is readily available and organized for input into an investment appraisal system, removing the need for a user to manually input data across several designs for analysis. In addition, the platform can provide more accurate and in-depth analyses by including more simulation data into the calculation of economic viability metrics, rather than using overly-simplified aggregate values.

Embodiments of the user interface can generate and present financial performance data associated with two or more plant designs, allowing a user to directly compare potential plant designs against one another. Some embodiments of the user interface allow a user to request and view addition financial performance data of a central plant design for more detailed economic analysis. Some embodiments allow a user to dynamically vary one or more analysis parameters to generate updated economic feasibility metrics under different analysis conditions. The disclosed features of the user interface can be used by a user to determine which designs are viable options for implementation and to decide which of the potential designs is the most preferred to implement or investigate further.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
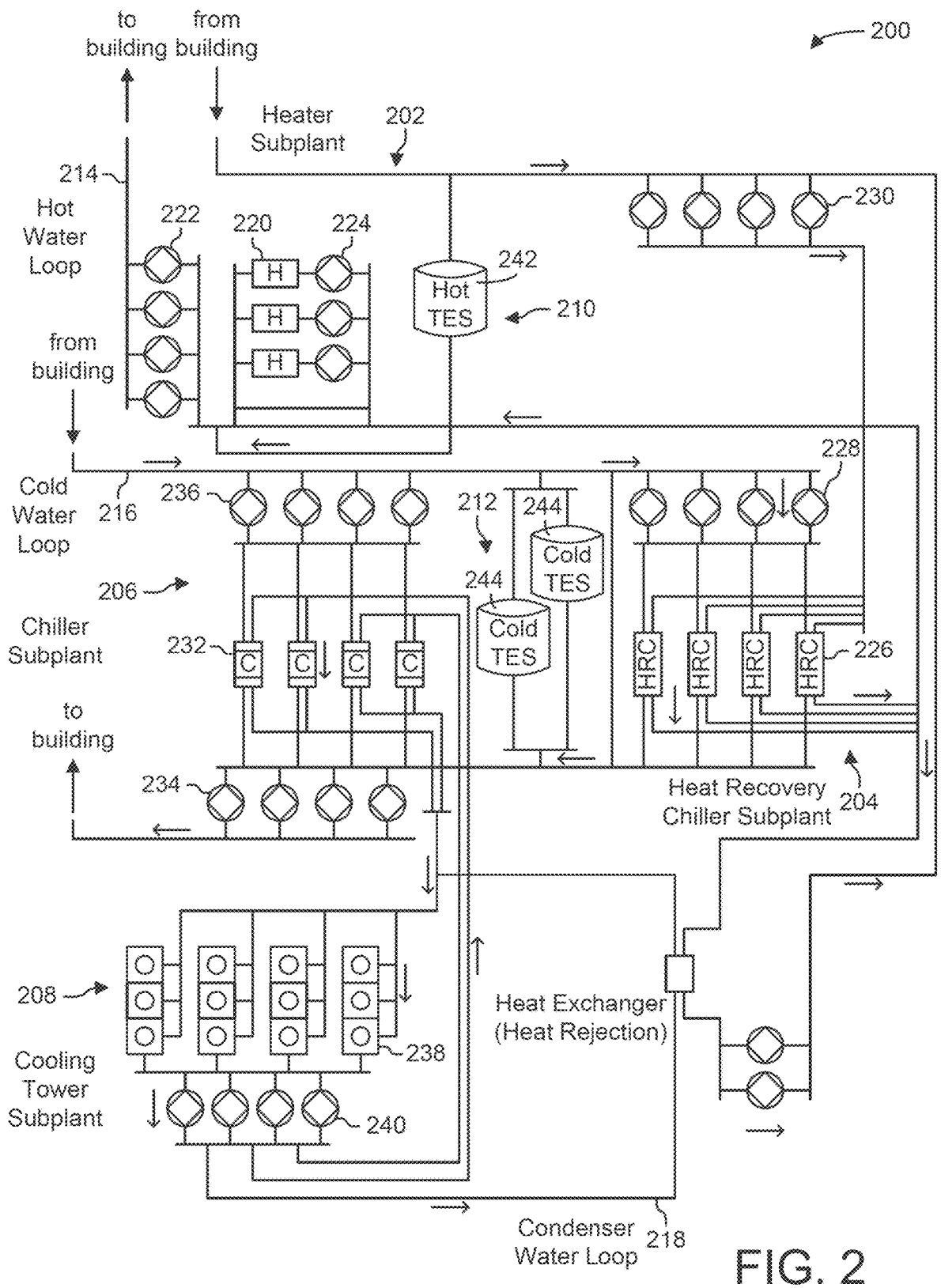
FIG. 2 is a block diagram of a central plant which can be used to serve the energy loads of the building of FIG. 1, according to some embodiments.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
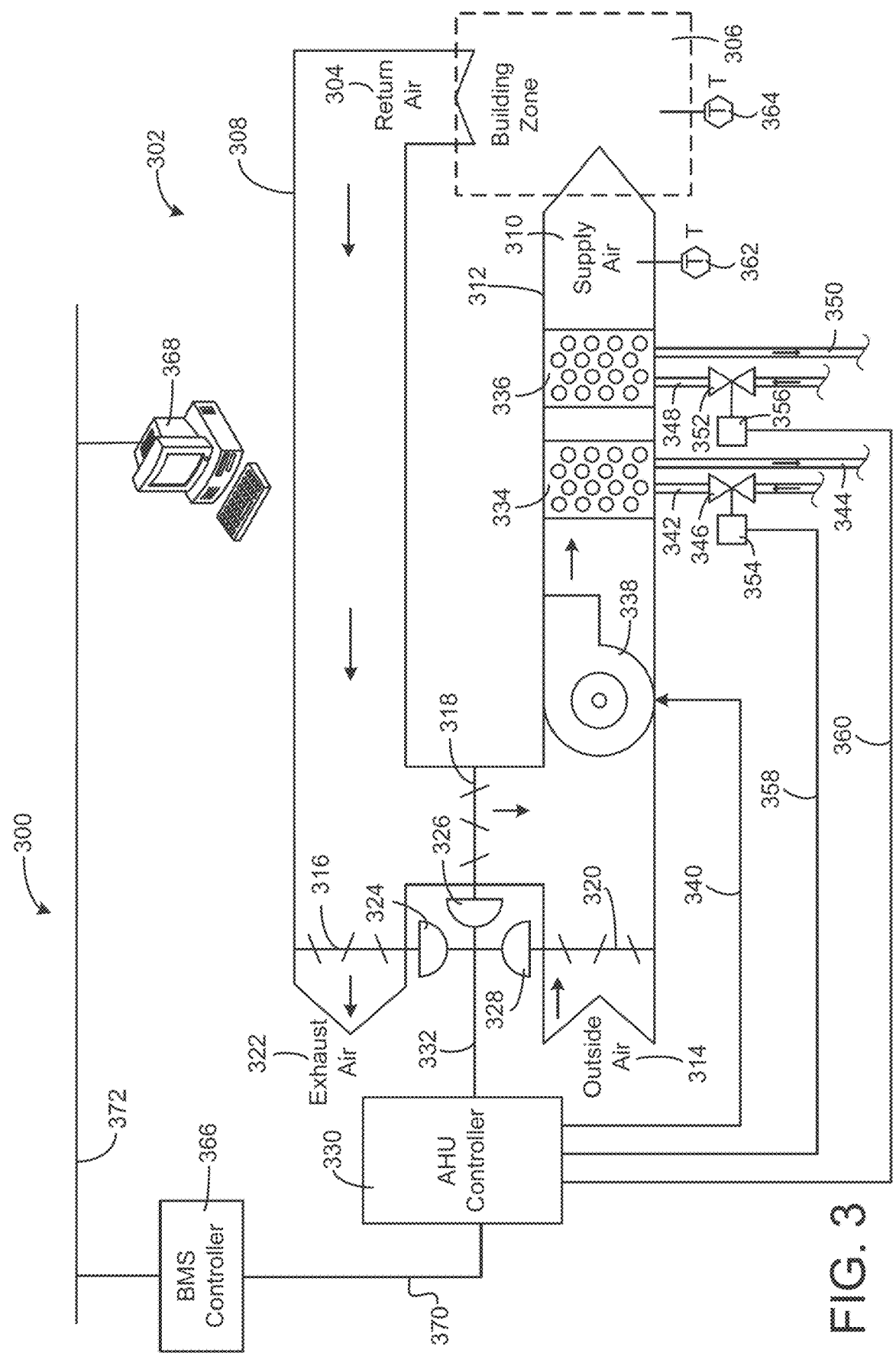
FIG. 3 is a block diagram of an airside system which can be implemented in the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
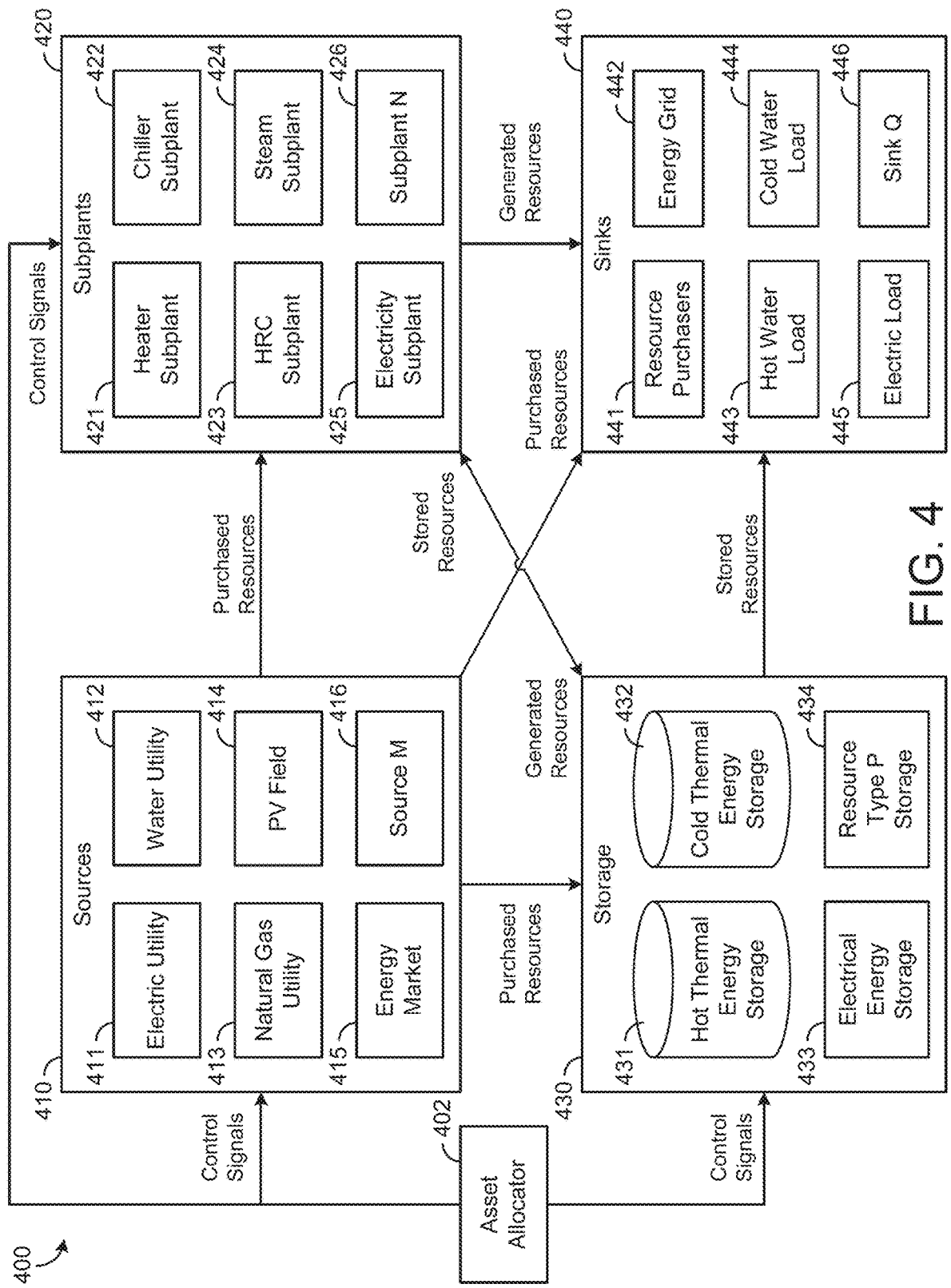
FIG. 4 is a block diagram of an asset allocation system including sources, subplants, storage, sinks, and an asset allocator configured to optimize the allocation of these assets, according to some embodiments.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIG. 7) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are the main assets of a central plant. Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Still referring to FIG. 4, asset allocation system 400 is shown to include an asset allocator 402. Asset allocator 402 may be configured to control the distribution, production, storage, and usage of resources in asset allocation system 400. In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma x_{time} = 0 \forall \text{resources}, \forall \text{time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function J(x) that expresses economic cost as a function of the control decisions made by asset allocator 402. The cost function J(x) may account for the cost of resources purchased from sources 410, as well as the revenue generated by selling resources to resource purchasers 441 or energy grid 442 or participating in incentive programs over a time period. The time period may occur at least partially in the future and thus the cost function J(x) (or simply J) can be described as a predictive cost function. The cost optimization performed by asset allocator 402 can be expressed as:

$$\arg\min_{x} J(x)$$

where J(x) is defined as follows:

$$J(x) = \sum_{sources} \sum_{horizon} \text{cost}(purchase_{resource,time}, \text{time}) - \sum_{incentives} \sum_{horizon} \text{revenue}(ReservationAmount)$$

The first term in the cost function J(x) represents the total cost of all resources purchased over the optimization horizon. Resources can include, for example, water, electricity, natural gas, or other types of resources purchased from a utility or other source 410. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function J(x) subject to the following constraint, which guarantees the balance between resources purchased, produced, discharged, consumed, and requested over the optimization horizon:

$$\sum_{sources} purchase_{resource,time} +$$
$$\sum_{subplants} products(x_{internal,time}, x_{external,time}, v_{uncontrolled,time}) -$$
$$\sum_{subplants} consumes(x_{internal,time}, x_{external,time}, v_{uncontrolled,time}) +$$
$$\sum_{storages} discharges_{resources}(x_{internal,time}, x_{external,time}) -$$
$$\sum_{sinks} requests_{resource} = 0 \; \forall \; resources, \forall \; time \in horizon$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during run-time; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 402 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 402 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem.

Some decisions made by asset allocator 402 may be shared by multiple elements of system 400. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 402 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Plant Resource Diagrams

Figure 5A:
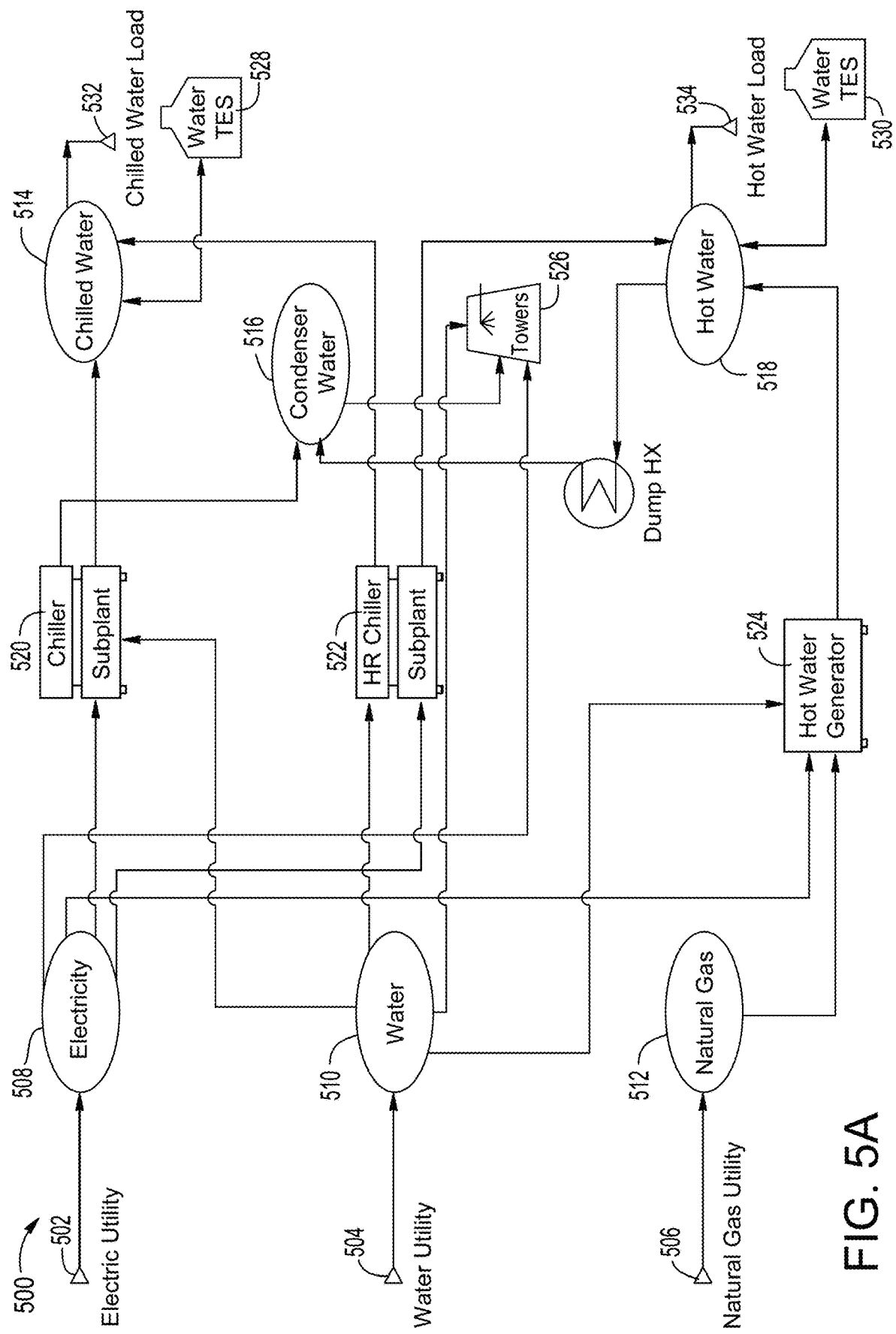
FIG. 5A is a plant resource diagram illustrating the elements of a central plant and the connections between such elements, according to some embodiments.

Referring now to FIG. 5A, a plant resource diagram 500 is shown, according to an exemplary embodiment. Plant resource diagram 500 represents a particular implementation of a central plant and indicates how the equipment of the central plant are connected to each other and to external systems or devices. Asset allocator 402 can use plant resource diagram 500 to identify the interconnections between various sources 410, subplants 420, storage 430, and sinks 440 in the central plant. In some instances, the interconnections defined by diagram 500 are not capable of being inferred based on the type of resource produced. For this reason, plant resource diagram 500 may provide asset allocator 402 with new information that can be used to establish constraints on the asset allocation problem.

Plant resource diagram 500 is shown to include an electric utility 502, a water utility 504, and a natural gas utility 506. Utilities 502-506 are examples of sources 410 that provide resources to the central plant. For example, electric utility 502 may provide an electricity resource 508, water utility 504 may provide a water resource 510, and natural gas utility 506 may provide a natural gas resource 512. The lines connecting utilities 502-506 to resources 508-512 along with the directions of the lines (i.e., pointing toward resources 508-512) indicate that resources purchased from utilities 502-506 add to resources 508-512.

Plant resource diagram 500 is shown to include a chiller subplant 520, a heat recovery (HR) chiller subplant 522, a hot water generator subplant 524, and a cooling tower subplant 526. Subplants 520-526 are examples of subplants 420 that convert resource types (i.e., convert input resources to output resources). For example, the lines connecting electricity resource 508 and water resource 510 to chiller subplant 520 indicate that chiller subplant 520 receives electricity resource 508 and water resource 510 as input resources. The lines connecting chiller subplant 520 to chilled water resource 514 and condenser water resource 516 indicate that chiller subplant 520 produces chilled water resource 514 and condenser water resource 516. Similarly, the lines connecting electricity resource 508 and water resource 510 to HR chiller subplant 522 indicate that HR chiller subplant 522 receives electricity resource 508 and water resource 510 as input resources. The lines connecting HR chiller subplant 522 to chilled water resource 514 and hot water resource 518 indicate that HR chiller subplant 522 produces chilled water resource 514 and hot water resource 518.

Plant resource diagram 500 is shown to include water TES 528 and 530. Water TES 528-530 are examples of storage 530 that can be used to store and discharge resources. The line connecting chilled water resource 514 to water TES 528 indicates that water TES 528 stores and discharges chilled water resource 514. Similarly, the line connecting hot water resource 518 to water TES 530 indicates that water TES 530 stores and discharges hot water resource 518. In diagram 500, water TES 528 is connected to only chilled water resource 514 and not to any of the other water resources 516 or 518. This indicates that water TES 528 can be used by asset allocator 402 to store and discharge only chilled water resource 514 and not the other water resources 516 or 518. Similarly, water TES 530 is connected to only hot water resource 518 and not to any of the other water resources 514 or 516. This indicates that water TES 530 can be used by asset allocator 402 to store and discharge only hot water resource 518 and not the other water resources 514 or 516.

Plant resource diagram 500 is shown to include a chilled water load 532 and a hot water load 534. Loads 532-534 are examples of sinks 440 that consume resources. The line connecting chilled water load 532 to chilled water resource 514 indicates that chilled water resource 514 can be used to satisfy chilled water load 532. Similarly, the line connecting hot water load 534 to hot water resource 518 indicates that hot water resource 518 can be used to satisfy hot water load 534. Asset allocator 402 can use the interconnections and limitations defined by plant resource diagram 500 to establish appropriate constraints on the optimization problem.

Figure 5B:
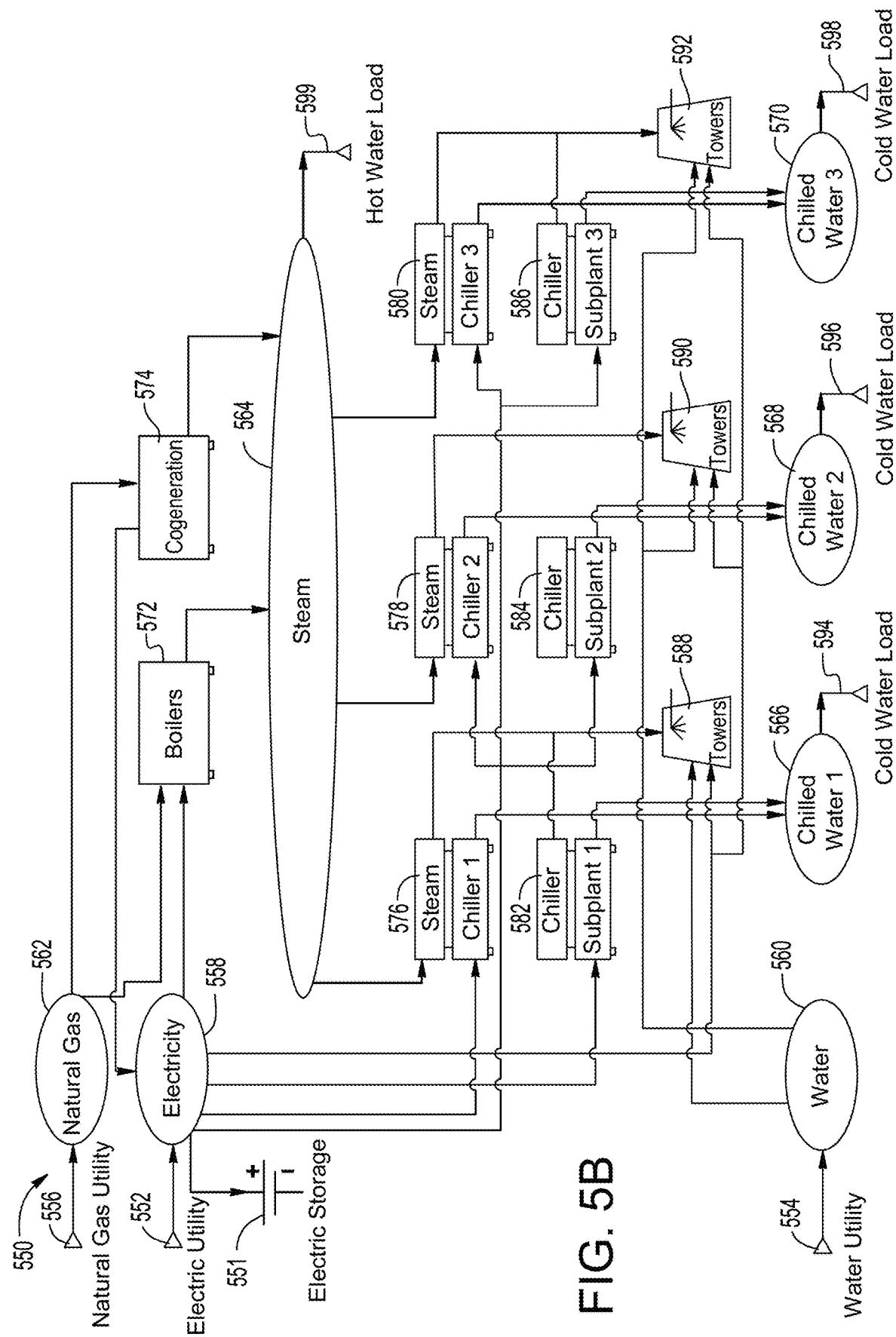
FIG. 5B is another plant resource diagram illustrating the elements of a central plant and the connections between such elements, according to some embodiments.

Referring now to FIG. 5B, another plant resource diagram 550 is shown, according to an exemplary embodiment. Plant resource diagram 550 represents another implementation of a central plant and indicates how the equipment of the central plant are connected to each other and to external systems or devices. Asset allocator 402 can use plant resource diagram 550 to identify the interconnections between various sources 410, subplants 420, storage 430, and sinks 440 in the central plant. In some instances, the interconnections defined by diagram 550 are not capable of being inferred based on the type of resource produced. For this reason, plant resource diagram 550 may provide asset allocator 402 with new information that can be used to establish constraints on the asset allocation problem.

Plant resource diagram 550 is shown to include an electric utility 552, a water utility 554, and a natural gas utility 556. Utilities 552-556 are examples of sources 410 that provide resources to the central plant. For example, electric utility 552 may provide an electricity resource 558, water utility 554 may provide a water resource 560, and natural gas utility 556 may provide a natural gas resource 562. The lines connecting utilities 552-556 to resources 558-562 along with the directions of the lines (i.e., pointing toward resources 558-562) indicate that resources purchased from utilities 552-556 add to resources 558-562. The line connecting electricity resource 558 to electrical storage 551 indicates that electrical storage 551 can store and discharge electricity resource 558.

Plant resource diagram 550 is shown to include a boiler subplant 572, a cogeneration subplant 574, several steam chiller subplants 576-580, several chiller subplants 582-586, and several cooling tower subplants 588-592. Subplants 572-592 are examples of subplants 420 that convert resource types (i.e., convert input resources to output resources). For example, the lines connecting boiler subplant 572 and cogeneration subplant 574 to natural gas resource 562, electricity resource 558, and steam resource 564 indicate that both boiler subplant 572 and cogeneration subplant 574 consume natural gas resource 562 and electricity resource 558 to produce steam resource 564.

The lines connecting steam resource 564 and electricity resource 558 to steam chiller subplants 576-580 indicate that each of steam chiller subplants 576-580 receives steam resource 564 and electricity resource 558 as input resources. However, each of steam chiller subplants 576-580 produces a different output resource. For example, steam chiller subplant 576 produces chilled water resource 566, steam chiller subplant 578 produces chilled water resource 568, and steam chiller subplant 580 produces chilled water resource 570. Similarly, the lines connecting electricity resource 558 to chiller subplants 582-586 indicate that each of chiller subplants 582-586 receives electricity resource 558 as an input. However, each of chiller subplants 582-586 produces a different output resource. For example, chiller subplant 582 produces chilled water resource 566, chiller subplant 584 produces chilled water resource 568, and chiller subplant 586 produces chilled water resource 570.

Chilled water resources 566-570 have the same general type (i.e., chilled water) but can be defined as separate resources by asset allocator 402. The lines connecting chilled water resources 566-570 to subplants 576-586 indicate which of subplants 576-586 can produce each chilled water resource 566-570. For example, plant resource diagram 550 indicates that chilled water resource 566 can only be produced by steam chiller subplant 576 and chiller subplant 582. Similarly, chilled water resource 568 can only be produced by steam chiller subplant 578 and chiller subplant 584, and chilled water resource 570 can only be produced by steam chiller subplant 580 and chiller subplant 586.

Plant resource diagram 550 is shown to include a hot water load 599 and several cold water loads 594-598. Loads 594-599 are examples of sinks 440 that consume resources. The line connecting hot water load 599 to steam resource 564 indicates that steam resource 564 can be used to satisfy hot water load 599. Similarly, the lines connecting chilled water resources 566-570 to cold water loads 594-598 indicate which of chilled water resources 566-570 can be used to satisfy each of cold water loads 594-598. For example, only chilled water resource 566 can be used to satisfy cold water load 594, only chilled water resource 568 can be used to satisfy cold water load 596, and only chilled water resource 570 can be used to satisfy cold water load 598. Asset allocator 402 can use the interconnections and limitations defined by plant resource diagram 550 to establish appropriate constraints on the optimization problem.

Planning Tool

Figure 6:
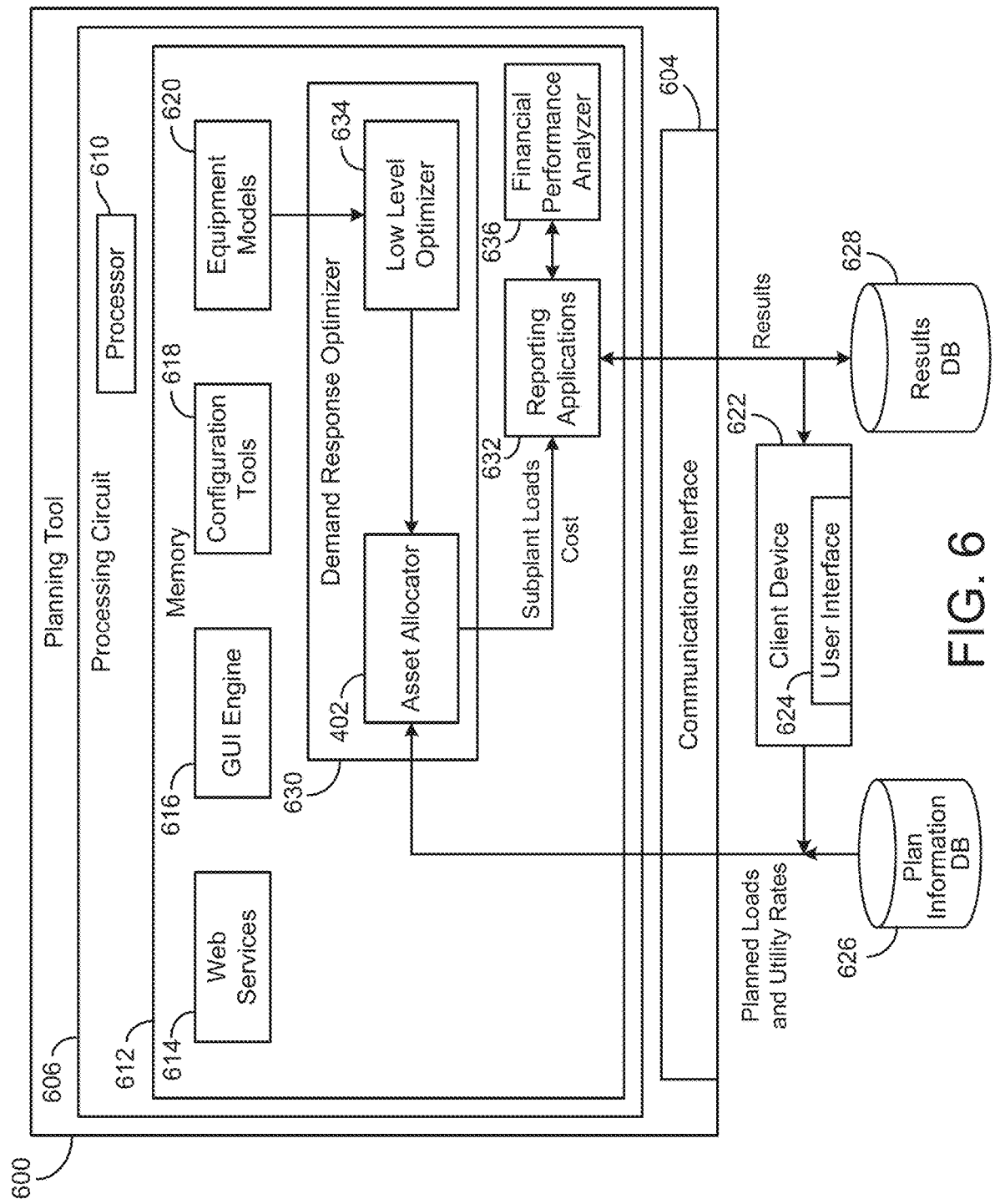
FIG. 6 is a block diagram of a planning tool in which the asset allocator of FIG. 4 can be implemented, according to some embodiments.

Referring now to FIG. 6, a block diagram of a planning tool 600 in which asset allocator 402 can be implemented is shown, according to an exemplary embodiment. Planning tool 600 may be configured to use demand response optimizer 630 to simulate the operation of a central plant over a predetermined time period (e.g., a day, a month, a week, a year, etc.) for planning, budgeting, and/or design considerations. For example, demand response optimizer 630 may use building loads and utility rates to determine an optimal resource allocation to minimize cost over a simulation period.

Planning tool 600 can be configured to determine the benefits of investing in a battery asset and the financial metrics associated with the investment. Such financial metrics can include, for example, the internal rate of return (IRR), net present value (NPV), and/or simple payback period (SPP). Planning tool 600 can also assist a user in determining the size of the battery which yields optimal financial metrics such as maximum NPV or a minimum SPP. In some embodiments, planning tool 600 allows a user to specify a battery size and automatically determines the benefits of the battery asset from participating in selected IBDR programs while performing PBDR. In some embodiments, planning tool 600 is configured to determine the battery size that minimizes SPP given the IBDR programs selected and the requirement of performing PBDR. In some embodiments, planning tool 600 is configured to determine the battery size that maximizes NPV given the IBDR programs selected and the requirement of performing PBDR.

In planning tool 600, asset allocator 402 may receive planned loads, utility rates, and weather forecasts for the entire simulation period. The planned loads, utility rates, and weather forecasts may be defined by input received from a user via a client device 622 (e.g., user-defined, user selected, etc.) and/or retrieved from a plan information database 626.

Asset allocator 402 uses the planned loads, utility rates, and weather forecasts in conjunction with subplant curves from low level optimizer 634 to determine an optimal resource allocation (i.e., an optimal dispatch schedule) for a portion of the simulation period.

The portion of the simulation period over which asset allocator 402 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, asset allocator 402 requests all of the subplant curves used in the simulation from low level optimizer 634 at the beginning of the simulation. Since the planned loads and environmental conditions are known for the entire simulation period, asset allocator 402 may retrieve all of the relevant subplant curves at the beginning of the simulation. In some embodiments, low level optimizer 634 generates functions that map subplant production to equipment level production and resource use when the subplant curves are provided to asset allocator 402. These subplant to equipment functions may be used to calculate the individual equipment production and resource use (e.g., in a post-processing module) based on the results of the simulation.

Still referring to FIG. 6, planning tool 600 is shown to include a communications interface 604 and a processing circuit 606. Communications interface 604 may include wired or wireless interfaces (e.g., jacks, antennas, transmitters, receivers, transceivers, wire terminals, etc.) for conducting data communications with various systems, devices, or networks. For example, communications interface 604 may include an Ethernet card and port for sending and receiving data via an Ethernet-based communications network and/or a Wi-Fi transceiver for communicating via a wireless communications network. Communications interface 604 may be configured to communicate via local area networks or wide area networks (e.g., the Internet, a building WAN, etc.) and may use a variety of communications protocols (e.g., BACnet, IP, LON, etc.).

Communications interface 604 may be a network interface configured to facilitate electronic data communications between planning tool 600 and various external systems or devices (e.g., client device 622, results database 628, plan information database 626, etc.). For example, planning tool 600 may receive planned loads and utility rates from client device 622 and/or plan information database 626 via communications interface 604. Planning tool 600 may use communications interface 604 to output results of the simulation to client device 622 and/or to store the results in results database 628.

Still referring to FIG. 6, processing circuit 606 is shown to include a processor 610 and memory 612. Processor 610 may be a general purpose or specific purpose processor, an application specific integrated circuit (ASIC), one or more field programmable gate arrays (FPGAs), a group of processing components, or other suitable processing components. Processor 610 may be configured to execute computer code or instructions stored in memory 612 or received from other computer readable media (e.g., CDROM, network storage, a remote server, etc.).

Memory 612 may include one or more devices (e.g., memory units, memory devices, storage devices, etc.) for storing data and/or computer code for completing and/or facilitating the various processes described in the present disclosure. Memory 612 may include random access memory (RAM), read-only memory (ROM), hard drive storage, temporary storage, non-volatile memory, flash memory, optical memory, or any other suitable memory for storing software objects and/or computer instructions. Memory 612 may include database components, object code components, script components, or any other type of information structure for supporting the various activities and information structures described in the present disclosure. Memory 612 may be communicably connected to processor 610 via processing circuit 606 and may include computer code for executing (e.g., by processor 610) one or more processes described herein.

Still referring to FIG. 6, memory 612 is shown to include a graphical user interface GUI engine 616, web services 614, and configuration tools 618. In other embodiments, any one or more of the GUI engine 616, web services 614, and configuration tools 618 can be provided as separate components outside of central planning tool 600. In an example embodiment, GUI engine 616 includes a graphical user interface component configured to provide graphical user interfaces to a user for selecting or defining plan information for the simulation (e.g., planned loads, utility rates, environmental conditions, etc.). Graphical user interfaces can include graphical elements (e.g., widgets, dashboard controls, windows, etc.) for displaying financial performance data or other information to users of a GUI. The user interface or report (or underlying data engine) may be configured to aggregate and categorize operating conditions by building, building type, equipment type, and the like. Web services 614 may allow a user to interact with planning tool 600 via a web portal and/or from a remote system or device (e.g., an enterprise control application).

Configuration tools 618 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 618 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 626) and adapt it or enable it for use in the simulation.

Memory 612 can also include equipment models 620. Equipment models 620 can store pertinent model definitions and functions of plant or subplant devices. Such model definitions could include efficiency curves, load or consumption curves, principle costs, operating costs, operating cost curves, or any other relevant energy or cost modeling parameter. Equipment models 620 can provide such models to low level optimizer 634 for optimization of systems in demand response optimizer 630.

Still referring to FIG. 6, memory 612 is shown to include demand response optimizer 630. Demand response optimizer 630 may perform a cascaded optimization process to optimize the performance of asset allocation system 400. For example, demand response optimizer 630 is shown to include asset allocator 402 and a low level optimizer 634. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by asset allocator 402. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from related incentive programs. Low level optimizer 634 may determine whether to participate in the incentive events based on the resource allocation set by asset allocator 402. For example, if insufficient resources have been allocated to a particular IBDR program by asset allocator 402 or if the allocated resources have already been used, low level optimizer 634 may determine that asset allocation system 400 will not participate in the IBDR program and may ignore the IBDR event. However, if the required resources have been allocated to the IBDR program and are available in storage 430, low level optimizer 634 may determine that system 400 will participate in the IBDR program in response to the IBDR event. The cascaded optimization process performed by demand response optimizer 630 is described in greater detail in U.S. patent application Ser. No. 15/247,885.

In some embodiments, low level optimizer 634 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 634 generates the subplant curves by running the low level optimization process for various combinations of subplant loads and weather conditions to generate multiple data points. Low level optimizer 634 may fit a curve to the data points to generate the subplant curves. In other embodiments, low level optimizer 634 provides the data points to asset allocator 402 and asset allocator 402 generates the subplant curves using the data points. Asset allocator 402 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 620. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Demand response optimizer 630 may use the planned loads, utility rates, and weather forecasts to determine an optimal resource allocation over a prediction window. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 630 for presentation to a client device 622 (e.g., via user interface 624) or storage in results database 628.

Still referring to FIG. 6, memory 612 is shown to include reporting applications 632. Reporting applications 632 may receive the optimized resource allocations from demand response optimizer 630 and, in some embodiments, costs associated with the optimized resource allocations. Reporting applications 632 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation.

In some embodiments, some or all components of demand response optimizer 630 can be implemented as an integrated simulation engine service A3S (i.e., application as a service) external to planning tool 600. In such embodiments, demand response optimizer 630 receives simulation data (e.g., equipment models 620, weather forecasts, planned loads and utility rates, etc.) from planning tool 600 and applies an algorithm in order to generate simulation results. The simulation results may then be returned and planning tool 600 can perform further calculations (e.g., derive cost, determine best fit model) to be presented via user interface 624.

In some embodiments, planning tool 600 can also include financial performance analyzer 636. Financial performance analyzer 636 performs economic analysis of simulation results for investment appraisal. Financial performance analyzer 636 can be configured to receive input from client device 622 to initiate or alter economic analyses performed. In some embodiments, financial performance analyzer 636 may receive simulation results from demand response optimizer 630 to generate financial performance data. In other embodiments, financial performance analyzer 636 retrieves simulation results from results database 628. Financial performance analyzer 636 may communicate with reporting applications 632 to display financial performance data alongside other data presented by reporting applications 632. In another embodiment, financial performance analyzer 636 is integrated within reporting applications 632.

Financial performance analyzer 636 uses simulation data generated by demand response optimizer 630 and given analysis parameters to generate the financial performance data. Simulation data can include, but is not limited to, plant design identifiers, simulation conditions, energy usage data, and cost data. Cost data may include, but is not limited to, initial capital or costs, maintenance costs, operating costs, expected system lifespan, or any other cost associated with implementing a particular central plant design. In some embodiments, cost data may be aggregated or estimated for a period of time, such as the costs for a day, week, month, or year. In some embodiments, some cost data may be input by a user via user interface 624 and sent to financial performance analyzer 636. In other embodiments, cost data is retrieved from plan information database 626 or results database 628. Analysis parameters may include, but are not limited to, an evaluation period, discount rates, escalation rates, desired market rates, baseline costs, projected maintenance costs, or any other parameter that aids in performing financial performance analyses. In one embodiment, a user inputs desired analysis parameters via user interface 624. In another embodiment, financial performance analyzer 636 retrieves analysis parameters from plan information database 626 or results database 628. In some embodiments, financial performance analyzer 636 can be configured to receive new or different analysis parameters and dynamically update financial performance data calculations for display to a user.

Financial performance data generated by financial performance analyzer 636 can include economic feasibility metrics or predicted financial data. Economic feasibility metrics could include, but are not limited to, Net Present Values (NPV), Internal Rate of Return (IRR), simple or discounted payback period, modified IRR, accounting rate of return, average accounting return, average rate of return, profitability index, equivalent annual cost, real options valuation, or any other metric or technique used for investment appraisal. Predicted financial data could include, but is not limited to, future cash flows, aggregate cash flows, time-phased expenses, revenues, and/or savings, or any other predictive financial data. The calculation of several metrics are described herein for illustration; however, many financial performance metrics and predictive financial data can be generated according to several different methods, and it should be appreciated that the calculation of any financial performance data is not solely limited to the methods described or illustrated herein.

To generate time-phased cash flows (e.g., revenues, expenses, savings, etc.), the financial performance analyzer 636 uses a defined discount rate, escalation rate, or market rate to adjust the cash flow, for the time-value of money. Financial performance analyzer 636 may predict future cash flows by transforming current or present cash flows according to the equation:

$$F = P*(1+r)^N$$

wherein F is the future predicted cash flow, P is the present value of the cash flow, r is the escalation rate or other market rate, and N is the number of time intervals between the present cash flow P and the future cash flow F for which the escalation rate or market rate represents. For example, if r is an escalation rate per year, N represents the number of years between the present and desired future cash flow. Similarly, to convert future cash flows into present or current cash flows, the financial performance analyzer 636 may use the equation:

$$P = \frac{F}{(1+r)^N}$$

wherein P is the present value of the cash flow, F is the future predicted cash flow, r is the discount rate or market rate, and N is the number of time intervals between the present cash flow P and the future cash flow F for which the discount rate or market rate represents. In other words, to convert a future expense F that is say N years from now into present-day dollars, financial performance analyzer 636 uses the above equation given a discount or market rate r.

A Net Present Value (NPV) is the current value of a project over an evaluation period in present-day dollars. To generate an NPV for a simulated plant design, financial performance analyzer 636 converts all future cash flows into present-day dollars, and subtract the initial expenses from the sum their present-day equivalences. For example, NPV can be calculated by the equation:

$$NPV = \sum_{i=0}^{N} \frac{F_i}{(1+r)^i}$$

wherein i denotes a time period in the evaluation period relative to present-day, N is the total number of time periods in the evaluation period, $F_i$ is the aggregate cash flow for time period i, and r is the discount or market rate for the given time interval. It should be appreciated that $F_i$ sums revenues or savings for time period i as positive and sums expenses or losses for time period i as negatives. $F_0$ should be recognized to represent present cash flows which include initial costs of a project.

The NPV value can be compared to a threshold to assess the economic feasibility of a plant design. For example, if the NPV threshold is zero, a positive NPV indicates that the projected earnings generated by a project (in present dollars) exceeds the anticipated costs. Hence, a positive NPV result affirms a decision of the selecting the plant design. Conversely, a negative NPV indicates that the projected earnings will not outweigh the anticipated costs in the evaluation period, and that the plant design is not economically feasible. Likewise, a non-zero threshold can be chosen and used to assess a plant design's profitability.

An Internal Rate of Return (IRR) is the necessary discount or market rate required to make the NPV of a project equal to zero. IRR can be calculated by adopting the NPV equation such that:

$$0 = \sum_{i=0}^{N} \frac{F_i}{(1+IRR)^i}$$

wherein i denotes a time period from present-day, N is the total number of time periods in an evaluation period, and $F_i$ is the aggregate cash flow for time period i. It should be appreciated that $F_i$ sums revenues or savings for time period i as positive and sums expenses or losses for time period i as negatives. $F_0$ should be recognized to represent present cash flows which include initial costs of a project.

Given that finding an exact solution to the IRR equation can be computationally or algebraically complex, several estimations of the IRR calculation can be used. In one embodiment, the IRR can be estimated using a look-up table. In another embodiment, the IRR can be estimated using an iterative approximation, such as the Newton-Raphson Approach.

In such an approach, the algorithm begins with an initial estimated IRR value, and for the initial IRR value, calculates both the NPV of the cash flows and the derivative of the NPV, which the derivative of the NPV can be found according to the equation:

$$D_x = \sum_{i=0}^{N} \frac{-i * F_i}{(1 + IRR_x)^{i+1}}$$

wherein $D_x$ is the derivative of the NPV for iteration x, $IRR_x$ is the estimated IRR value for iteration x, i denotes a time period from present-day, N is the total number of time periods, and $F_i$ is the aggregate cash flow for time period i.

A new estimated IRR value is calculated by the equation:

$$IRR_{x+1} = IRR_x - \frac{NPV_x}{D_x}$$

wherein $IRR_{x+1}$ is the new estimated IRR value, $IRR_x$ is the previous estimated IRR value, $NPV_x$ is the NPV value for iteration x, and $D_x$ is the derivative of the NPV for iteration x.

An error between IRR estimates can be calculated by the equation:

$$\text{Error} = IRR_{x+1} - IRR_x$$

wherein if the error is less than a predefined error threshold, the new IRR value is used as the final estimated IRR value. If the error is not less than the error threshold, the algorithm repeats with the new IRR value to generate yet another IRR value. The algorithm will repeat until an error is less than the error bound, or the algorithm reaches a predefined maximum number of iterations.

To assess a project based on its IRR, the IRR is compared to a required rate of return. The required rate of return could be a known or accepted market rate, or a user chosen rate. The required rate of return represents the minimum profitability of a project that a user is willing to accept to outweigh the risk and burden of implementing a new plant design. If the estimated IRR is greater than the required rate of return, the project can be accepted, and if IRR is less than the required rate of return, it can be rejected.

A Payback Period is the amount of time it will take to recover the investment costs of the plant design. A payback period can be a simple payback period or a discounted payback period. A simple payback period is calculated by the equation:

$$PP_s = \frac{C_0}{R_i}$$

wherein $PP_s$ is the simple payback period, $C_0$ is the initial or principle cost of the plant design, and $R_i$ is the expected savings or revenue per time period. For example, if a plant design costs $100,000 to install, and will save $25,000 per year, the simple payback period would then be 4.0 years.

The discounted payback period uses the time-phased discount of future earnings to calculate the payback period in today's dollars. To estimate the discounted payback period, the NPV must be calculated incrementally using a discount rate until the NPV becomes greater than or equal to 0. For example, the cash flow at time period zero may be negative due to initial costs. The NPV is then calculated for the evaluation period of 1 year, in which case, the NPV may still be negative. The NPV is then recalculated for an evaluation period of 2 years, then 3 years, and so on until the NPV becomes zero or positive. The number of years (for example, N) to make the NPV zero is the discounted payback period. In the event the NPV is greater than zero, the discounted payback period may be estimated by interpolating the total time based on the incremental time-phase cash flow introduced by the Nth year.

A payback period can be compared to a desired payback period to ensure the required costs of the plant design implementation are recovered in a reasonable time. A user may define the maximum time frame they are willing to accept for a payback period of a project. Such a maximum payback period may be chosen based on projected market trends or anticipated risk for asset loss. The anticipated lifespan of the plant design may also provide an upper bound on an acceptable payback period.

To provide more accurate financial performance data, financial performance analyzer 636 may calculated financial performance data using the individual simulated cost and saving data available in the simulation data. For example, demand response optimizer 630 may simulate a central plant design in one-hour, one-day, or one-month increments based on interest in anticipated fluctuations or variations of loads or utility rates over time. As such, rather than aggregating simulated costs into single metrics, such as a "cost per year", the financial performance analyzer 636 may time-phase adjust the individual data for each simulation increment to provide a more accurate time-phased adjustment of costs.

Any value, rate, or cost can be time-value adjusted by financial performance analyzer 636 to generate financial performance data. In some embodiments of the present disclosure, the financial performance analyzer 636 utilizes or generates cost data associated with different time intervals from the demand response optimizer 630 (e.g., some simulation data is analyzed on a per-year basis while other data is analyzed on a per-month basis). In other embodiments, the financial performance analyzer 636 may calculate the monthly time-phased savings and expenses rather than aggregated yearly savings and expenses. In some embodiments, the financial performance analyzer 636 may use different discount or escalation rates for different cash flows based on the type of cash flow (e.g., savings, operating costs, investment capital, maintenance costs, etc.).

Platform Flow Diagram

Figure 7:
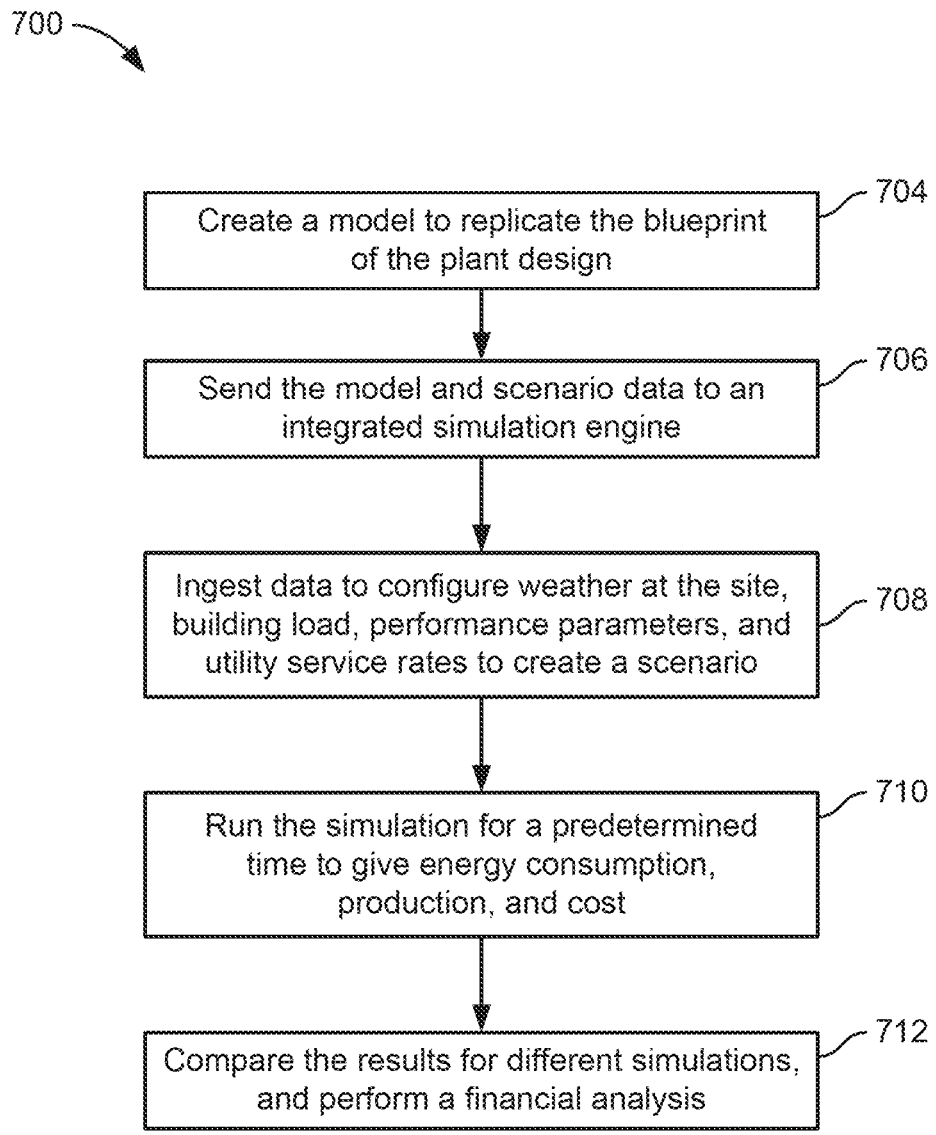
FIG. 7 is a flow diagram of a platform for comparing plant design models, according to some embodiments.

As depicted in the flow diagram 700 of FIG. 7, an economic feasibility platform, such as Planning Tool 600, can analyze and compare various plant designs through simulation data. The economic feasibility platform can model a specific plant design (step 704). Then, the model along with integrated scenario data are sent to an integrated Simulation Engine comprising one or more predictive algorithms (step 706). In some embodiments, the integrated Simulation Engine can be demand response optimizer 630. In other embodiments, the integrated Simulation Engine is hosted externally as an A3S (Application as a Service). The integrated Simulation Engine can configure a scenario under which to run simulation algorithms on the integrated data (step 708) and can generate simulation results over a user-defined simulation time (step 710). The simulation results can be presented to a user and undergo additional financial analysis (712). Financial analysis can include any of the financial performance data discussed in relation to the financial performance analyzer 636.

Generating the plant design model in step 704 can be performed by a user via configuration tools 618 and equipment models 620. For example, a model can be created and validated by a Planning Tool as described in the U.S. patent application Ser. No. 16/370,632. In another embodiment, a plant design model is retrieved from plan information database 626.

Step 706 gathers pertinent scenario data to be used in the simulation. The scenario data provides information to the simulator to define what conditions and parameters under which the model should be optimized and simulated. Scenario data can include, but is not limited to, plant site environment data, expected or hourly load profiles, component efficiencies, and utility costs. In some embodiments, scenario data can be based on known or historical data for a given location or plant. In some embodiments, the scenario data is retrieved from internal memory or an external database such as plan information database 726. In another embodiment, the scenario is retrieved from external sources, such as a weather data service or utility provider server. The model and gathered data are sent to the Simulation Engine.

The simulation scenario is configured in step 708. In some embodiments, scenario data is defined or mapped for individual increments of time. For example, for every hour in a three month period of time, an outside temperature, load demand, and utility rate are defined for a central plant system or subsystem. In other embodiments, scenarios can be generalized into broad categories for simulation for simulated time intervals. For example, loads may be generalized as a high occupancy scenario or a low occupancy scenario. In another example, weather forecasts may be generalized as mild weather conditions or turbulent weather conditions. Such condition generalizations can be combined in periodic segments so as to replicate periodic trends (e.g., high occupancy in the day, low occupancy at night, or warm weather in the summer, cold weather in the winter). In some embodiments, the same plant design model may be optimized and simulated for multiple different scenarios. Such embodiments may be advantageous when the exact conditions of operation are unknown or otherwise difficult to predict. For example, a plant design may be optimized and simulated under various occupancy conditions to understand the profitability in different long-term load demands. In another example, a plant design may be simulated using two different utility providers.

Step 710 simulates the given plant design model under the scenario to generate simulation data. Simulation results can include, but is not limited to, first year total energy cost, other energy consumption data, initial system costs, yearly system operating costs, performance metrics, and load profiles for the data and specified simulation time line. In some embodiments, step 710 also includes optimization algorithms to identify optimal asset allocation or component capacities as described in relation to FIG. 4.

Simulation result data is displayed to a user of Planning Tool for further economic analysis in step 712. The derived Energy Cost can serve a basis of comparison between varied replicated client site models being compared in order to derive the best fit model. In some embodiments, a user indicates one or more simulation results to generate financial performance data. Generation of the economic analysis can be performed by financial performance analyzer 636. In other embodiments, financial performance data can be retrieved from results database 628 from previously analyzed plant designs or simulations.

Financial Performance Calculator

Figure 8:
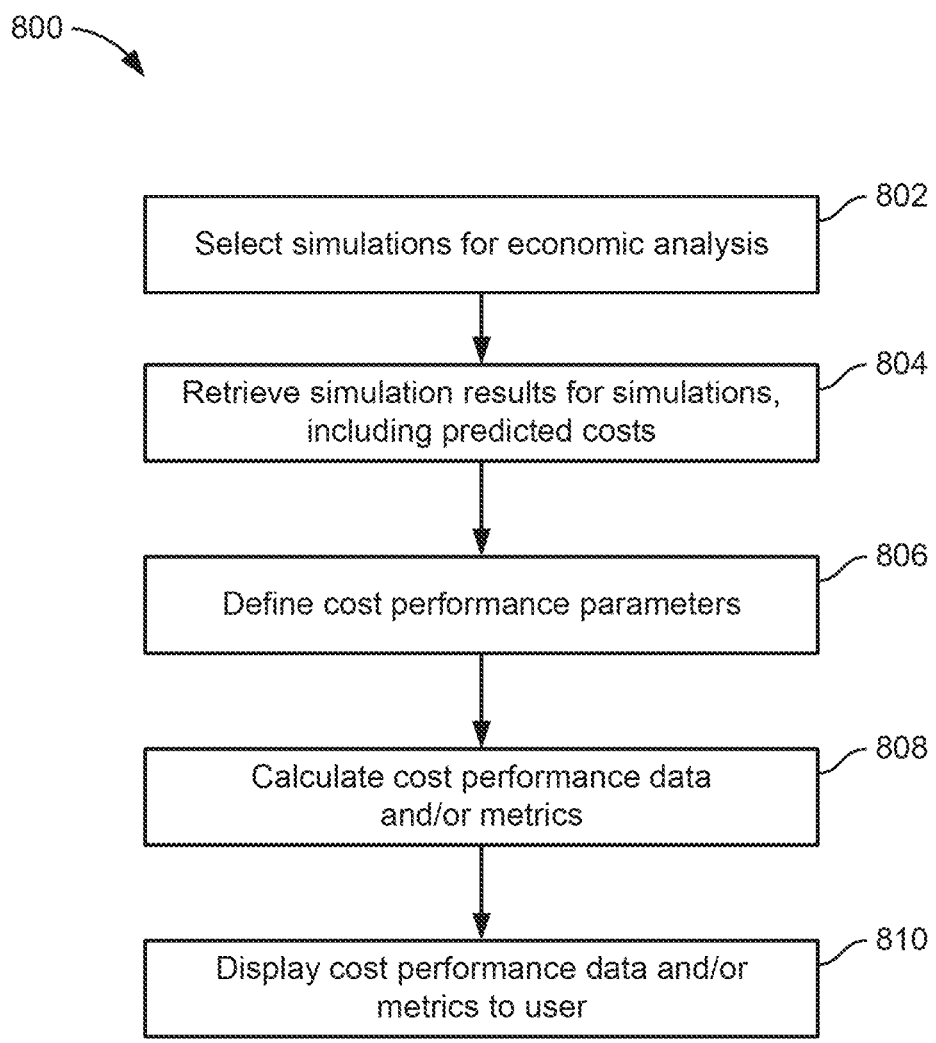
FIG. 8 is a flow diagram for analyzing the predictive financial performance of a plant design, according to some embodiments.

FIG. 8 depicts a process diagram 800 for generating and analyzing financial performance data, in accordance with some embodiments. Process 800 identifies one or more simulations for economic analysis (step 802) and retrieves predicted cost data from simulation results associated with the simulations (step 804), defines relevant expense and savings parameters (step 806), generates financial performance data for the identified simulations based on the defined parameters (step 808), and displays the resulting financial performance data to a user via a user interface (step 810). In some embodiments, process 800 is performed by financial performance analyzer 636. In some embodiments, process 800 is performed in step 712 of process 700.

In step 802, an indication to assess the economic feasibility of one or more simulation results is received. In some embodiments, a user makes the indication in a generated user interface, such as the Simulation Results screen of a Planning Tool platform. In some embodiments, the indication includes a request to compare two or more simulations in the same view or graphical element of the user interface. In other embodiments, all performed simulations are automatically selected for economic analysis.

In step 804, simulation data is retrieved for the one or more selected simulations. The simulation data can include any simulation data generated by the Simulation Engine. In some embodiments, the simulation data is retrieved from the demand response optimizer 630. In other embodiments, the simulation data is retrieved from results database 628. Retrieved simulation data may include a first-year operating cost of a simulated plant design. The simulation data may also include a predicted yearly operating cost or predicted yearly maintenance cost. In an example use case, the following values may be retrieved for a simulation:

| | |
|---|---|
| Initial Cost for Plant Design: | $3,000,000 |
| First Year Cost: | $174,436.93 |
| Estimated Economic Life (years): | 12 |

In step 806, parameters for economic analysis are defined. In some embodiments, a user selects which economic feasibility metrics to generate. In some embodiments, a graphical element in the user interface is generated to allow user input for choosing analysis parameters. In some embodiments, a user selects parameter values from a list of previously used or predetermined values. In other embodiments, a user inputs new values for analysis parameters. In some embodiments, the generated user interface allows a user to change and adjust analysis parameters so as to dynamically calculated economic feasibility metrics. In some embodiments, some or all of the analysis parameters are automatically generated or retrieved by the computing system. In some embodiments, the analysis parameters are retrieved from the simulation data. Step 806 may also define thresholds for financial performance metrics to indicate a favorable or acceptable plant design under the simulated scenario.

In some embodiments, a user can dynamically add or remove analysis parameters or cash flows for consideration in the economic analysis. For example, a user may wish to consider projected maintenance costs or some other cost in the feasibility analysis. In some such embodiments, the new analysis parameter or cash flow may be based on data available in the simulation data. In other such embodiments, the new analysis parameter or cash flow is not related to simulation data and must be estimated and input by the user. For example, a user may wish to consider maintenance costs in the economic analysis. Estimated maintenance costs may be generated as a part of the simulation data, or a user may be required to estimate the maintenance cost and input the estimation into the system. Separate cash flows may be added or removed by the user such that different time-phase rates can be used for different cash flow types.

In an example embodiment, a baseline cost is required to be defined, the baseline cost being a budget or current operating cost to which new plant design costs should be compared. A discount rate can be defined to convert future cash flows into a NPV. A savings escalation rate can be defined to predict future savings cash flows to future time intervals in time-phased calculations. A maintenance escalation rate can be defined to predict future maintenance costs, which can be a different rate than the savings escalation rate or the discount rate. Step 806 may also define a forecast period or evaluation period for economic analysis. In some embodiments, the evaluation period may be automatically defined based on the estimated usable life of the plant design. In some embodiments, the initial cost of a plant design or a plant design's estimated yearly cost can be input by a user rather than determined from the simulation data. Thresholds for NPV, IRR, and payback period can be specified, and can be numerical or relative to other parameters. Example analysis parameters for an example use case may be:

| | |
|---|---|
| Baseline Cost/Yearly Budget: | $990,000 |
| Savings Escalation Rate (%) | 15% |
| Maintenance Cost 1st Year: (Can be included in | $30,000 |
| Maintenance Cost Escalation (%) | 2% |
| Discount Rate (%) | 10.0% |
| Evaluation Period (If defined separately than Estimated Economic Life) | 12 years |
| NPV Threshold | 0 |
| IRR Threshold | 10.0% |
| Payback Period Threshold: | Evaluation period |

At step 808, the financial performance data is calculated. The financial performance data can be any of the economic feasibility metrics or predictive financial data described herein, such as an NPV, IRR, payback period, and predicted cash flows. Step 808 may also compare a generated financial performance metric to a defined threshold to determine if the plant design is economically feasible, and generate additional data indicating the acceptability of the plant design. The acceptability data may, in some embodiments, be calculated as a combination of several economic feasibility metrics. In some embodiments, step 808 only indicates a plant design is acceptable if every economic feasibility metric passes its respective acceptability test. In an example use case, step 808 may generate the following financial performance data:

| | |
|---|---|
| Year One Savings: (Baseline – First Year Cost) | $815,563.07 |
| NPV: | $8,271,973.79 |
| Acceptable NPV? | Yes |
| IRR: | 38.682167% |
| Acceptable IRR? | Yes |
| Payback Period: | 3.82 years |
| Acceptable Payback Period? | Yes |

At step 810, the system displays the financial performance data to a user. A user can assess the results to determine if a modeled plant design associated with the simulation result can be considered as a viable solution. In some embodiments, financial performance data is displayed in data tables or graphs. In some embodiments, step 810 provides a graphical element in a user interface to display the financial performance data. In such embodiments, the graphical element may allow a user to select a "View Cash Flow" option to view cash flow data for one or more simulated models. In some embodiments, step 810 displays data for one more plant designs in the same graphical element so as to organize the multiple simulation results and compare the economic viability of multiple simulated plant designs.

Planning Tool User Interface

The Planning Tool 600 can generate various user interfaces for display to a user via computing device 622. The generated user interfaces can be used to implement the steps and functions of processes 700 and/or 800. Graphical user interfaces (GUI) can comprise graphical elements which display data to a user and can be configured to receive user input. A graphical user interface may be generally navigable via standard interface gestures, such as scrolling, panning, or zooming in or out in the display. The user interface may exist within a user application, including, but not limited to, an HTML, browser, internet browser, local application, or other program. The user interface can display graphical elements in a separate window, pop-up, or panel.

Graphical elements can display data to a user in a variety of ways, such as, but not limited to, data tables or charts, graphs (e.g., pie graph, line graph, bar graph, data plot, etc.), symbols, stylistic differences (e.g., different colors, fonts, underline, bolding, highlighting, shapes, etc.), or any other graphical means to display data. Herein, data described to be included in the same graphical element implies data is displayed jointly, in close proximity, organized together, or otherwise displayed together. A graphical element can receive user input in a variety of ways, such as, but not limited to, text input, selection lists or menus, text search, slide bars, a selectable icon, button or symbol, or any other means of user input.

Referring now to FIG. 9-12, several examples of user interface 624 are shown, according to various embodiments. As discussed above, user interface 624 may be generated by planning tool 600 and displayed to a user via client device 622. Client device 622 may be a personal computer, laptop, smartphone, tablet, workstation, or any other type of suitable computing device. In some embodiments, planning tool 600 is implemented as a cloud-based SaaS (i.e., software as a service) application and can be accessed via an electronic network (e.g., via web services 614). Planning tool 600 may be used by personnel such as application engineers, commissioning engineers, and technicians to facilitate the design of a central plant. The example user interfaces of FIG. 9-12 are depicted to be illustrative and should not be regarded as strictly limiting. It should be appreciated that the various elements both included and not included in the different user interfaces can be rearranged, excluded, included, and otherwise transformed between the various examples without deviating from the scope of this disclosure.

Figure 9:
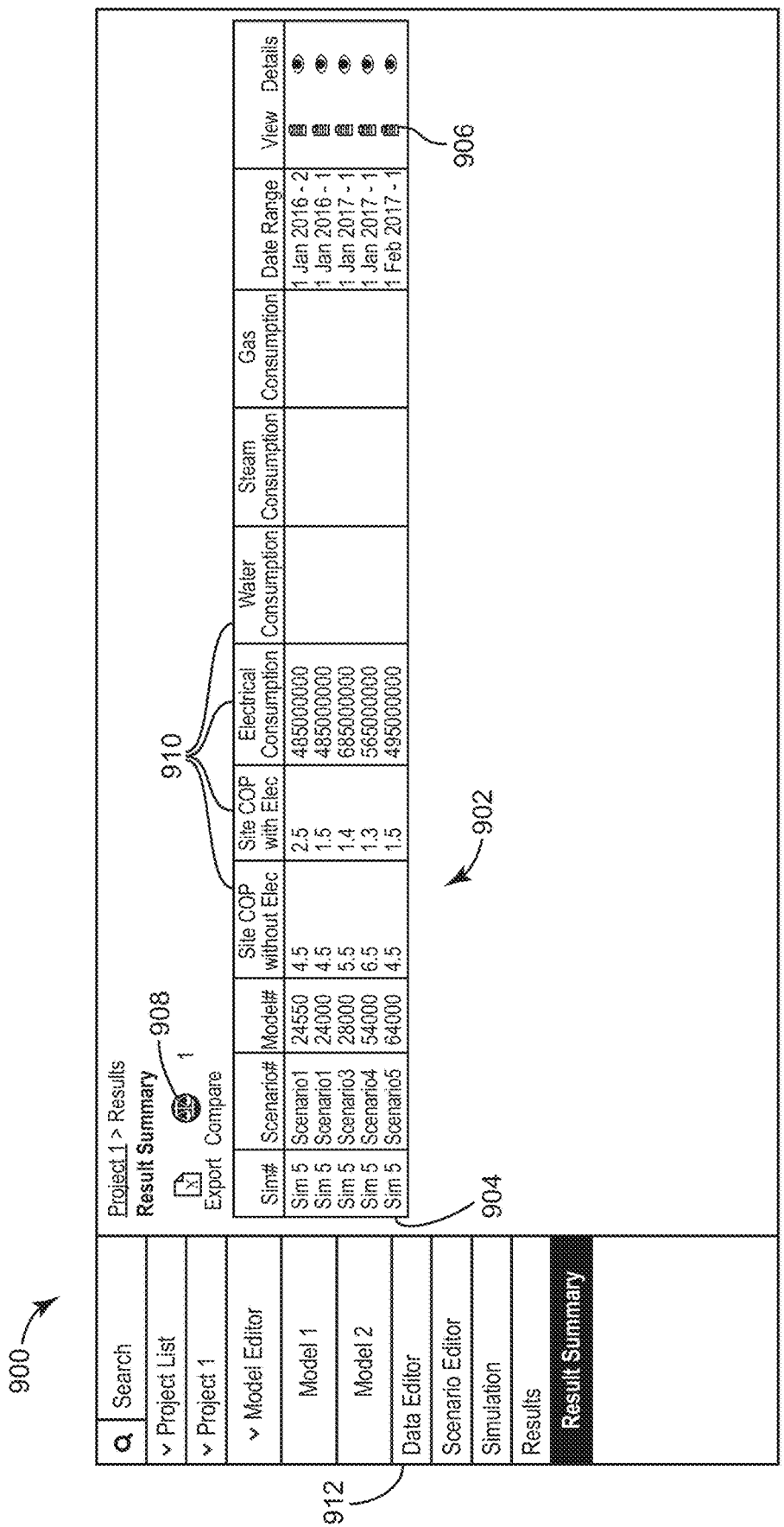
FIG. 9 is an illustration of a user interface associated with the planning tool of FIG. 6, according to some embodiments.

Referring now to FIG. 9, an example GUI 900 is shown. In some embodiments, GUI 900 is a simulation results summary display for various performed simulations. A graphical element 902 may identify and display the various performed simulations, such as simulation 904. A simulation may be identified by a simulation number, a model number and scenario number, or a user defined alias. Graphical element 902 may comprise simulation data 910 associated with its respective simulation and/or plant design. GUI 900 can comprise a selectable input, such as selectable icon 906 to indicate to display an economic feasibility analysis of a specified simulated plant design. Similarly, GUI 900 can also comprise a selectable icon 908 to indicate multiple simulations should be compared against each other based on their economic feasibility. Selectable inputs 906 and 908 can be displayed as their own graphical element, or embedded within another graphical element. GUI 900 can also contain element 912 to navigate between simulation results and user interfaces. In some embodiments, GUI 900 is used to implement step 802 and/or step 804 of process 800.

Figure 10:
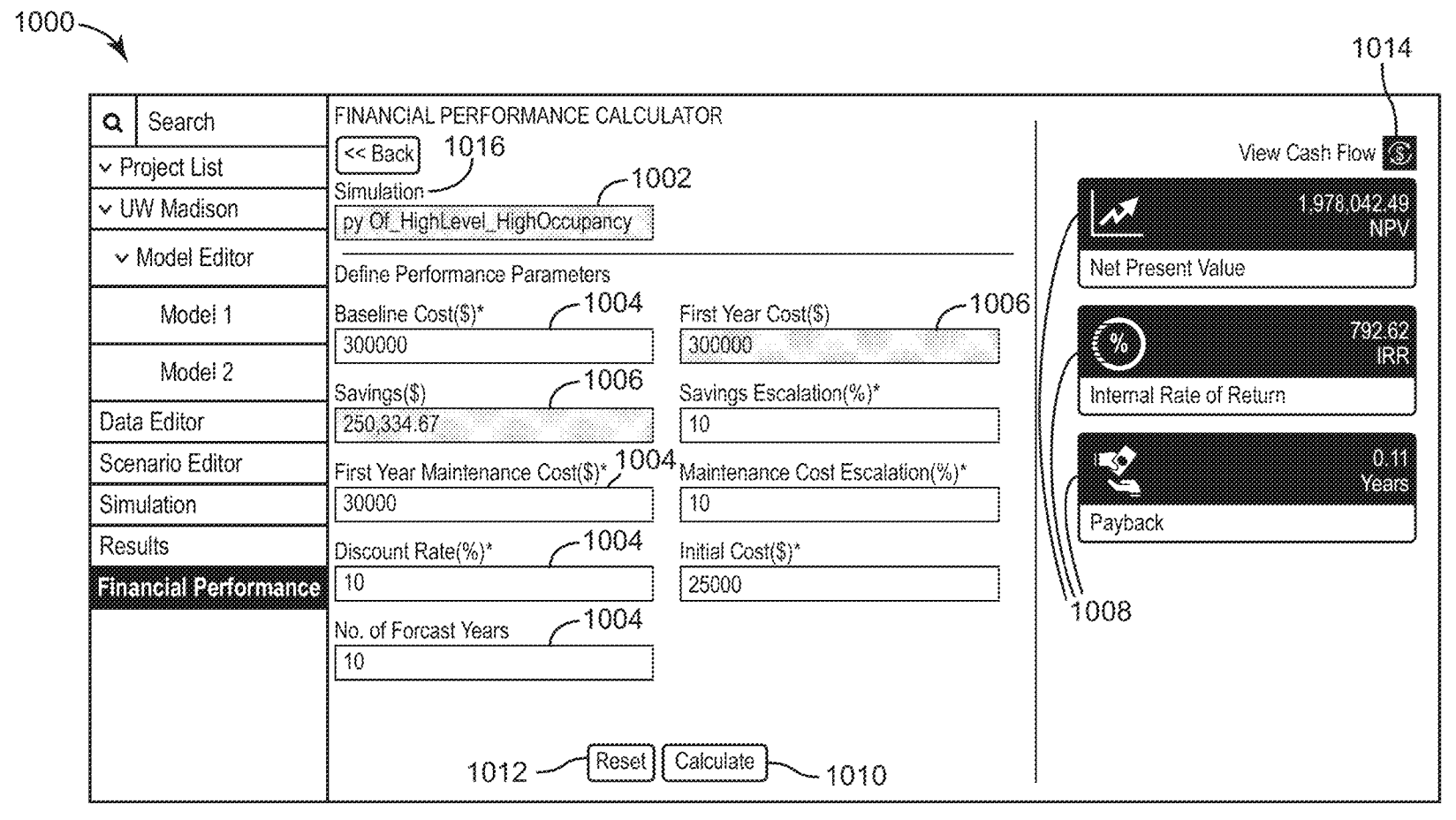

Referring now to FIG. 10, an example GUI 1000 is shown. In some embodiments, GUI 1000 is generated in response to selection of icons 906 and/or 908. In some embodiments, GUI 1000 is implemented to perform the function of step 806, 808 and/or 810 of process 800. GUI 1000 may generally define analysis parameters for generating financial performance metrics 1008. GUI 1000 may include data to identify the selected simulation such as element 1002. GUI 1000 may comprise graphical elements to accept user input for analysis parameters, such as text input 1004. GUI 1000 may also automatically define analysis parameters from the simulation data, such as in elements 1006. In some embodiments, GUI 1000 may allow a user to overwrite a value automatically defined from simulation data. In other embodiments, parameters derived from simulation data cannot be changed by a user directly. GUI 1000 can comprise a selectable element 1010 to initiate a calculation of financial performance metrics 1008. GUI 1000 can also include a selectable element 1012 to reset the economic feasibility analysis by deleting some or all of the analysis parameters. In some embodiments, the selection of element 1012 only deletes parameters defined by the user.

GUI 1000 may also comprise selectable elements to navigate between separate displays or windows. For example, GUI 1000 may contain selectable element 1014, which can be selected by a user to view additional financial performance data. In one example, selectable element 1014 allows a user to see predicted cash flow data for a given economic analysis. GUI 1000 may also contain a selectable element 1016 to return to a simulation results page, such as GUI 900, to select a different simulation for economic analysis.

Figure 11:
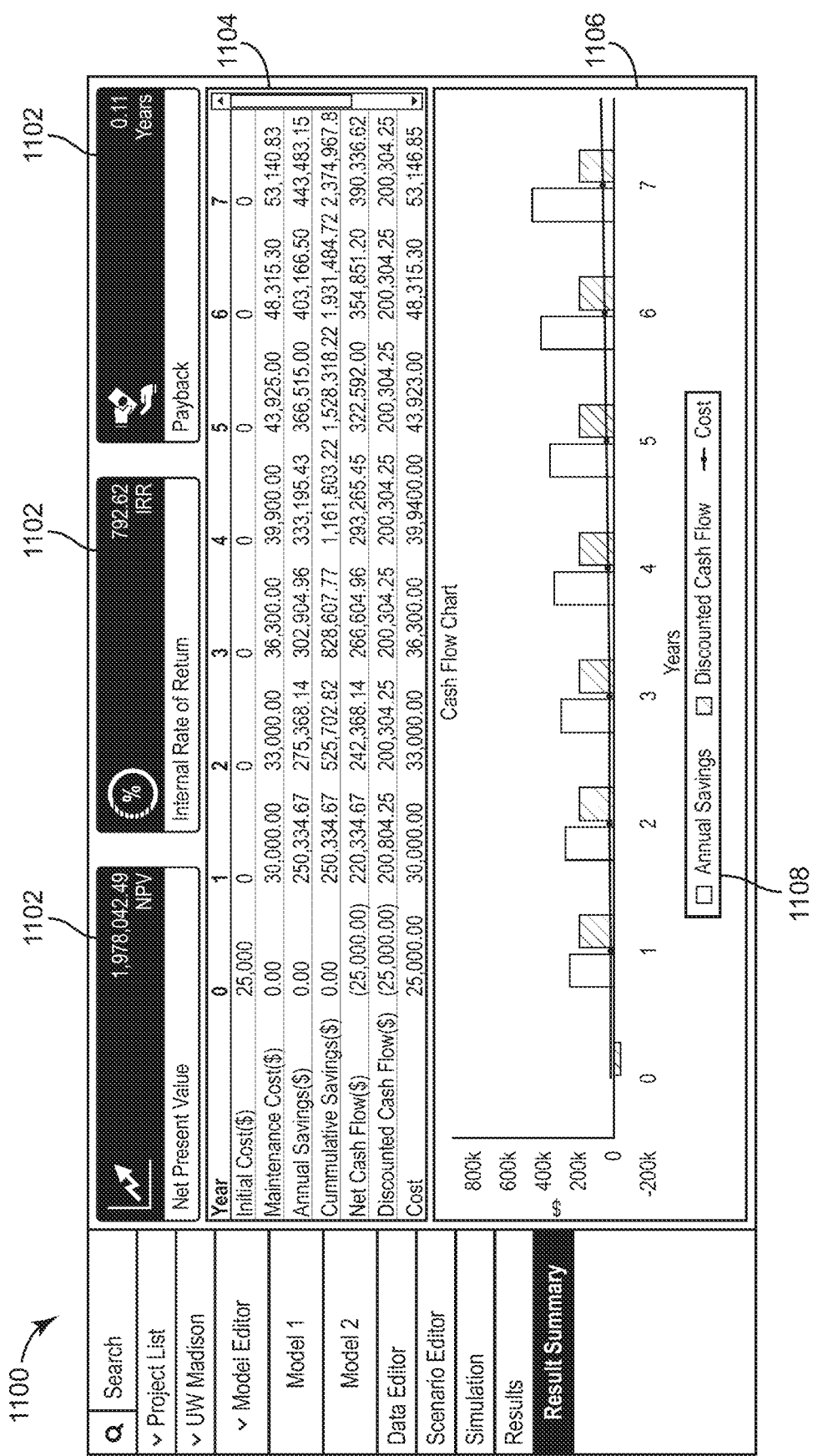
FIG. 11 is another illustration of a user interface associated with the planning tool of FIG. 6, according to some embodiments.

Referring now to FIG. 11, another example GUI 1100 is shown. GUI 1100 may comprise one or more financial performance metrics 1102, and thus can be used in some embodiments to perform the function of step 810 of process 800. Financial performance metrics can be the same or different than the financial performance metrics 1008. GUI 1100 may display predictive financial data in a graphical element, such as table 1104 or graph 1106. Table 1104 may be configured to display various time-phased or otherwise predicted financial data for one or more simulations. Graph 1106 may display predictive financial data in a bar graph or line graph. Graph 1106 may present different kinds of data in the same graph, as shown by legend 1108. In other embodiments, graph 1106 can show predictive financial data for two or more different simulations. Legend 1108 can be used to differentiate between the different types of data and/or associated simulations. Although not shown, GUI 1100 can also contain selectable icons to navigate between graphical elements or windows, similar to element 1014 and 1016.

Figure 12:
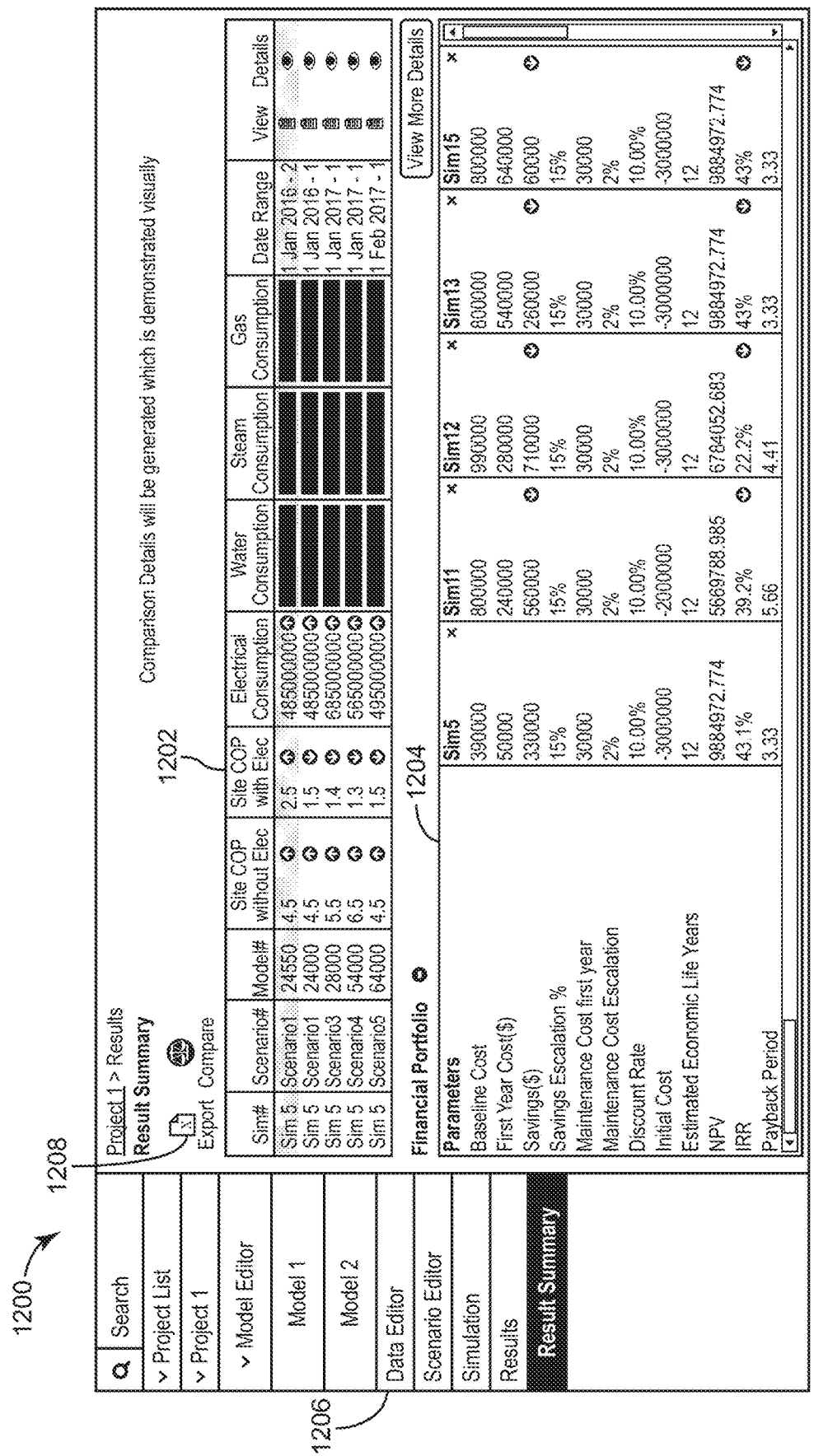
FIG. 12 is another illustration of a user interface associated with the planning tool of FIG. 6, according to some embodiments.

Referring now to FIG. 12, another example GUI 1200 is shown. In some embodiments, GUI 1200 can be used to compare the financial performance of different plant simulations. In some embodiments, GUI 1200 is generated in response to selection of icon 908 in GUI 900. GUI 1200 comprises a graphical element 1202 which contains simulation result data from one or more simulations, similar to element 902 of GUI 900. Graphical element 1202 may indicate which of a plurality of simulations has been selected by a user for comparison. GUI 1200 may output economic feasibility metrics in graphical element 1204. GUI 1200 can contain any elements for navigating with the planning tool, such as element 1206. Data presented in GUI 1200 may also be exported to an external system by selecting an icon 1208.

GUI 1200 also comprises graphical element 1204, which displays economic feasibility analyses of one or more plant design simulations. The data in graphical element 1204 can include both analysis parameters and financial performance data. In some embodiments, the displayed analysis parameters are configured to be defined or changed by a user for each simulation individually, or for a subset or group of simulations. In some embodiments, graphical element 1204 is a table with columns and rows, the columns associated with simulations and the rows associated with a type of data. Graphical element 1204 may organize the presented financial performance data according to the simulation, data type, associated plant design, or other distinction. Graphical element 1204 may present financial performance data in a style indicative of the economic feasibility of the simulated plant design. For example, an NPV value may be colored red if it does not meet the NPV threshold. In another example, an entire column associated with a simulation may be colored red if any one of the feasibility metrics is not acceptable. GUI 1200 may in some embodiments distinguish a simulation as the most optimal or feasible plant design based on the financial performance metrics.

Other Equipment, Control Objectives, and Performance Metrics

Although the systems and methods of the present disclosure are described primarily with respect to energy plants, it is contemplated that the teachings provided herein can be applied to any type of building equipment or collection of equipment that consumes electricity and/or other resources (e.g., natural gas, water, steam, etc.) during operation. Examples include HVAC equipment such as chillers, boilers, cooling towers, pumps, air handling units, rooftop units, or any other type of building equipment that can be used to provide heating, cooling, airflow, or other HVAC services to a building or other types of equipment that perform other types of building functions (e.g., security equipment, electrical equipment, networking equipment, etc.). The systems and methods described herein can also be applied to any type of equipment that generates electricity (e.g., steam turbines, electric generators, solar panels, wind turbines, etc.) or any other type of resource (e.g., hot water, chilled water, steam, etc.) either by consuming one or more input resources from a utility provider or other source (e.g., gasoline, water, natural gas, etc.) or using renewal energy or power (e.g., solar energy, wind energy, geothermal energy, etc.), which may be included in an energy plant or otherwise operate to provide electricity or other resources to a building or other equipment in the energy plant.

Although the cost function J is described primarily as accounting for monetary cost, it is contemplated that the cost function J could be modified or replaced with any type of cost function that accounts for one or more other control objectives (e.g., resource consumption, carbon emissions, occupant comfort, disease transmission risk, equipment degradation or reliability, etc.) in addition monetary cost or in place of monetary cost without departing from the teachings of the present disclosure. The terms "cost function" and "predictive cost function" are used synonymously throughout the present disclosure and both refer to the function J (or synonymously J(x)) used by planning tool 600, regardless of whether the function/accounts for monetary cost and/or other control objectives. Additionally, it should be understood that the "cost" defined by the cost function J may be a monetary cost (e.g., expressed in units of dollars or other currency) and/or other types of cost such as resource consumption (e.g., expressed in units of energy, water, natural gas, or any other resource), carbon emissions (e.g., expressed in units of carbon), occupant comfort (e.g., expressed in units of comfort), disease transmission risk (e.g., expressed in units of risk or probability), and/or equipment reliability (e.g., expressed in units of reliability or expected failures). As such, it should be appreciated that references to "cost" throughout the present disclosure are not necessarily monetary cost, but may include any other control objectives which may be desirable to optimize.

Similarly, although the simulations performed by planning tool 600 are described primarily as simulating or predicting the economic feasibility or financial performance of various plant designs, it is contemplated that the simulations performed by planning tool 600 can simulate or predict any of a variety of performance metrics in addition to or in place of financial metrics, and can be applied to any type or combination of equipment in addition to or in place of equipment of an energy plant. Examples of performance metrics that could be simulated or predicted by planning tool 600 include cost metrics (e.g., true cost, rate of return, payback period, capital expenditure, operating cost, maintenance cost, equipment degradation cost, cost of carbon offset credits, etc.), sustainability metrics (e.g., carbon emissions, water usage, global warming potential, non-carbon pollution, etc.), healthy building metrics such as an indoor air quality (IAQ) index (which may be a combination of various air quality metrics such as PM 2.5, volatile organic compounds, carbon dioxide, etc.), a probability of infection of building occupants (e.g., expected hospitalizations, expected absentee rate, reproduction number), occupant productivity, or any other types of metrics that quantify the performance of the simulated system and/or the impact or effects of the simulated system on building occupants.

Several examples of cost functions J that could be used by planning tool 600 to account for a variety of different control objectives are described below. In some embodiments, some or all of the control objectives that appear within the cost functions J or are otherwise accounted for by the cost functions J (e.g., terms that do not explicitly appear in the cost functions J but are related to terms in the cost functions J via constraints, equations, or other relationships) can be included in the set of performance metrics for which values are predicted or simulated by planning tool 600. The performance metrics can include any or all of the terms in the cost functions J or other metrics that can be calculated (e.g., using predictive models) based on the terms in the cost functions J, the decision variables that are adjusted when performing the simulations, and/or other variables that are received as inputs or generated/predicted when performing the simulations. In some embodiments, the performance metrics can include some or all of the control objectives, and similarly the control objectives can include some or all of the performance metrics. While the present disclosure uses separate terms to describe "performance metrics" and "control objectives," it should be understood that the performance metrics and control objectives may be the same in some embodiments. In various embodiments, the control objectives may be a subset of the performance metrics, or the performance metrics may be a subset of the control objectives.

In operation, planning tool 600 may run the simulations described herein using a variety of predictive models to predict values for the various performance metrics as a function of control decisions, equipment purchase decisions, equipment maintenance decisions, or other decisions related to the planning and operation of the equipment. Each simulation may be performed using a corresponding cost function J (e.g., any of the cost functions described herein or combinations thereof) and may produce a corresponding simulation result. In some embodiments, each simulation includes performing a predictive optimization process to drive the value of the corresponding cost function J toward an extremum (i.e., a maximum or minimum) by adjusting a set of decision variables. Each simulation result may include values for each performance metric in the set of performance metrics and/or other variables that are adjusted when performing the simulation but are not necessarily performance metrics.

One example of a cost function J that can be used by planning tool 600 is a monetary cost function such as:

$$J = \sum_{r=1}^{p} \sum_{k=1}^{n} c_{r,k} * x_{r,k}$$

where $x_{r,k}$ is the amount of resource r purchased or received from an electric utility, energy grid, or other energy sources at time step k (e.g., kW or kWh of electricity, liters of water, therms or BTUs of natural gas, etc.), $c_{r,k}$ is the per unit cost of resource r at time step k (e.g., $/kW, $/kWh, $/liter, $/therm, $/BTU, etc.), p is the total number of resources (e.g., electricity, natural gas, water, etc.), and n is the total number of time steps within the optimization horizon or optimization period. Accordingly, this example cost function J expresses the cost in units of monetary cost (e.g., $) and sums the total cost of all resources (i.e., r=1 ... p) purchased or received over all time steps (i.e., k=1 ... n) of the optimization period. The x variables are decision variables in the cost function J whereas the c variables can be predicted or estimated beforehand and provided as inputs to the cost function J.

In some embodiments, the cost function J can be modified to account for various other sources of monetary cost or cost-related metrics such as operating cost, maintenance cost, equipment purchase or replacement cost (e.g., capital cost), equipment degradation cost, cost of purchasing carbon offset credits, rate of return, payback period, and/or any of the other sources of monetary cost or cost-related metrics described in U.S. patent application Ser. No. 15/895,836 filed Feb. 13, 2018, U.S. patent application Ser. No. 16/418,686 filed May 21, 2019, U.S. patent application Ser. No. 16/438,961 filed Jun. 12, 2019, U.S. patent application Ser. No. 16/449,198 filed Jun. 21, 2019, U.S. patent application Ser. No. 16/457,314 filed Jun. 28, 2019, U.S. patent application Ser. No. 16/697,099 filed Nov. 26, 2019, U.S. patent application Ser. No. 16/687,571 filed Nov. 18, 2019, U.S. patent application Ser. No. 16/518,548 filed Jul. 22, 2019, U.S. patent application Ser. No. 16/899,220 filed Jun. 11, 2020, U.S. patent application Ser. No. 16/943,781 filed Jul. 30, 2020, and/or U.S. patent application Ser. No. 17/017,028 filed Sep. 10, 2020. The entire disclosures of each of these patent applications are incorporated by reference herein. In some embodiments, the cost function used by planning tool 600 may include any of the cost functions or portions of the cost functions described in these patent applications.

In some embodiments, the cost function J can be modified to account for various sources of revenue such as revenue generated by participating in incentive-based demand response (IBDR) programs, revenue generated by selling resources back to the electric utility, energy grid, or other resource suppliers, revenue generated by selling resources to resource purchasers or to an energy grid (e.g., selling electricity previously purchased or generated by the system to the electric utility, energy grid, or an energy market), or any other sources of revenue that can be obtained by operating the building equipment. The revenue generated may be an additional term of the cost function J which subtracts from the first term in the example cost function J shown above.

For example, planning tool 600 may be configured to estimate the revenue generation potential of participating in various incentive-based demand response (IBDR) programs. In some embodiments, planning tool 600 receives an incentive event history from incentive programs. The incentive event history may include a history of past IBDR events from the incentive programs. An IBDR event may include an invitation from the incentive programs to participate in an IBDR program in exchange for a monetary incentive. The incentive event history may indicate the times at which the past IBDR events occurred and attributes describing the IBDR events (e.g., clearing prices, mileage ratios, participation requirements, etc.). Planning tool 600 may use the incentive event history to estimate IBDR event probabilities during the optimization period.

Planning tool 600 may generate incentive predictions including the estimated IBDR probabilities, estimated participation requirements, an estimated amount of revenue from participating in the estimated IBDR events, and/or any other attributes of the predicted IBDR events. Planning tool 600 may use the incentive predictions along with predicted loads (e.g., predicted electric loads of the building equipment, predicted demand for one or more resources produced by the building equipment, etc.) and utility rates (e.g., energy cost and/or demand cost from electric utility 411) to determine an optimal set of control decisions for each time step within the optimization period. Several examples of how incentives such as those provided by IBDR programs and others that could be accounted for in the predictive cost function J are described in greater detail in U.S. patent application Ser. No. 16/449,198 titled "Model Predictive Maintenance System with Incentive Incorporation" and filed Jun. 21, 2019, U.S. patent application Ser. No. 17/542,184 titled "Control System with Incentive-Based Control of Building Equipment" and filed Dec. 3, 2021, U.S. patent application Ser. No. 15/247,875 titled "Building Management System with Electrical Energy Storage Optimization Based on Statistical Estimates of IBDR Event Probabilities" and filed Aug. 25, 2016, U.S. patent application Ser. No. 15/247,879 titled "Building Management System with Electrical Energy Storage Optimization Based on Benefits and Costs of Participating in PBDR and IBDR Programs" and filed Aug. 25, 2016, and U.S. patent application Ser. No. 15/247,881 titled "Building Control System with Optimization of Equipment Life Cycle Economic Value While Participating in IBDR and PBDR Programs" and filed Aug. 25, 2016. The entire disclosures of each of these patent applications are incorporated by reference herein.

Another example of a cost function J that can be used by planning tool 600 is a resource consumption cost function such as:

$$J = \sum_{r=1}^{p}\sum_{k=1}^{n} w_r * x_{r,k}$$

where $x_{r,k}$ is the amount of resource r consumed by the building equipment at time step k (e.g., kW or kWh of electricity, liters of water, therms of natural gas, etc.), $w_r$ is a weighting factor applied to resource r in order to covert each resource to common units (e.g., unit/kW, unit/kWh, unit/liter, unit/therm, etc.) and define the relative importance of each resource, p is the total number of resources (e.g., electricity, natural gas, water, etc.), and n is the total number of time steps within the optimization horizon or optimization period. Accordingly, this example cost function J expresses the cost in units of resource consumption and sums the total consumption of all resources (i.e., r=1 . . . p) over all time steps (i.e., k=1 . . . n) of the optimization period. The x variables are decision variables in the cost function J whereas the w variables can be provided as inputs to the cost function J to define the relative importance of each resource.

In some embodiments, resource production or discharge by the building equipment or other equipment within the system (e.g., the output of solar panels or on-site renewable energy generation, resources produced by the building equipment, resources discharged from storage such as batteries, etc.) is accounted for as negative resource consumption (i.e., negative values of the x variables) in the cost function J. Conversely, resource consumption within the system (e.g., resources consumed by the building equipment, resources charged into storage such as batteries, etc.) is accounted for as positive resource consumption (i.e. positive values of the x variables) in the cost function J. In some embodiments, each value of $x_{r,k}$ in the cost function J represents the net resource consumption of a particular resource r at time step k by all components of the system. For example, the cost function J may be subject to a set of constraints that define $x_{r,k}$ as the sum of all sources of resource consumption of resource r at time step k minus the sum of all sources of resource production of resource r at time step k.

Another example of a cost function J that can be used by planning tool 600 is a carbon emissions cost function such as:

$$J = \sum_{r=1}^{p}\sum_{k=1}^{n} \beta_{r,k} * x_{r,k}$$

where $x_{r,k}$ is the amount of resource r consumed by the building equipment at time step k (e.g., kW or kWh of electricity, liters of water, therms of natural gas, etc.), $\beta_{r,k}$ represents an amount of carbon emissions per unit of consumption or resource r at time step k (e.g., carbon emissions per kW, carbon emissions per kWh, carbon emissions per liter, carbon emissions per therm, etc.) in order to translate resource consumption into units of carbon emissions, p is the total number of resources (e.g., electricity, natural gas, water, etc.), and n is the total number of time steps within the optimization horizon or optimization period. Accordingly, this example cost function J expresses the cost in units of carbon emissions and sums the total carbon emissions resulting from consumption of all resources (i.e., r=1 ... p) over all time steps (i.e., k=1 n) of the optimization period. The x variables are decision variables in the cost function J whereas the β variables can be provided as inputs to the cost function J to define the relationship between carbon emissions and resource consumption for each resource.

In some embodiments, the β variables include marginal operating emissions rates (MOER) for resources purchased from electric utility 411 or energy grid and/or other translation factors that translate between amounts of resource consumption and corresponding amounts of carbon emissions. Several examples of how MOER can be incorporated into a cost function as well as other examples of cost functions that account for carbon emissions or other sustainability metrics or sustainability factors are described in detail in U.S. Provisional Patent Application No. 63/194,771 filed May 28, 2021, U.S. Provisional Patent Application No. 63/220,878 filed Jul. 12, 2021, U.S. Provisional Patent Application No. 63/246,177 filed Sep. 20, 2021, and U.S. patent application Ser. No. 17/483,078 filed Sep. 23, 2021. The entire disclosures of each of these patent applications are incorporated by reference herein. In some embodiments, the cost function used by the predictive controller may include any of the cost functions or portions of the cost functions described in these patent applications.

Although carbon emissions is provided as one example of a sustainability metric that can be accounted for in the cost function J, it is contemplated that the carbon emissions term can be replaced with any other sustainability control objective or sustainability metric (e.g., water usage, global warming potential, non-carbon pollution, etc.), or other sustainability control objectives or sustainability metrics can be added as additional terms in the cost function J in addition to the carbon emissions term. In sustainability cost functions that account for other sustainability metrics, the β variables can include coefficients that translate the values of the decision variables into units of the corresponding sustainability control objective (e.g., amount of water consumption per unit of resource consumption or resource production, amount of global warming potential per unit of resource consumption or resource production, amount of non-carbon pollution per unit of resource consumption or resource production).

Another example of a cost function J that can be used by planning tool 600 is an occupant comfort cost function such as:

$$J = \sum_{l=1}^{m}\sum_{k=1}^{n} w_{l,k} * x_{comfort_{l,k}}$$

where $x_{comfort_{l,k}}$ represents occupant comfort within building zone l at time step k, $w_{l,k}$ is a weight that represents the relative importance of occupant comfort within building zone l at time step k, m is the total number of building zones, and n is the total number of time steps in the optimization period or optimization horizon. Accordingly, this example cost function J expresses the cost in units of occupant comfort and sums the total occupant comfort over all building zones (i.e., l=1 ... m) over all time steps (i.e., k=1 n) of the optimization period. The weights $w_{l,k}$ can be set to prioritize occupant comfort in some building zones over others (e.g., based on whether the building zone is occupied or unoccupied, based on the identity of the occupants, etc.) and/or to prioritize occupant comfort at certain times of day over other times of day (e.g., prioritize occupant comfort during business hours). In some embodiments, the weights $w_{l,k}$ are provided as inputs to the cost function J, whereas the occupant comfort variables $x_{comfort_{l,k}}$ are decision variables in the cost function J.

In some embodiments, occupant comfort $x_{comfort_{l,k}}$ can be defined objectively based on the amount that a measured or predicted building condition (e.g., temperature, humidity, airflow, etc.) within the corresponding building zone l deviates from a comfort setpoint or comfort range at time step k. If multiple different building conditions are considered, the occupant comfort $x_{comfort_{l,k}}$ can be defined as a summation or weighted combination of the deviations of the various building conditions relative to their corresponding setpoints or ranges. An exemplary method for predicting occupant comfort based on building conditions is described in U.S. patent application Ser. No. 16/943,955 filed Jul. 30, 2020, the entire disclosure of which is incorporated by reference herein. In some embodiments, occupant comfort $x_{comfort_{l,k}}$ can be quantified based on detected or predicted occupant overrides of temperature setpoints and/or based on predicted mean vote calculations. These and other methods for quantifying occupant comfort are described in U.S. patent application Ser. No. 16/405,724 filed May 7, 2019, U.S. patent application Ser. No. 16/703,514 filed Dec. 4, 2019, and U.S. patent application Ser. No. 16/516,076 filed Jul. 18, 2019, each of which is incorporated by reference herein in its entirety.

Another example of a cost function J that can be used by planning tool 600 is a disease transmission or infection risk cost function such as:

$$J = \sum_{l=1}^{m}\sum_{k=1}^{n} w_{l,k} * x_{infection_{l,k}}$$

where $x_{infection_{l,k}}$ represents the risk of infection or disease transmission (e.g., infection probability, expected hospitalizations, expected absentee rate, reproduction number, etc.) within building zone l at time step k, $w_{l,k}$ is a weight that represents the relative importance of the risk of infection or disease transmission within building zone l at time step k, m is the total number of building zones, and n is the total number of time steps in the optimization period or optimization horizon. Accordingly, this example cost function J expresses the cost in units of the risk of infection or disease transmission and sums the total risk of infection or disease transmission over all building zones (i.e., l=1 ... m) over all time steps (i.e., k=1 n) of the optimization period. The weights $w_{l,k}$ can be set to prioritize the risk of infection or disease transmission in some building zones over others (e.g., based on whether the building zone is occupied or unoccupied, based on the health status of the occupants, etc.) and/or to prioritize the risk of infection or disease transmission at certain times of day over other times of day (e.g., prioritize times that occur during business hours or hours of expected occupancy). In some embodiments, the weights $w_{l,k}$ are provided as inputs to the cost function J whereas the occupant comfort variables $x_{comfort_{l,k}}$ are decision variables in the cost function J.

In some embodiments, the infection risk $x_{infection_{l,k}}$ is predicted using a dynamic model that defines infection risk within a building zone as a function of control decisions for that zone (e.g., ventilation rate, air filtration actions, etc.) as well as other variables such as the number of infectious individuals within the building zone, the size of the building zone, the occupants' breathing rate, etc. For example, the Wells-Riley equation can be used to quantify the infection risk $x_{infection_{l,k}}$ of airborne transmissible diseases. In some embodiments, the infection risk $x_{infection_{l,k}}$ can be predicted as a function of a concentration of infectious quanta within the building zone, which can in turn be predicted using a dynamic infectious quanta model. Several examples of how infection risk and infectious quanta can be predicted as a function of control decisions for a zone are described in detail in U.S. Provisional Patent Application No. 62/873,631 filed Jul. 12, 2019, U.S. patent application Ser. No. 16/927,318 filed Jul. 13, 2020, U.S. patent application Ser. No. 16/927,759 filed Jul. 13, 2020, U.S. patent application Ser. No. 16/927,766 filed Jul. 13, 2020, U.S. patent application Ser. No. 17/459,963 filed Aug. 27, 2021, and U.S. patent application Ser. No. 17/393,138 filed Aug. 3, 2021. The entire disclosures of each of these patent applications are incorporated by reference herein. In some embodiments, the predictive cost function J used by the predictive controller and/or the predictive models or constraints used in combination with the cost function J may include any of the cost functions, predictive models, or constraints described in any of these patent applications.

Although infection risk or infection probability are provided as examples of performance metric that can be accounted for in the cost function J, it is contemplated that the infection probability/risk term can be replaced with any other healthy building control objective or healthy building metric (e.g., indoor air quality index, occupant productivity, etc.), or other healthy building control objectives or healthy building metrics can be added as additional terms in the cost function J in addition to the infection probability term. In cost functions that account for other healthy building metrics, the weights $w_{l,k}$ can be set to prioritize the air quality or occupant productivity in some building zones over others and/or to prioritize the air quality or occupant productivity at certain times of day over others.

Another example of a cost function J that can be used by planning tool 600 is a reliability cost function such as:

$$J = \sum_{d=1}^{v}\sum_{k=1}^{n} w_{d,k} * x_{reliability_{d,k}}$$

where $x_{reliability_{d,k}}$ represents the reliability of device d of the set of building equipment at time step k, $w_{d,k}$ is a weight that represents the relative importance of device d at time step k, v is the total number of devices, and n is the total number of time steps in the optimization period or optimization horizon. Accordingly, this example cost function J expresses the cost in units of device reliability and sums the total reliability over all devices (i.e., d=1 . . . v) over all time steps (i.e., k=1 . . . n) of the optimization period. The weights $w_{d,k}$ can be set to prioritize the reliability of some devices over others (e.g., based on whether the device is critical to the operation of the system, based on the relative costs of replacing or repairing the devices, etc.) and/or to prioritize reliability at certain times of day over other times of day (e.g., prioritize reliability during business hours or when the building is occupied). In some embodiments, the weights $w_{d,k}$ are provided as inputs to the cost function J whereas the reliability variables $x_{reliability_{d,k}}$ are decision variables in the predictive cost function J.

In some embodiments, the reliability $x_{reliability_{d,k}}$ of a given device is a function of control decisions for the device, its degradation state, and/or an amount of time that has elapsed since the device was put into service or the most recent time at which maintenance was conducted on the device. Reliability $x_{reliability\ d,k}$ can be quantified and/or predicted using any of a variety of reliability models. Several examples of models that can be used to quantify reliability $x_{reliability\ d,k}$ and predict reliability values into the future are described in U.S. patent application Ser. No. 15/895,836 filed Feb. 13, 2018, U.S. patent application Ser. No. 16/418,686 filed May 21, 2019, U.S. patent application Ser. No. 16/438,961 filed Jun. 12, 2019, U.S. patent application Ser. No. 16/449,198 filed Jun. 21, 2019, U.S. patent application Ser. No. 16/457,314 filed Jun. 28, 2019, U.S. patent application Ser. No. 16/697,099 filed Nov. 26, 2019, U.S. patent application Ser. No. 16/687,571 filed Nov. 18, 2019, U.S. patent application Ser. No. 16/518,548 filed Jul. 22, 2019, U.S. patent application Ser. No. 16/899,220 filed Jun. 11, 2020, U.S. patent application Ser. No. 16/943,781 filed Jul. 30, 2020, and/or U.S. patent application Ser. No. 17/017,028 filed Sep. 10, 2020. The entire disclosures of each of these patent applications are incorporated by reference herein.

Although several examples of the cost function J are provided, it should be appreciated that these are merely examples of potential cost functions that could be used and should not be regarded as limiting. Additionally, it is contemplated that the cost function J may include multiple terms that account for multiple different control objectives within a single cost function. For example, the monetary cost function and carbon emissions cost function shown above can be combined to generate a single predictive cost function J that accounts for both monetary cost and carbon emissions such as:

$$J = w_1 \sum_{r=1}^{p}\sum_{k=1}^{n} c_{r,k} * x_{r,k} + w_2 \sum_{r=1}^{p}\sum_{k=1}^{n} \beta_{r,k} * x_{r,k}$$

where $w_1$ and $w_2$ are weights that are used to assign the relative importance of the monetary cost defined by the first term and the carbon emissions cost defined by the second term in the overall cost function J and the remaining variables are the same as described with reference to the monetary cost function and carbon emissions cost function above. It is contemplated that any of the cost functions J described throughout the present disclosure or any of the disclosures incorporated by reference herein can be combined (e.g., by adding them together in a weighted summation and/or subtracting one or more cost functions from one or more other cost functions) to account for any combination of control objectives within a single cost function. In addition to assigning relative importance to various control objectives, the weights $w_1$ and $w_2$ may function as unit conversion factors (e.g., cost per dollar, cost per unit of carbon emissions, etc.) to translate different units associated with different control objectives into a common "cost" unit that is optimized when performing the optimization process.

In some embodiments, planning tool 600 is configured to perform an optimization process using the cost function J to drive the cost defined by the cost function J toward an optimal value (e.g., a minimum or maximum value) subject to a set of constraints. The set of constraints may include equations and/or inequalities that define relationships between variables used in the optimization process. Some of the variables that appear in the set of constraints may be provided as inputs to the optimization process and may be maintained at fixed values when performing the optimization process. Other variables that appear in the set of constraints may have time-varying values and thus may be set to different predetermined values at different time steps k. For example, the time-varying predicted loads $\hat{\ell}_k$ to be served at each time step k may be determined prior to performing the optimization process and may have different values at different time steps k. The values of such variables may be set to the predetermined values for each time step k during the optimization process.

Some constraints may be separate from the predictive cost function J and define relationships that must be satisfied when performing the optimization process. Such constraints are referred to herein as "hard constraints" because they cannot be violated and impose hard limits on the optimization process. An example of a hard constraint is a load satisfaction constraint that requires the total amount of a particular resource purchased from electric utility 411 or other resource suppliers, produced by the building equipment, and/or discharged from storage (e.g., batteries) to be greater than or equal to the total amount of that resource delivered to resource consumers, consumed by the building equipment, and stored into the storage at a given time step k. Another example of a hard constraint is an equation which requires the total power consumption of the building equipment to be equal to an amount of power consumed from electric utility 411 and an amount of power received from a non-grid energy source such as batteries. Such constraints may be provided as an inequality or equality within the set of constraints, separate from the cost function J.

Other constraints may be formulated as penalties on the value defined by the cost function J and may be included within the cost function J itself. For example, the cost function J can be modified to include a penalty term (e.g. $\Sigma_{k=1}^{n} p_k \delta_k$) that can be added to the base cost function J to define an additional penalty cost within the cost function itself. In this example, the variable $\delta_k$ represents an amount by which a constrained variable deviates from a specified value or range (i.e., an amount by which the constraint is violated) and the variable $p_k$ is the penalty per unit of the deviation. Such constraints are referred to herein as "soft constraints" because they can be violated but will incur a penalty when such violation occurs. As such, planning tool 600 will seek to avoid violating the soft constraints when performing the optimization when the penalty for violating the soft constraints (i.e., the added cost) does not outweigh the benefits (i.e., any reduction to the cost that occurs as a result of violating the soft constraints). The value of the variable $p_k$ can be set to a high value to ensure that the soft constraints are not violated unless necessary to achieve a feasible optimization result.

In some embodiments, the constraints may include one or more models that relate the decision variables in the predictive optimization process to the control objectives in the cost function/and/or the performance metrics. In general, each of the control objectives and/or the performance metrics can be related to corresponding values of the decision variables required to achieve the control objective. For example, the monetary cost control objective and/or the financial cost metrics can be related to the amounts of energy supplied from each energy source by the corresponding costs per unit energy supplied from each energy source. As another example, the carbon emissions control objective and/or the sustainability performance metrics can be related to the amounts of energy supplied from each energy source by one or more models that relate electric energy production or consumption to a corresponding amount of carbon emissions. As yet another example, the disease transmission risk control objective and/or the healthy building performance metrics can be related to the amounts of energy supplied from each energy source by one or more models that relate disease transmission risk or indoor air quality to the amounts of energy consumed to perform air filtration, purification, sanitation, circulation, or other activities that reduce disease transmission risk and increase indoor air quality but require electric energy to perform. Similar relationships or models can be used to relate the other control objectives to corresponding amounts of energy consumption or usage or other decision variables that are adjusted when performing the predictive optimization process. Accordingly, each of the control objectives and/or the performance metrics described herein can be related to the decision variables via operating constraints or predictive models and planning tool 600 can determine the specific values of the decision variables by performing the predictive optimization using the cost function J.

As described above, the cost function J may account for one or more of the control objectives by including corresponding terms in the cost function J. For example, the cost function J may include a first term that accounts for monetary cost, a second term that accounts for carbon emissions, and/or any other terms that account for any of the control objectives described herein, which may be assigned weights in the cost function J to assign a relative importance or priority to each of the control objectives. However, it should be understood that the cost function J can "account for" other items (e.g., variables, constraints, amounts of electric energy supplied from various sources, cost of the electric energy supplied, cost savings, etc.) when performing the predictive optimization without necessarily including those items within the cost function J itself.

As one example, the cost function J can "account for" amounts of electric energy supplied by various energy sources (e.g., a first amount of electric energy supplied by an energy grid source and a second amount of electric energy supplied by a second energy source) by including terms in the cost function J that represent the impact of the supplied amounts of electric energy on the control objectives that appear within the cost function J (e.g., an amount of carbon emissions that results from the supplied amounts of electric energy, a disease transmission risk that results from the supplied amounts of electric energy, etc.), even if the supplied amounts of electric energy do not appear as variables or terms within the cost function J itself. This can be accomplished, for example, using models or equations that define the relationships between the supplied amounts of electric energy and the particular variables or terms that appear within the cost function J. The models or equations can be implemented as constraints on the cost function J that are considered when performing the optimization process. This allows the amounts of electric energy to be considered as decision variables in the predictive optimization process without requiring the amounts of electric energy to appear within the cost function J.

As another example, the cost function J can "account for" a cost savings that results from supplying electric energy from a less costly energy source relative to a cost that would have been incurred if the electric energy were supplied from a more costly energy source. In this case, the cost savings represents the difference between the cost calculated by the predictive cost function and the hypothetical cost that would have been incurred had the more costly energy source supplied the electric energy. In some embodiments, the predictive cost function accounts for both (1) a cost of a first amount of electric energy supplied from a first energy source (e.g., an energy grid source) at each time step of a time period and (2) a cost savings resulting from using a second amount of the electric energy from a second energy source (e.g., a less costly energy source, a battery, renewable energy generation equipment, a green energy source, etc.) at each time step of the time period. In various embodiments, the cost savings could be accounted for by including an explicit cost savings term within the predictive cost function, or by including a term within the predictive cost function that quantifies the cost of the electric energy supplied from the second energy source. In the latter case, the "cost savings" is accounted for implicitly by the lower cost calculated by the predictive cost function relative to a hypothetical cost that would have been incurred had the second energy source been replaced with a more costly energy source.

As noted above, it should be understood that all references to "cost," "cost savings," "more costly," "less costly," "cost function," "cost characteristic," and other cost-related terms throughout the present disclosure do not necessarily refer to monetary cost (e.g., expressed in units of dollars or other currency). A "cost" or "cost savings" can be expressed in terms of any of the control objectives described herein or any other control objectives accounted for by the predictive cost function. For example, a "cost" or "cost savings" may refer to any of a variety of other types of cost such as resource consumption (e.g., expressed in units of energy, water, natural gas, or any other resource), carbon emissions (e.g., expressed in units of carbon), occupant comfort (e.g., expressed in units of comfort), disease transmission risk (e.g., expressed in units of risk or probability), equipment reliability (e.g., expressed in units of reliability or expected failures), or any other control objectives which may be desirable to optimize, either alone or in weighted combination with other control objectives. Similarly, a given energy source may be "less costly" or "more costly" than another energy source if the electric energy supplied from the given energy source causes a lesser impact or greater impact, respectively, on the control objective represented by the "cost" in the predictive cost function. Likewise, a "cost characteristic" of a given energy source or amount of electric energy received from a given energy source may include, for example, a monetary cost or price of the electric energy (e.g., $ per unit of energy or power), an amount of carbon emissions associated with the electric energy (e.g., carbon emissions per unit of energy or power), a marginal operating emissions rate (MOER) associated with the electric energy, carbon credit information (e.g., an amount or cost of carbon credits needed to compensate for the carbon emissions associated with the electric energy), other sustainability metrics or sustainability factors, or any other attribute or characteristic of the electric energy which may be relevant to any of the control objectives associated with the cost function J.

In some embodiments, planning tool 600 includes one or more processing circuits (e.g., processors, memory, circuitry, etc.) configured to perform the functional features described herein. The one or more processing circuits may be located within the same physical device (e.g., within a common housing, on a common circuit board, etc.) or may be distributed across multiple devices which may be located in multiple different locations. Accordingly, the functions of planning tool 600 are not necessarily all performed by the same physical device, but could be performed by many different physical devices distributed across various locations. For example, one or more of the processing circuits may be located within the units of building equipment that operate to consume, produce, discharge, or store various resource (e.g., within chillers, air handling units, boilers, battery units, etc.), within a local controller or field controller that communicates with the building equipment via a communications bus, a remote controller or supervisory controller that communicates with the building equipment via a communications network (e.g., the internet, a BACnet network, a local network, etc.), a server or cloud-hosted system that performs the functions of the predictive controller from a remote location, or any combination thereof.
User Interfaces for Other Control Objectives and Performance Metrics Referring again to FIGS. 9-12, it is contemplated that the various user interfaces described herein (e.g., GUI 900 shown in FIG. 9, GUI 1000 shown in FIG. 10, GUI 1100 shown in FIG. 11, GUI 1200 shown in FIG. 12) can be modified to include values of the additional control objectives and performance metrics that result from the simulations performed by planning tool 600. For example, simulation data 910 shown in GUI 900 can be expanded to include a variety of other performance metrics (e.g., additional columns could be added to GUI 900 to provide the values of the additional performance metrics). Examples of performance metrics that could be shown as additional simulation data 910 in GUI 900 include cost metrics (e.g., financial cost, rate of return, payback period, capital expenditure, operating cost, maintenance cost, equipment degradation cost, cost of carbon offset credits, etc.), sustainability metrics (e.g., carbon emissions, water usage, global warming potential, non-carbon pollution, etc.), healthy building metrics such as an indoor air quality (IAQ) index (which may be a combination of various air quality metrics such as PM 2.5, volatile organic compounds, carbon dioxide, etc.), a probability of infection of building occupants (e.g., expected hospitalizations, expected absentee rate, reproduction number), occupant productivity, or any other types of metrics that quantify the performance of the simulated system or the impact or effects of the simulated system on building occupants, or any of the other performance metrics or control objectives described herein.

In various embodiments, the additional performance metrics can be shown within the same window or page of GUI 900 along with the simulation data 910 shown in FIG. 9, or additional pages could be added to GUI 900 by including additional selectable elements 912 for each category of performance metric. For example, GUI 900 may include additional selectable elements 912 for cost metrics, sustainability metrics, healthy building metrics, or any other category of performance metrics. Similarly, additional selectable elements can be included in GUI 1000 below the "Financial Performance" element in the leftmost column for additional categories of performance metrics such as "Sustainability Performance" and "Healthy Building Performance." Selecting the "Sustainability Performance" element may cause GUI 1000 to display the values of various sustainability performance metrics that result from a selected simulation, whereas selecting the "Healthy Building Performance" element may cause GUI 1000 to display the values of the various healthy building performance metrics that result from a selected simulation.

In some embodiments, the financial performance metrics 1102, table 1104, and graph 1106 shown in GUI 1100 can be expanded or modified to include any of the other types of performance metrics described herein. For example, additional rows can be added to table 1104 to include values of the additional cost metrics, sustainability metrics, healthy building metrics, or any other performance metrics. Graph 1106 can be modified to include additional bars or lines that illustrate the values of one or more of the performance metrics (e.g., alongside the "Annual Savings" and "Discounted Cash Flow" bars for each time period) or alternatively the values of the additional performance metrics could be displayed in additional graphs presented alongside or above/below graph 1106. Similarly, the columns of graphical element 1202 and/or the rows of graphical element 1204 in GUI 1200 can be expanded to include additional columns/rows for the additional performance metrics described herein.

In some embodiments, one or more of GUI 900, GUI 1000, GUI 1100, and GUI 1200 may include selectable elements that allows a user to sort or order the simulation results presented therein based on the values of the performance metrics. For example, a user can click or select any performance metric shown in GUI 900 or GUI 1200 to cause the simulation results to be rearranged such that the simulation results are presented in ascending order or descending order according to the values of that performance metric in each simulation result within the set of simulation results. For example, if the user selects the "Carbon Emissions" performance metric, the simulation results shown in GUI 900 or GUI 1200 may be rearranged such that the simulation result with the lowest (or highest) value of the carbon emissions performance metric is presented first (e.g., as the first (top) simulation in the list of simulations 904, as the first (leftmost) simulation in graphical element 1204), followed by the simulation result with the second lowest (or highest) value of the carbon emissions performance metric, etc.

In some embodiments, planning tool 600 be configured to score the simulation results (e.g., assign a score to each of the simulation results) based on the values of multiple different performance metrics. The criteria used to assign a score to each simulation result may be the same as the criteria used to define the cost function J that was used to generate the simulation result, or may include additional or different criteria. In some embodiments, planning tool 600 is configured to calculate the total score for each simulation result as a weighted combination or summation of multiple performance metrics. One example of an equation that planning tool 600 can use to calculate the score for a given simulation result is:

$$\text{Score}_k = w_1 * \text{PM}_{1,k} + w_2 * \text{PM}_{2,k} + \ldots + w_n * \text{PM}_{n,k}$$

where $\text{Score}_k$ is the score assigned to simulation result k, $\text{PM}_{1,k} \ldots \text{PM}_{n,k}$ are the values of the performance metrics 1 ... n in simulation result k (n being the total number of performance metrics that are considered when calculating the score), and $w_1 \ldots w_n$ are the weights assigned to the corresponding performance metrics when calculating the total score. The values of the performance metrics $\text{PM}_{1,k} \ldots \text{PM}_{n,k}$ may be specific to corresponding simulation result k, such that each $\text{Score}_k$ is also specific to the corresponding simulation result k and based on the values of the performance metrics $\text{PM}_{1,k} \ldots \text{PM}_{n,k}$ in that same simulation result k. Planning tool 600 can use this equation (or any other scoring equation) for each simulation result k in the set of simulation results to calculate a score for each simulation result. The simulation results can then be presented or arranged in ascending order or descending order in GUIs 900-1200 according to the values of the scores assigned to the various simulation results.

In some embodiments, planning tool 600 can filter the simulation results or change the order in which the simulation results are arranged or presented in GUIs 900-1200 based on one or more constraints (e.g., threshold values, rules, etc.) for the various performance metrics. The constraints may define a minimum value, maximum value, and/or range of values for one or more of the performance metrics (e.g., a maximum value for a "capital budget" performance metric, a minimum value for a "productivity" performance metric, etc.). In some embodiments, the constraints define rules or criteria (e.g., logical conditions) based on the values of the performance metrics within a given simulation result. For example, a rule may specify that the value of the "carbon emissions" performance metric plus the value of the "water usage" performance metric should be less than a threshold value. Planning tool 600 can provide user interfaces that allow a user to define the threshold values, rules, or other constraints that can be used to filter or rearrange the simulation results. In various embodiments, the constraints that are used to filter or rearrange the simulation results may be the same as the constraints used to perform the simulations or may include additional constraints that are not considered when performing the simulations.

After performing the simulations, planning tool 600 can compare the values of the performance metrics in each of the simulation results to the constraints for the performance metrics to determine which of the simulation results satisfy the constraints. In some embodiments, planning tool 600 filters or removes one or more simulation results that do not satisfy the constraints from the set of simulation results presented via GUIs 900-1200. In some embodiments, planning tool 600 rearranges the simulation results such that the simulation results that do not satisfy the constraints are presented at the end of the ordered list of simulation results or in a separate section of GUIs 900-1200.

Figure 13:
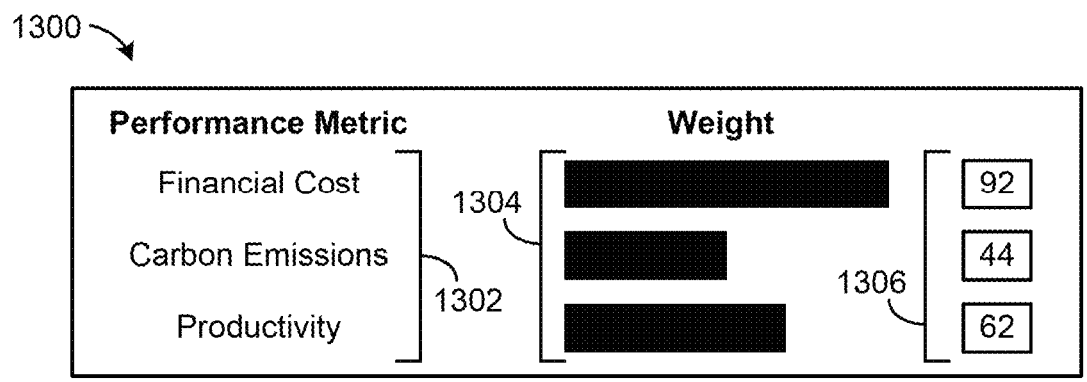
FIG. 13 is an illustration of a user interface that can be generated by the planning tool of FIG. 6 to display weights assigned to various performance metrics and receive user input to adjust the weights, according to some embodiments.

Referring now to FIG. 13, a graphical user interface (GUI) 1300 which can be generated by planning tool 600 is shown, according to an exemplary embodiment. GUI 1300 can be configured to receive input from a user regarding the weights to be assigned to various control objectives or performance metrics. The input provided via GUI 1300 can be used to assign weights to different control objectives in a multi-objective cost function (e.g., assigning values to the weights in any of the cost functions J that account for multiple control objectives) and/or to calculate a score for each simulation result for purposes of ordering the simulation results in ascending order or descending order according to the assigned scores. In various embodiments, the weights shown in GUI 1300 can be entered by a user or automatically obtained from any other data source (e.g., output by a supervisory controller, retrieved from a database, generated by a neural network, etc.).

GUI 1300 is shown to include a list of performance metrics 1302, shown as "financial cost," "carbon emissions," and "productivity." Although only three performance metrics are shown in FIG. 13, it is contemplated that GUI 1300 can include any number of performance metrics in various embodiments (e.g., any of the performance metrics described herein). GUI 1300 may include a user input section 1306 into which a user can enter values indicating the relative importance or weights of the various performance metrics. In the example shown in FIG. 13, the user has entered a value of "92" for the financial cost performance metric, a value of "44" for the carbon emissions performance metric, and a value of "62" for the productivity performance metric. These example weights indicate that the financial cost performance metric is the most important, the carbon emissions performance metric is the least important, and the productivity performance metric has an intermediate importance, according to the user's preferences. In some embodiments, GUI 1300 includes a graphical section 1304 including one or more bars or other graphical elements that illustrate the assigned weights. The length or height of the graphical elements may correspond (e.g., may be proportional) to the values of the weights assigned to the corresponding performance metrics in user input section 1306.

Figure 14:
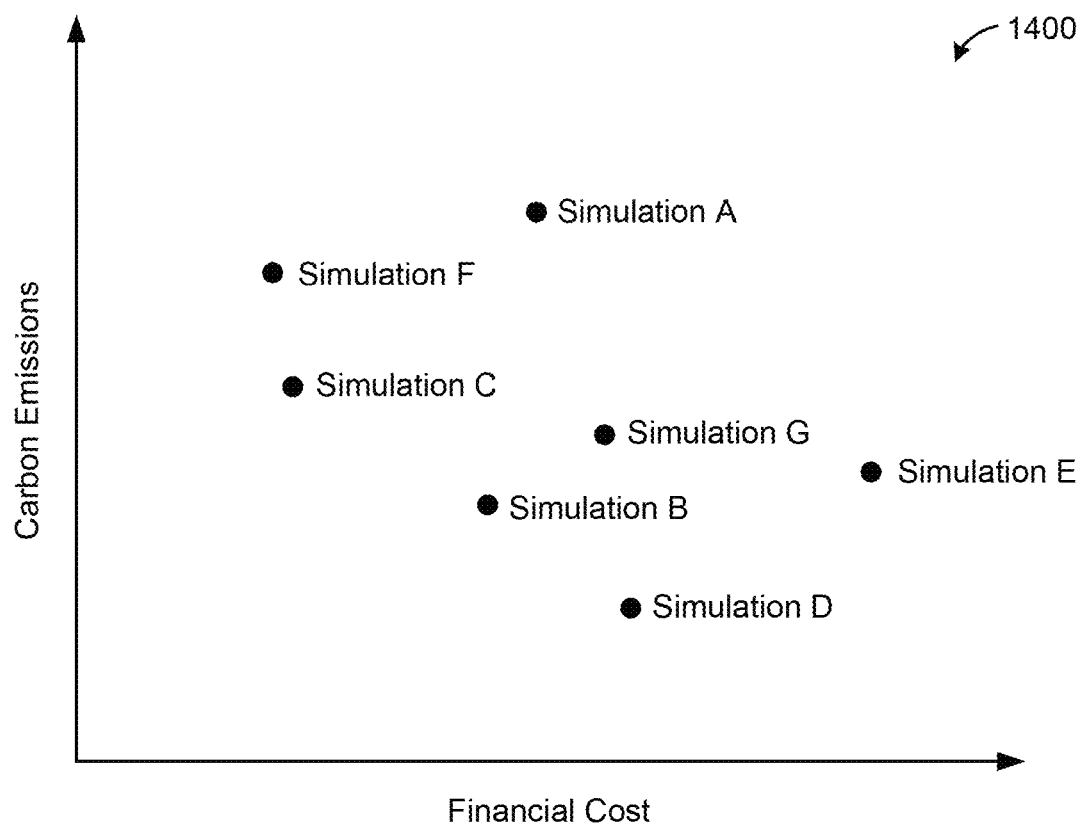
FIG. 14 is an illustration of a user interface that can be generated by the planning tool of FIG. 6 to present simulation results indicating values of various performance metrics, according to some embodiments.
Figure 15:
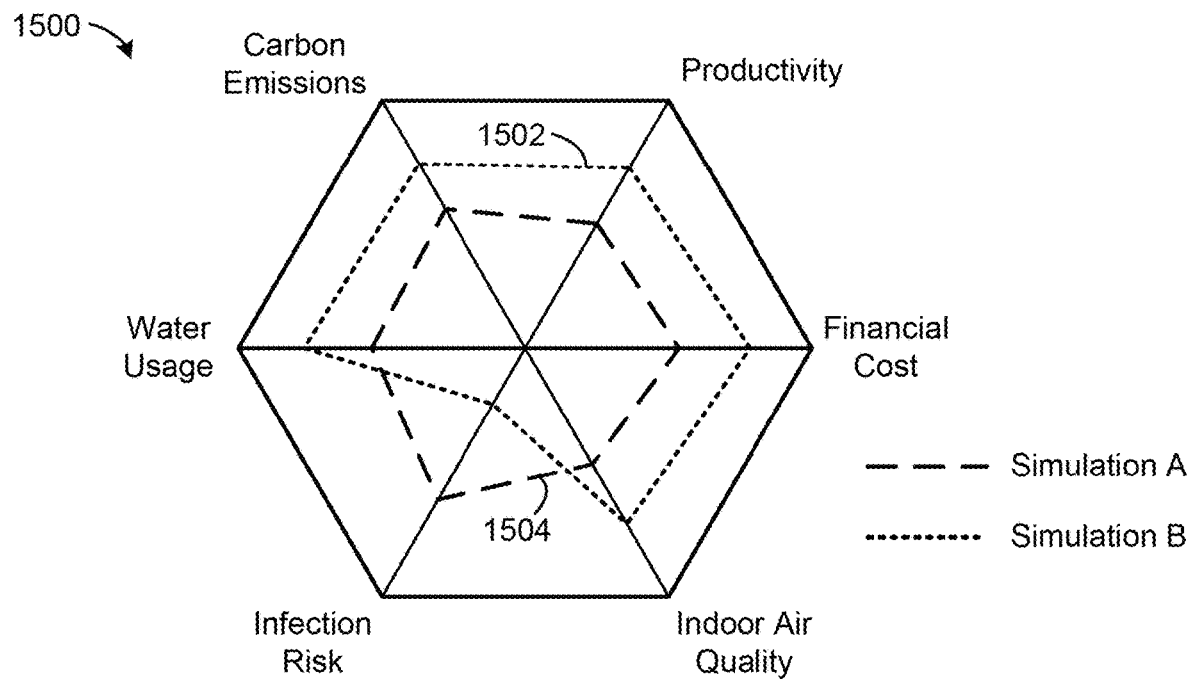
FIG. 15 an illustration of another user interface that can be generated by the planning tool of FIG. 6 to present simulation results indicating values of various performance metrics, according to some embodiments.

Referring now to FIGS. 14 and 15, additional graphical user interfaces (GUIs) 1400 and 1500 which can be generated by planning tool 600 are shown, according to exemplary embodiments. Planning tool 600 can generate GUIs 1400 and 1500 to present the values of the performance metrics in the set of simulation results graphically. For example, GUI 1400 is shown to include a two-dimensional graph which plots two of the performance metrics (i.e., "Carbon Emissions" and "Financial Cost") along the vertical and horizontal axes respectively. Although these two performance metrics are shown in FIG. 14, it is contemplated that any two performance metrics can be chosen. In some embodiments, GUI 1400 includes one or more performance metric selection elements and/or simulation result selection elements (e.g., dropdown boxes) which allow a user to select the particular performance metrics and simulation results to plot in the two-dimensional graph. In some embodiments, GUI 1400 may be expanded or modified to become a three-dimensional graph if the user selects three performance metrics to display graphically. The values of the performance metrics for each of the simulation results can be represented as points, circles, or other graphical elements within GUI 1400. For example, GUI 1400 is shown to include points for simulations A-G that indicate the values of the selected performance metrics in each of simulations A-G.

GUI 1500 is shown as a radar chart (e.g., a spider chart, a web chart, etc.) that illustrates the values of several performance metrics (shown as "Carbon Emissions," "Productivity," "Financial Cost," "Indoor Air Quality," "Infection Risk," and "Water Usage") for a first simulation result ("Simulation A") represented by line 1504 and a second simulation result ("Simulation B") represented by line 1502. The values of the performance metrics can be represented by the positions of the vertices of lines 1502-1504 along the axes that correspond to the various performance metrics. In some embodiments, the performance metric axes may be labeled with numerical values or a number scale for each performance metric shown in GUI 1500. In some embodiments, planning tool 600 generates GUI 1500 or modifies GUI 1400 to become a radar chart if the user selects more than three performance metrics to plot graphically. Although only two simulation results and six performance metrics are shown in FIG. 15, it is contemplated that any number of simulation results and/or performance metrics could be plotted graphically in GUI 1500. In some embodiments, GUI 1500 includes one or more performance metric selection elements and/or simulation selection elements (e.g., dropdown boxes) which allow a user to select the particular performance metrics and simulation results to plot in the radar graph. In some embodiments, planning tool 600 may dynamically expand or modify GUI 1500 to include additional, fewer, or different performance metrics and/or simulation results based on the user selections made via the selection elements.

Pareto Optimization and Simulation Recommendations

In some embodiments, the simulations performed by planning tool 600 may include multi-objective optimization or Pareto optimization. Each simulation may include performing an optimization of a cost function subject to a set of constraints. In some embodiments, each simulation represents a different optimization problem in that one or more elements of the optimization problem differs from the optimization problems solved in the other simulations. In some embodiments, the elements that can be varied across the different simulations include any variable or condition that is provided as an input to the optimization process. The elements of the optimization problem that can differ across the simulations may include, for example, different sets of equipment that have different performance characteristics, different control objectives accounted for in the cost function or different weights assigned to same control objectives, different building loads (e.g., heating or cooling loads, electric loads, etc.) or other conditions to be satisfied by the equipment over the time period (e.g., building temperature constraints, occupant comfort constraints, etc.), different operating constraints for individual pieces of equipment or sets of equipment (e.g., minimum or maximum airflow rates, minimum or maximum discharge air temperatures, etc.), different weather conditions or projected disturbances, different optimization horizons, or any other element that can be varied across the different simulations to define technically different optimization problems to be solved.

The result of each simulation performed by planning tool 600 may represent an optimal solution to the corresponding optimization problem, meaning that the simulation result is optimal given the elements that define the corresponding optimization problem. However, some of the simulation results may additionally be Pareto optimal, whereas other simulation results may not be Pareto optimal when compared to the other simulation results. A given simulation result can be considered Pareto optimal with respect to a given set of performance metrics or control objectives if none of the performance metrics or control objectives in the given simulation result can be improved in value (e.g., moved in whichever direction is considered beneficial or desirable with respect to that particular performance metric or control objective) without worsening the value(s) of one or more of the other performance metrics or control objectives. Some performance metrics such as carbon emissions or financial cost may be improved by decreasing their values, whereas other performance metrics such as infection risk or indoor air quality may be improved by increasing their values. In some embodiments, planning tool 600 compares the set of simulation results to each other to determine which of the simulation results are Pareto optimal. When comparing a finite set of simulation results, planning tool 600 may classify a given simulation result as Pareto optimal if there exists no other simulation result within the set of simulation results that has improved values for each and every one of the performance metrics or control objectives considered when evaluating Pareto optimality (i.e., two or more of the performance metrics or control objectives).

Various systems and methods for performing Pareto optimization in the context of a control system for a building or campus are described in detail in U.S. patent application Ser. No. 17/483,078 ("the '078 application") filed Sep. 23, 2021, the entire disclosure of which is incorporated by reference herein. In some embodiments, planning tool 600 includes some or all of the components, functionality, or other features described in the '078 application. The user interfaces generated by planning tool 600 can include any of the user interfaces described in the '078 application.

Figure 16:
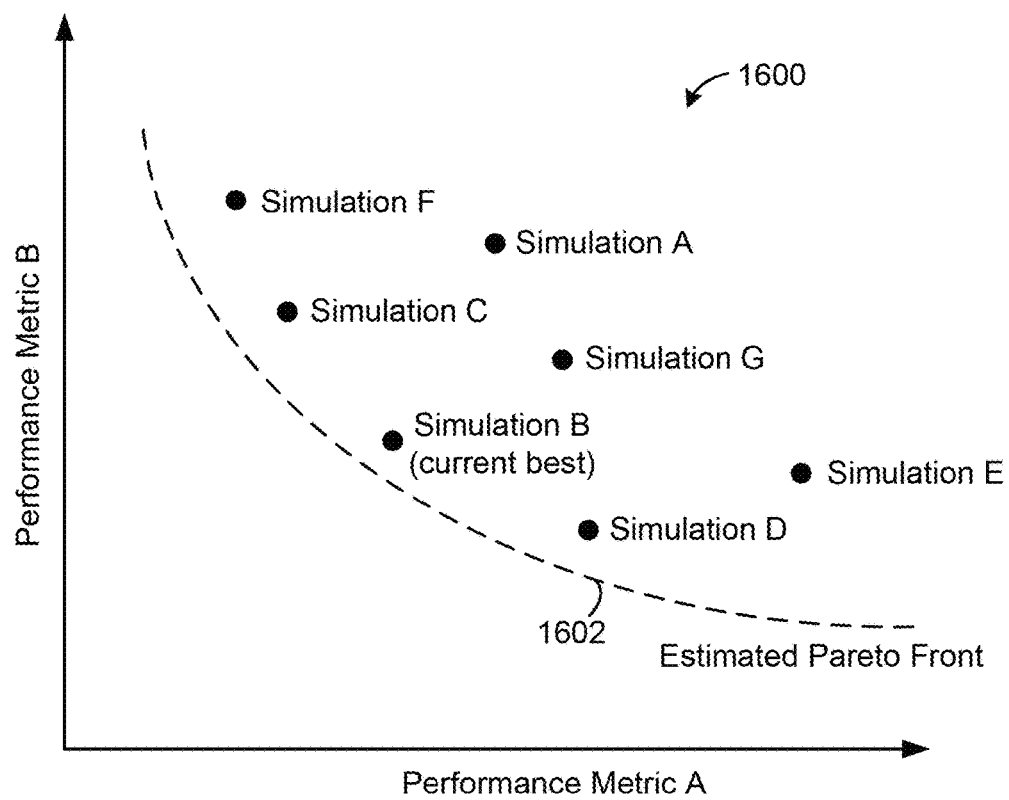
FIG. 16 an illustration of another user interface that can be generated by the planning tool of FIG. 6 to present simulation results indicating values of various performance metrics and an estimated Pareto front, according to some embodiments.

Referring now to FIG. 16, a graph 1600 illustrating an estimated Pareto front 1602 which can be generated by planning tool 600 is shown, according to an exemplary embodiment. Each of the points shown in graph 1600 represents corresponding simulation result (i.e., simulations A-G) and indicates the values of a selected set of performance metrics (shown as "Performance Metric A" and "Performance Metric B") in the corresponding simulation result. Although only two performance metrics are shown in graph 1600 for ease of illustration, it is contemplated that any number (n) of performance metrics can be used to generate an n-dimensional Pareto front in various embodiments. The performance metrics that are selected for use in generating Pareto front 1602 can be selected from the set of performance metrics for which values are generated by running the simulations.

In some embodiments, planning tool 600 is configured to generate a graphical user interface that includes graph 1600. Planning tool 600 can determine which of the simulation results is the current best simulation (e.g., based on the n-dimensional distance between the simulation result and estimated Pareto front 1600 in n-dimensional space) and may include an indication of the best simulation in the graphical user interface (e.g., by labeling the best simulation as such, highlighting the best simulation, etc.). For example, FIG. 16 shows simulation B labeled as the "current best" simulation.

While the true Pareto front may be unknown, in some embodiments, planning tool 600 can be configured to generate estimated Pareto front 1602 by running a plurality of simulations and evaluating the results. One example of a process which can be performed by planning tool 600 to generate estimated Pareto front 1602 is described in detail in the '078 application. For example, planning tool 600 may start by running a small number of simulations (e.g., simulations A-C) to generate a few points in graph 1600. Then, additional optimization problems or scenarios to simulate can be generated by varying the elements of the optimization problem either randomly or strategically. The additional simulations (e.g., simulations D-E) can be run to generate additional points in graph 1600. This process can be repeated until a sufficient number of points are generated in graph 1600 to allow planning tool 600 to generate estimated Pareto front 1602 and/or select a set of the simulation results that are considered Pareto optimal. As shown in graph 1600, simulation results B, C, D, and F are considered Pareto optimal because there exists no other simulation result in the set of simulation result that has improved (e.g., lower) values for both performance metrics A-B, whereas simulation results A, E, and G are not considered Pareto optimal because at least one other simulation result in the set of simulation results has improved values for both of the performance metrics A-B. In some embodiments, planning tool 600 generates estimated Pareto front 1602 by fitting a curve to the set of Pareto optimal simulation results and/or according to criteria that requires each of the simulation results to be contained within estimated Pareto front 1602 (e.g., above the line in graph 1600).

In some systems, it may be desirable to reduce or minimize the number of simulations that need to be run to generate estimated Pareto front 1602. For example, depending on the complexity of each simulation or the number of variables in the optimization problem, it can be computationally expensive and/or require a significant amount of time to run a large number of simulations. Advantageously, planning tool 600 can be configured to automatically recommend or suggest simulations to run that are predicted to result in Pareto optimal solutions, as described in greater detail below. For ease of explanation, the present disclosure will refer to the different optimization problems or simulation configurations that correspond to the different simulations as "points." Using this terminology, each point represents a different optimization problem or simulation configuration for which a simulation can be run and includes different values for at least one of the elements of the optimization problem. Planning tool 600 can be configured to recommend points that are high-quality solutions in the Pareto sense (i.e., points that are predicted to be Pareto optimal points or likely to include at least one Pareto optimal point) which are expected to refine estimated Pareto front 1602 and improve upon the current best simulation. In this way, planning tool 600 can recommend additional points that can be tested by running the simulations and further refine estimated Pareto front 1602 while reducing the number of points that need to be tested. These features improve the performance of planning tool 600 relative to traditional multi-objective optimization systems by reducing the computational requirements and number of simulations that need to be run to obtain an accurate estimate of estimated Pareto front 1602.

Figure 17:
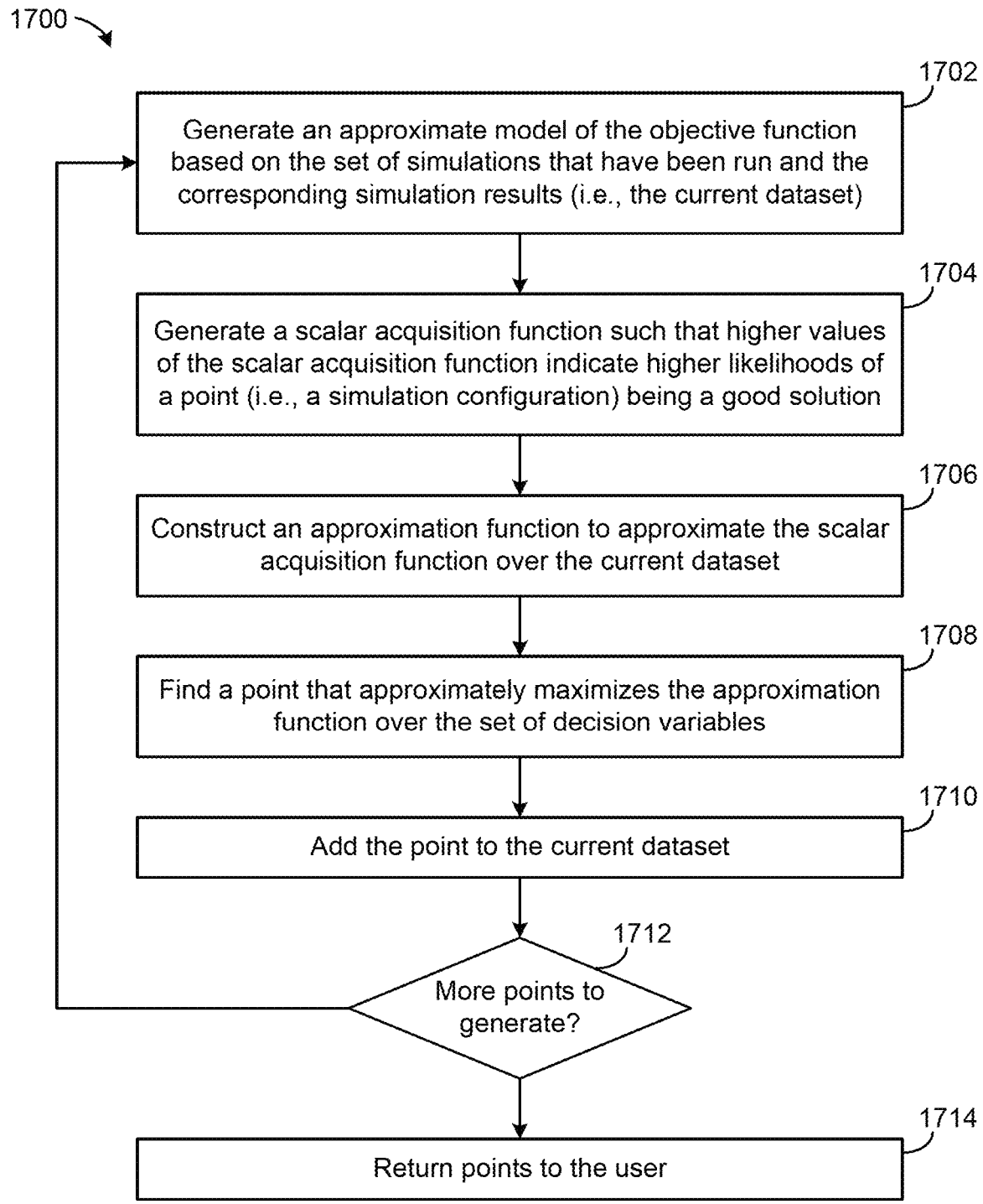
FIG. 17 is a flowchart of a process which can be performed by the planning tool of FIG. 6 to automatically recommend points at which to run additional simulations to further refine the estimated Pareto front of FIG. 16, according to some embodiments.

Referring now to FIG. 17, a flowchart of a process 1700 which can be performed by planning tool 600 to automatically refine estimated Pareto front 1602 by recommending additional simulations to run is shown, according to some embodiments. In some embodiments, process 1700 includes performing multi-objective Bayesian optimization to refine estimated Pareto front 1602. The following terminology will be used to describe the steps of process 1700 mathematically. $X \subset \mathbb{R}^n$ is the feasible set of decision variables that exist within the set of real numbers $\mathbb{R}$. $f(\bullet):X \to \mathbb{R}^m$ is the vector-valued objective function (e.g., any of the multi-objective cost functions or objective functions described herein) with m individual scalar objective values. Each of the m scalar objective values may be the value of one of the control objectives or performance metrics as discussed above. The function $f(\bullet)$ receives a point x as an input (i.e., a simulation configuration including values for each of the elements of the simulation) and produces a simulation result y as an output (i.e., a value for each of the m control objectives or performance metrics) such that $y=f(x)$. Process 1700 may be performed after an initial set of N simulations have already been run. Each of the N prior simulations has a known input point denoted $x_n$ and a known simulation result denoted $y_n$ such that the function $f(\bullet)$ has known values $y_n:=f(x_n)$ for each of the N prior simulations. The goal of process 1700 is to suggest K additional points $\tilde{x}_k$ that are expected to be Pareto-optimal points in the feasible set X.

Process 1700 is shown to include generating an approximate model of the objective function based on the set of simulations that have been run and the corresponding simulation results (i.e., the current dataset) (step 1702). The objective function may be the vector-valued objective function $f(\bullet)$ and the approximate model may be defined as $\tilde{f}(\bullet):X \to \mathbb{R}^n$ such that $\tilde{f}(x_n) \approx y_n$ over the current dataset. In other words, the approximate model $\tilde{f}(\bullet)$ may approximate the vector-valued objective function $f(\bullet)$ such that providing any of the input points $x_n$ in the current dataset as an input to the approximate model $\tilde{f}(\bullet)$ may produce an output that approximates the corresponding value of $y_n$. In various embodiments, any of a variety of function approximation techniques can be used to build the approximate model $\tilde{f}(\bullet)$ such as, for example, simple regression, a neural network, a Gaussian process, a tree-structured Parzen estimator, or any other technique that can be used to construct a model from a set of training data.

Process 1700 is shown to include generating a scalar acquisition function such that higher values of the scalar acquisition function indicate higher likelihoods of a point (i.e., a simulation configuration) being a good solution (step 1704). The scalar acquisition function can be denoted as $g(\cdot): X \to \mathbb{R}$ such that higher values of $g(\cdot)$ indicate a higher likelihood of x (i.e., a point defining a particular simulation configuration) being a good solution. A good solution can be defined as a solution that is estimated to improve the values of one or more of the performance metrics, control objectives or, objective functions used in the simulation, and/or produce a simulation result that is Pareto optimal when added to the current data set. In some embodiments, the scalar acquisition function $g(\cdot)$ can be generated or selected using a technique that balances exploitation (i.e., improving values of the objective functions near existing points) with exploration (i.e., choosing completely new points that are unlike previous points) so that process 1700 suggests a variety of candidate solutions. In various embodiments, any of a variety of scalar acquisition functions can be used for $g(\cdot)$ such as, for example, any of the objective functions or cost functions described herein, a weighted sum of any of the performance metrics or control objectives, a mean plus uncertainty of the objective functions or control objectives, an expected hypervolume improvement, or any other type of function that quantifies the performance of the system or simulated system with respect to any combination of the performance metrics, control objectives, or objective functions described herein. In some embodiments, the scalar acquisition function $g(\cdot)$ accepts a point $x_n$ as an input and provides a scalar output $z_n$. In some embodiments, the scalar output $z_n$ represents the values of the performance metrics, control objectives, or combinations of performance metrics and control objectives that are considered when performing the simulations (e.g., a weighted combination of the performance metrics or control objectives). In some embodiments, the scalar output $z_n$ is a function of the m control objectives or performance metrics represented by the corresponding simulation result $y_n$.

Process 1700 is shown to include constructing an approximation function to approximate the scalar acquisition function over the current dataset (step 1706). The approximation function can be denoted as $\tilde{g}(\cdot): \to \mathbb{R}$ and may be an approximation of the scalar acquisition function $g(\cdot)$ such that $\tilde{g}(x_n) \approx g(x_n)$ over the current dataset. The approximation function $\tilde{g}(\cdot)$ can be generated based on the values of the input points $x_n$ and the corresponding values of $z_n$ in the current data set. In various embodiments, any of a variety of function approximation techniques can be used to build the approximation function $\tilde{g}(\cdot)$ such as, for example, simple regression, a neural network, a Gaussian process, a tree-structured Parzen estimator, or any other technique that can be used to construct a model from a set of training data. In some embodiments, the approximation function $\tilde{g}(\cdot)$ is generated using the same technique used to generate the approximate model $\tilde{f}(\cdot)$ with the exception that the approximation function $\tilde{g}(\cdot)$ is based on values of the inputs and outputs of the scalar acquisition function $g(\cdot)$ corresponding to the points $x_n$, in the current dataset, whereas the approximate model $\tilde{f}(\cdot)$ is based on the inputs and outputs of the vector-valued objective function $f(\cdot)$ corresponding to the points $x_n$, in the current dataset. In other embodiments, the approximation function $\tilde{g}(\cdot)$ and the approximate model $\tilde{f}(\cdot)$ can be generated using different techniques.

Process 1700 is shown to include finding a point that approximately maximizes the approximation function over the set of decision variables (step 1708). Mathematically, step 1708 can be defined as finding a new point $\tilde{x}_k \in X$ that approximately maximizes $\tilde{g}(\cdot)$ over X. In various embodiments, any of a variety of techniques can be used to generate the new point $\tilde{x}_k$ such as, for example, nonlinear programming, Nedler-Mead simplex, random search, or any other technique that uses the approximation function $\tilde{g}(\cdot)$ to produce the point $\tilde{x}_k$. For example, step 1708 may include providing a plurality of potential new points as inputs to the approximation function $\tilde{g}(\cdot)$ and selecting the new point that results in the maximum value of the approximation function $\tilde{g}(\cdot)$ as the new point $\tilde{x}k$. The new point $\tilde{x}_k$ may define a new simulation configuration that has not yet been tested. In other words, the new point $\tilde{x}_k$ may define a simulation configuration for which the simulation has not yet been performed and which does not yet have a set of simulation results.

Process 1700 is shown to include adding the point to the current dataset (step 1710). Step 1710 may include providing the new point $\tilde{x}_k$ as an input to the approximate model $\tilde{f}(\cdot)$ and generating an approximate value of $y_k$ (i.e., $\tilde{y}_k = \tilde{f}(\tilde{x}_k)$) as an output of the approximate model $\tilde{f}(\cdot)$ based on the value of the new point $\tilde{x}_k$ (i.e., $\tilde{y}_k = \tilde{f}(\tilde{x}_k)$). Adding the point to the dataset in step 1710 may include adding the new point $\tilde{x}_k$ as well as the corresponding value of $\tilde{y}_k$ to the dataset. In other words, the dataset may be expanded to include the new point in the form of a vector or matrix $(\tilde{x}_k, \tilde{f}(\tilde{x}_k))$ or $(\tilde{x}_k, \tilde{y}_k)$.

Process 1700 is shown to include determining whether any additional points should be generated (step 1712). In some embodiments, process 1700 includes prompting a user to select or input a number of new points to generate via any of the user interfaces described herein. Steps 1702-1710 can be repeated iteratively to generate a new point and add the new point to the dataset with each iteration of steps 1702-1710 until the number of new points that have been generated and added to the dataset equals the number of new points requested via the user input. For example, if the user requests that K new points be generated, steps 1702-1710 can be repeated three times until K new points have been generated. Upon reaching step 1712, if the number of new points generated is less than the number of new points requested by the user (i.e., the result of step 1712 is "yes"), process 1700 may return to step 1702 and steps 1702-1710 may be repeated to generate an additional new point and add the additional new point to the dataset. However, if the number of new points generated is equal to the number of new points requested by the user (i.e., the result of step 1712 is "no"), process 1700 may proceed to step 1714.

Process 1700 is shown to include returning the points to the user (step 1714). Step 1714 may include presenting the new points to the user via any of the user interfaces described herein. In some embodiments, step 1714 include presenting the values of $\tilde{x}_k$ and the corresponding values of $\tilde{y}_k = \tilde{f}(\tilde{x}_k)$ for each of the new points generated by performing steps 1702-1710. In some embodiments, step 1714 includes adding the values of the new points $(\tilde{x}_k, \tilde{y}_k)$ to graph 1600 along with the existing simulation results. Planning tool 600 may highlight or otherwise mark the new points $(\tilde{x}_k, \tilde{y}_k)$ as untested (i.e., the simulations have not yet been run for the new points) in graph 1600 and may provide the user with an option to run the simulations for the new points. For example, planning tool 600 can present a button or other user interface element for a user to accept the recommendations and begin running the new simulations for the new points. Upon running the new simulations, planning tool 600 can replace the approximated values of the new points $(\tilde{x}_k, \tilde{y}_k)$ with the actual values of the new points $(x_k, y_k)$ in the dataset, where the values of $y_k$ are generated by running the simulations. Once the user is satisfied with the set of simulation results, the user can accept the set of simulation results generated by planning tool 600 including the current best simulation and estimated Pareto front 1602. The set of simulation results can be exported from planning tool 600 into an operational tool (e.g., a live or real-time controller, as described in the '078 application) so that the user can change operational strategies if desired and move along estimated Pareto front 1602.

Figure 18:
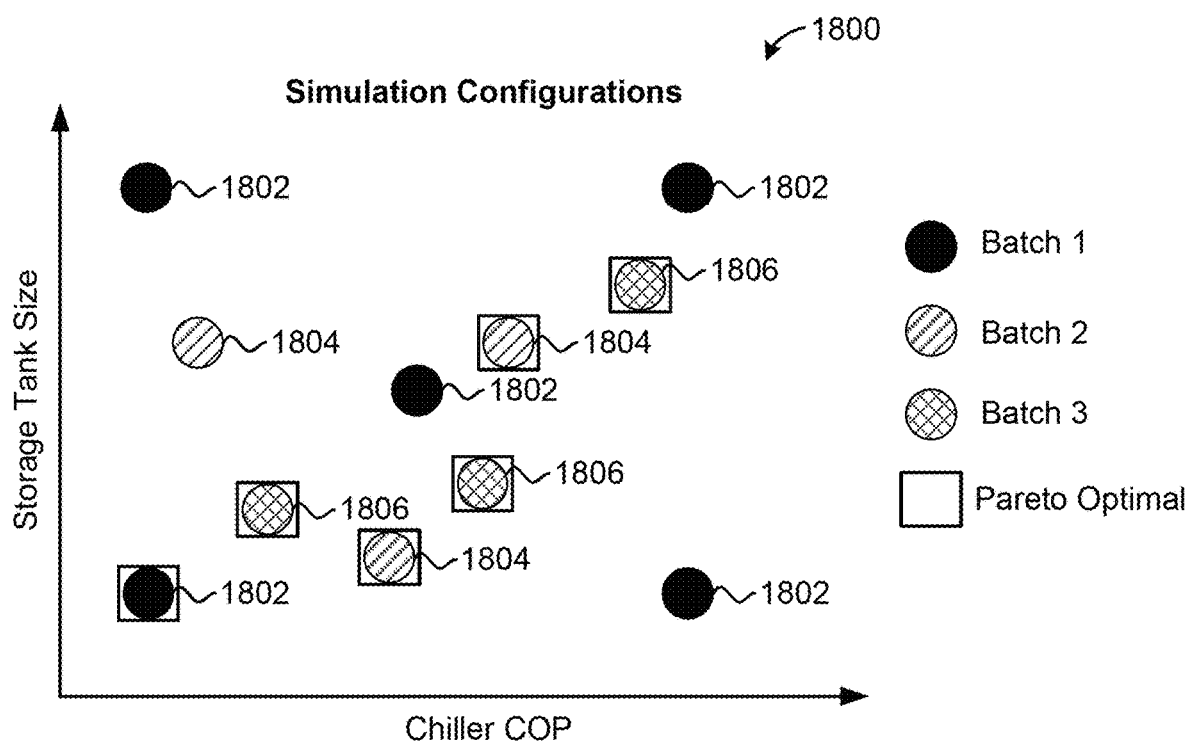
FIG. 18 is an illustration of a user interface that can be generated by the planning tool of FIG. 6 showing a variety of simulation configurations including different values for elements of the simulations, according to some embodiments.
Figure 19:
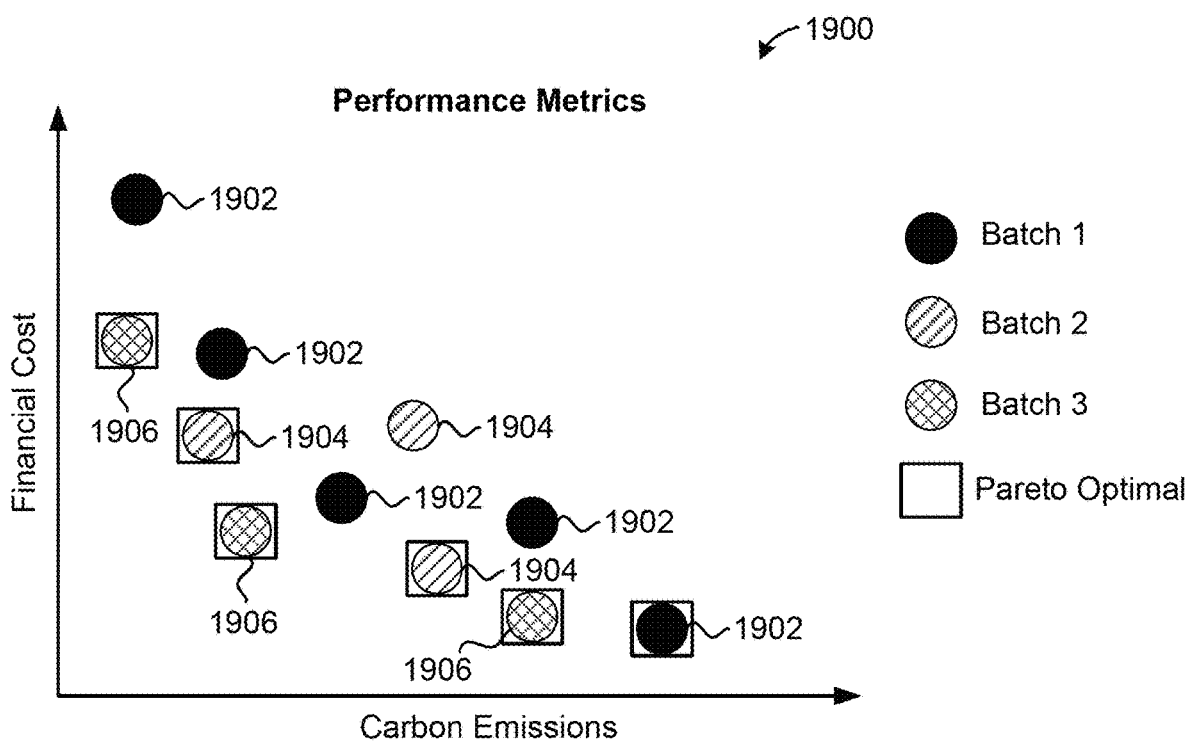
FIG. 19 is an illustration of a user interface that can be generated by the planning tool of FIG. 6 showing values of performance metrics resulting from the simulation configurations of FIG. 18, according to some embodiments.

Referring now to FIGS. 18-19, graphical user interfaces (GUIs) 1800 and 1900 which can be generated by planning tool 600 are shown, according to some embodiments. GUIs 1800 and 1900 illustrate an example application of process 1700 to automatically recommend additional points (i.e., simulation configurations) for which simulations can be run. GUI 1800 shows a variety of simulation configurations represented by points 1802-1806. Each of points 1802-1806 includes a value for a first element of the simulated system (e.g., "Storage Tank Size") and a value for a second element of the simulated system (e.g., "Chiller COP"). Points 1802-1806 correspond to the points x described with reference to process 1700. Although only two elements of the simulated system are shown in GUI 1800 for ease of illustration, it is contemplated that each of points 1802-1806 can include values for any number of elements that define the corresponding simulation configuration (i.e., elements of the optimization problem). Planning tool 600 can use the values of points 1802-1806 to run the simulations (i.e., a simulation for each of points 1802-1806) to generate corresponding sets of simulation results.

GUI 1900 shows a variety of performance metrics that result from performing the simulations for each of points 1802-1806. The simulation results for points 1802 are represented by simulation results 1902, the simulation results for points 1804 are represented by simulation results 1904, and the simulation results for points 1806 are represented by simulation results 1906. Each of simulation results 1902-1906 includes a value for a first performance metric (e.g., "Financial Cost") and a value for a second performance metric (e.g., "Carbon Emissions"), which may be determined by running the simulation under the conditions defined by the corresponding points 1802-1806. Simulation results 1902-1906 correspond to the simulation results y described with reference to process 1700. Although only two performance metrics are shown in GUI 1900 for ease of illustration, it is contemplated that each of simulation results 1902-1906 can include values for any number of performance metrics or control objectives that characterize the corresponding simulation.

Process 1700 can be performed iteratively to suggest new points for which additional simulations can be run based on the simulations that have been run so far. For example, an initial set of simulations may be run for points 1802 (i.e., the "Batch 1" points in GUI 1800) to generate the corresponding simulation results 1902 (i.e., the "Batch 1" simulation results in GUI 1900). Process 1700 can then be performed using points 1802 as the tested points $x_k$ and using the simulation results 1902 as the simulation results $y_k$. For a chosen batch size K, process 1700 may suggest K new points $\tilde{x}_k$ for which simulations can be run. For example, assuming the user has selected a batch size K=3, process 1700 may suggest three new points 1804 corresponding to "Batch 2" in GUI 1800. Simulations can then be run for each of points 1804 to produce the corresponding "Batch 2" simulation results 1904. Planning tool 600 can present the simulation results 1904 via GUI 1900 for the user to review.

If the user would like to achieve additional improvement, planning tool 600 can run another iteration of process 1700 using all of points 1802-1804 as the tested points $x_k$ and using all of the simulation results 1902-1904 as the simulation results $y_k$. For a chosen batch size K, process 1700 may suggest K new points $\tilde{x}_k$ for which simulations can be run. For example, assuming the user has selected a batch size K=3, process 1700 may suggest three new points 1806 corresponding to "Batch 3" in GUI 1800. Simulations can then be run for each of points 1806 to produce the corresponding "Batch 3" simulation results 1906. Planning tool 600 can present the simulation results 1904 via GUI 1900 for the user to review. Each iteration of process 1700 can use the points $x_k$ and corresponding simulation results $y_k$ for all of the simulations that have been run so far to suggest a new set of points $\tilde{x}_k$ for which additional simulations can be run.

In the example illustrated in GUI's 1800 and 1900, planning tool 600 is used to predict the performance metrics of financial cost and carbon emissions of a chiller plant that are predicted to result from simulation configurations that vary the size of a storage tank (e.g., hot water or cold water storage tank) and the coefficient of performance (COP) of the chillers to install. In general, both a larger storage tank and a higher chiller COP lead to increased financial cost and decreased carbon emissions. Planning tool 600 can be used to initially run the five simulations in Batch 1 by setting the storage tank size and the chiller COP to the values denoted by points 1802 in GUI 1800 (i.e., five different points $x_n$), which produces corresponding sets of simulation results 1902 in GUI 1900 (i.e., five different simulation results $y_n$). This information (i.e., the five values $x_n$ and $y_n$ for Batch 1) is provided as input to process 1700 as the current dataset in step 1702. Process 1700 can then be run to generate the three new points 1804 which are returned to the user in step 1714 as the suggested new points $\tilde{x}_k$ and shown as the Batch 2 points in GUI 1800. If the user wishes to run the simulations for points 1804, planning tool 600 run a simulation for each of new points 1804 to generate corresponding sets of simulation results 1904 shown as the Batch 2 simulation results in GUI 1900. The Batch 2 simulation results 1904 can be added to GUI 1900.

If the user is still not happy with the Batch 2 simulation results 1903, the user can trigger another iteration of process 1700, this time providing both the Batch 1 and the Batch 2 points 1802-1804 and the Batch 1 and Batch 2 simulation results 1902-1904 as input to process 1700 as the current dataset in step 1710. Process 1700 can then be run to generate the three new points 1806 which are returned to the user in step 1714 as the suggested new points $\tilde{x}_k$ and shown as the Batch 3 points in GUI 1800. If the user wishes to run the simulations for points 1806, planning tool 600 run a simulation for each of new points 1806 to generate corresponding sets of simulation results 1906 shown as the Batch 3 simulation results in GUI 1900. The Batch 3 simulation results 1906 can be added to GUI 1900.

With each iteration of process 1700, planning tool 600 can update GUIs 1800 and 1900 to indicate which of points 1802-1806 and which of simulation results 1902-1906 are Pareto optimal. In some embodiments, the Pareto optimal points and simulation results are highlighted (e.g., shown in a different color, bolded, etc.) or otherwise marked in GUIs 1800 and 1900. The example shown in FIGS. 18-19 adds boxes around the Pareto optimal points and simulation results in GUIs 1800 and 1900. Planning tool 600 can identify the Pareto optimal simulation results from the set of simulation results 1902-1906 and identify the subset of points 1802-1806 that correspond to the Pareto optimal simulation results so that the Pareto optimal points and simulation results can be indicated in both GUIs 1800 and 1900.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling building equipment comprising:
   one or more processors and one or more non-transitory computer-readable media storing instructions that, when executed by the one or more processors, cause the one or more processors to perform operations comprising:
   simulating operation of the building equipment at a plurality of initial points to generate corresponding values of a first control objective and a second control objective that competes with the first control objective, wherein simulating the operation of the building equipment comprises executing a control algorithm subject to one or more constraints, each of the plurality of initial points defining a different simulation configuration comprising different values for the one or more constraints;
   automatically generating a new point at which to run a new simulation based on the plurality of initial points and the corresponding values of the first control objective and the second control objective;
   running the new simulation at the new point to generate corresponding values of the first control objective and the second control objective;
   classifying a subset of the plurality of initial points and the new point as Pareto-optimal points based on the corresponding values of the first control objective and the second control objective; and
   operating the building equipment at a Pareto-optimal point selected from the subset of the plurality of initial points and the new point classified as Pareto-optimal points.

2. The system of claim 1, wherein simulating the operation of the building equipment at the plurality of initial points comprises running an initial simulation for each of the plurality of initial points, each initial simulation generating a corresponding value of the first control objective and a corresponding value of the second control objective.

3. The system of claim 1, wherein automatically generating the new point at which to run the new simulation comprises executing a process configured to suggest one or more Pareto-optimal points based on the plurality of initial points and the corresponding values of the first control objective and the second control objective.

4. The system of claim 1, wherein automatically generating the new point at which to run the new simulation comprises:
   constructing an approximation function based on the plurality of initial points and the corresponding values of the first control objective and the second control objective for the plurality of initial points; and
   finding a point that optimizes the approximation function.

5. The system of claim 1, the operations further comprising:
   generating an updated dataset comprising the plurality of initial points, the new point, and the corresponding values of the first control objective and the second control objective for the plurality of initial points and the new point; and
   automatically generating a second new point at which to run a second new simulation based on the updated dataset.

6. The system of claim 1, the operations further comprising:
   providing a user interface that indicates the subset of the plurality of initial points and the new point classified as Pareto-optimal points; and
   receiving a user selection of the Pareto-optimal point at which to operate the building equipment via the user interface.

7. The system of claim 1, the operations further comprising providing a user interface comprising values of a set of performance metrics comprising at least the first control objective and the second control objective, each set of performance metrics predicted to result from operating the building equipment at one of the plurality of initial points.

8. The system of claim 1, the operations further comprising:
adjusting weights assigned to a plurality of performance metrics characterizing the operation of the building equipment at the plurality of initial points; and
assigning a score to each of the plurality of initial points, each score based on (i) values of the plurality of performance metrics predicted to result from operating the building equipment at the plurality of initial points and (ii) the weights assigned to the plurality of performance metrics.

9. The system of claim 1, the operations further comprising:
assigning a score to each of the plurality of initial points based on values of a plurality of performance metrics predicted to result from operating the building equipment at the plurality of initial points; and
providing a user interface that arranges the plurality of initial points according to the score assigned to each of the plurality of initial points.

10. A method for controlling building equipment comprising:
simulating operation of the building equipment at a plurality of initial points to generate corresponding values of a first control objective and a second control objective that competes with the first control objective, wherein simulating the operation of the building equipment comprises executing a control algorithm subject to one or more constraints, each of the plurality of initial points defining different values for the one or more constraints;
automatically generating a new point at which to run a new simulation based on the plurality of initial points and the corresponding values of the first control objective and the second control objective;
running the new simulation at the new point to generate corresponding values of the first control objective and the second control objective;
classifying a subset of the plurality of initial points and the new point as Pareto-optimal points based on the corresponding values of the first control objective and the second control objective; and
operating the building equipment at a Pareto-optimal point selected from the subset of the plurality of initial points and the new point classified as Pareto-optimal points.

11. The method of claim 10, wherein simulating the operation of the building equipment at the plurality of initial points comprises running an initial simulation for each of the plurality of initial points, each initial simulation generating a corresponding value of the first control objective and a corresponding value of the second control objective.

12. The method of claim 10, wherein automatically generating the new point at which to run the new simulation comprises executing a process configured to suggest one or more Pareto-optimal points based on the plurality of initial points and the corresponding values of the first control objective and the second control objective.

13. The method of claim 10, wherein automatically generating the new point at which to run the new simulation comprises:
constructing an approximation function based on the plurality of initial points and the corresponding values of the first control objective and the second control objective for the plurality of initial points; and
finding a point that optimizes the approximation function.

14. The method of claim 10, further comprising:
generating an updated dataset comprising the plurality of initial points, the new point, and the corresponding values of the first control objective and the second control objective for the plurality of initial points and the new point; and
automatically generating a second new point at which to run a second new simulation based on the updated dataset.

15. The method of claim 10, further comprising:
providing a user interface that indicates the subset of the plurality of initial points and the new point classified as Pareto-optimal points; and
receiving a user selection of the Pareto-optimal point at which to operate the building equipment via the user interface.

16. The method of claim 10, further comprising providing a user interface comprising values of a set of performance metrics comprising at least the first control objective and the second control objective, each set of performance metrics predicted to result from operating the building equipment at one of the plurality of initial points.

17. The method of claim 10, further comprising:
adjusting weights assigned to a plurality of performance metrics characterizing the operation of the building equipment at the plurality of initial points; and
assigning a score to each of the plurality of initial points, each score based on (i) values of the plurality of performance metrics predicted to result from operating the building equipment at the plurality of initial points and (ii) the weights assigned to the plurality of performance metrics.

18. The system of claim 1, wherein the different values for the one or more constraints are related to different building equipment simulated for a respective initial point of the plurality of initial points.

19. The system of claim 1, wherein the control algorithm comprises an optimization of an objective function.

20. The system of claim 19, wherein the objective function comprises at least one objective different from the first control objective and the second control objective.

21. The system of claim 1, wherein simulating the operation comprises simulating the operation for multiple time elements.

22. The system of claim 1, the operations further comprising estimating a Pareto front from the plurality of initial points and the new point and providing a user interface that indicates the Pareto front.

23. The method of claim 10, wherein the different values for the one or more constraints are related to different building equipment simulated for a respective initial point of the plurality of initial points.

24. The method of claim 10, wherein the control algorithm comprises an optimization of an objective function.

25. The method of claim 24, wherein the objective function comprises at least one objective different from the first control objective and the second control objective.

26. The method of claim 10, wherein simulating the operation comprises simulating the operation for multiple time elements.

27. The method of claim 10, further comprising estimating a Pareto front from the plurality of initial points and the new point and providing a user interface that indicates the Pareto front.

* * * * *